US012625928B2

(12) United States Patent
   Swarbrick

(10) Patent No.: US 12,625,928 B2
(45) Date of Patent: May 12, 2026

(54) DEVICE AND A METHOD FOR PERFORMING A CRYPTOGRAPHIC ALGORITHM

(71) Applicant: NCIPHER SECURITY LIMITED, Cambridge (GB)

(72) Inventor: David John Gerard Swarbrick, Cambridge (GB)

(73) Assignee: NCIPHER SECURITY LIMITED, Cambridge (GB)

( * ) Notice: Subject to any disclaimer, the term of this patent is extended or adjusted under 35 U.S.C. 154(b) by 101 days.

(21) Appl. No.: 18/835,766

(22) PCT Filed: Feb. 6, 2023

(86) PCT No.: PCT/GB2023/050261
§ 371 (c)(1),
(2) Date: Aug. 5, 2024

(87) PCT Pub. No.: WO2023/148508
PCT Pub. Date: Aug. 10, 2023

(65) Prior Publication Data
US 2025/0139207 A1 May 1, 2025

(30) Foreign Application Priority Data
Feb. 7, 2022 (EP) .................................... 22275013

(51) Int. Cl.
*G06F 21/14* (2013.01)
*G06F 21/54* (2013.01)
(Continued)

(52) U.S. Cl.
CPC .............. *G06F 21/14* (2013.01); *G06F 21/54* (2013.01); *G06F 21/602* (2013.01);
(Continued)

(58) Field of Classification Search
None
See application file for complete search history.

(56) References Cited

U.S. PATENT DOCUMENTS

| | | | | |
|---|---|---|---|---|
| 7,346,780 B2 * | 3/2008 | Sinha | ...................... | G06F 21/52 |
| | | | | 713/176 |
| 2005/0273631 A1 * | 12/2005 | Shu | ......................... | G06F 21/85 |
| | | | | 712/E9.035 |

(Continued)

FOREIGN PATENT DOCUMENTS

| | | | | | |
|---|---|---|---|---|---|
| CN | 101059772 A | * | 10/2007 | ............ | G06F 11/348 |
| JP | 2006018528 A | * | 1/2006 | ............. | G06F 21/52 |

(Continued)

OTHER PUBLICATIONS

International Preliminary Report on Patentability received for PCT Application No. PCT/GB2023/050261 on Aug. 22, 2024, 7 pgs.
(Continued)

*Primary Examiner* — Ali H. Cheema
(74) *Attorney, Agent, or Firm* — Merchant & Gould, P.C.

(57) ABSTRACT

A device and a method for performing a cryptographic algorithm is described herein.. A method performed by a device, the device comprising a first processor and a processing module, the method comprising: obtaining, by the first processor, first data, comprising a representation of computer program code that embodies a cryptographic algorithm; obtaining, by the first processor, second data; receiving, by the first processor, a request for a first mechanism to be performed, the request comprising: information identifying the first mechanism; information identifying the first data as corresponding to a program; and information identifying the second data as corresponding to an input; transmitting, by the first processor, to the processing module, a second request for the first mechanism to be performed, the second request comprising: information identifying the first
(Continued)

mechanism; information identifying the first data as corresponding to the program; and information identifying the second data as corresponding to the input; and executing, by the processing module, the program represented in the first data taking the second data as the input.

20 Claims, 22 Drawing Sheets

(51) Int. Cl.

| | |
|---|---|
| *G06F 21/60* | (2013.01) |
| *G06F 21/62* | (2013.01) |
| *G06F 21/72* | (2013.01) |
| *H04L 9/08* | (2006.01) |
| *H04L 9/32* | (2006.01) |
| *H04L 9/40* | (2022.01) |

(52) U.S. Cl.
CPC .......... *G06F 21/6209* (2013.01); *G06F 21/72* (2013.01); *H04L 9/08* (2013.01); *H04L 9/3234* (2013.01); *H04L 9/3247* (2013.01); *H04L

*9/3271* (2013.01); *H04L 63/0853* (2013.01); *H04L 63/101* (2013.01); *H04L 63/108* (2013.01)

(56) References Cited

U.S. PATENT DOCUMENTS

| | | | | |
|---|---|---|---|---|
| 2011/0029978 | A1* | 2/2011 | Smolens | ............... G06F 9/5016 |
| | | | | 718/103 |
| 2020/0320489 | A1* | 10/2020 | Vagare | ................. H04L 9/0838 |
| 2021/0297260 | A1* | 9/2021 | Stahlberg | ............. H04L 9/3271 |

FOREIGN PATENT DOCUMENTS

| | | | | |
|---|---|---|---|---|
| JP | 2021174432 | A | * | 11/2021 |
| SU | 1061142 | A1 | * | 12/1983 |
| SU | 1138805 | A1 | * | 2/1985 |

OTHER PUBLICATIONS

International Search Report and Written Opinion received for PCT Application No. PCT/GB2023/050261 on May 4, 2023, 9 pgs.

* cited by examiner

Fig. 4B

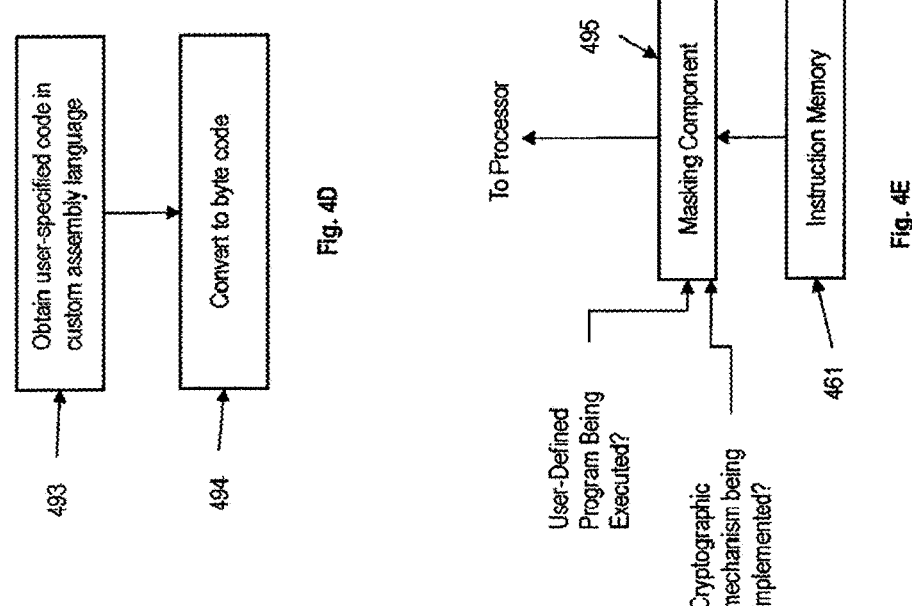
Fig. 4D
Fig. 4E
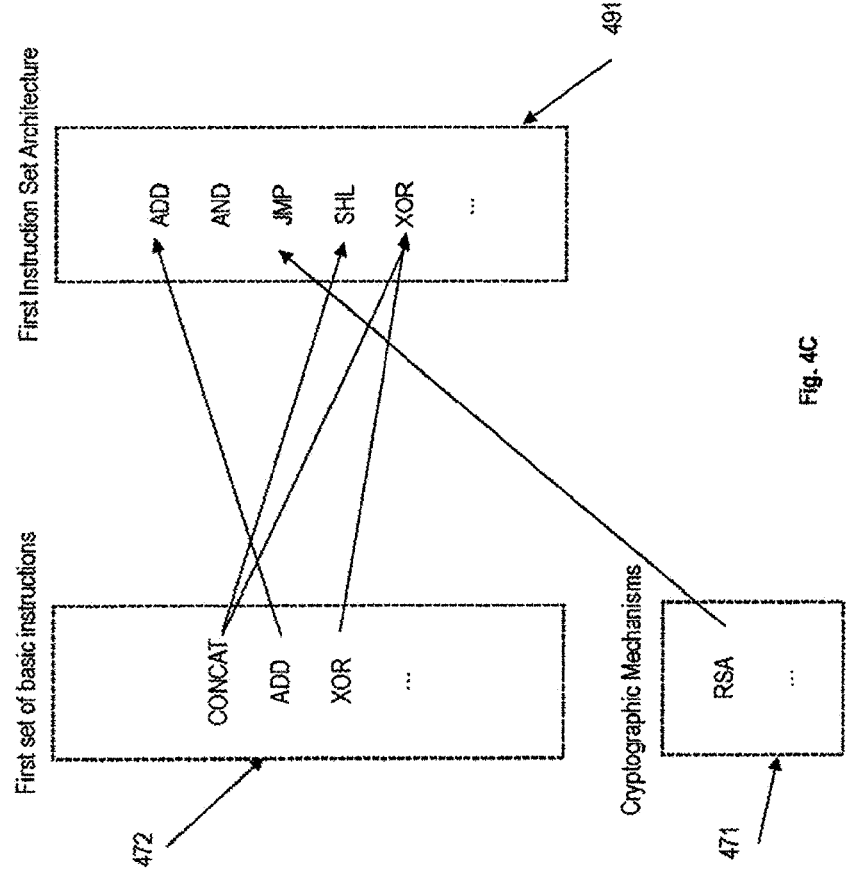
Fig. 4C

| User-Defined program being executed? | Bit *n* of input instruction | Output |
|---|---|---|
| 0 | 0 | 0 |
| 0 | 1 | 1 |
| 1 | 0 | 0 |
| 1 | 1 | 0 |

First Mask

Output

User Defined program being executed?

Bit *n* of input instruction

Output Instruction:

Cryptographic mechanism being executed? (1/0)

User Defined program being executed? (1/0)

Second Mask

First Mask

Input Instruction:

601

Template Key
(KeyType_DKTemplate)

602

ACL of
template key

603

Program Key
(KeyType_DKProgram)

604

ACL of
program key

605

Input key #2

606

ACL of
input key

607

Input key #3

608

ACL of
input key

Key:

process step executable program file or data

81  Tool 82  definitions (defines HSM API)

Run Tool

83  C language type definitions, code (serialize &c)

84  hand-written C code (i.e. firmware source)

85  Run build system

HSM firmware

DEVICE AND A METHOD FOR PERFORMING A CRYPTOGRAPHIC ALGORITHM

CROSS-REFERENCE TO RELATED APPLICATIONS

The present application is a National Stage Filing of PCT International Application No. PCT/GB2023/050261 filed on Feb. 6, 2023, which claims priority to European application No. 22275013.5, filed with the European Patent Office on Feb. 7, 2022, which applications are incorporated herein by reference in their entirety.

FIELD

The present invention relates to a device and a method for performing a cryptographic algorithm. In particular, wherein the method is performed by a device comprising a first processor and a processing module.

BACKGROUND

Various devices may be used to perform cryptographic algorithms. For example, a Hardware Security Module (HSM) is a device that securely stores and manages cryptographic keys, and performs a set of cryptographic algorithms. A HSM may comprise both physical and non-physical properties that provide security. Non-physical security properties can include the use of encryption, i.e. the inclusion in the device of software or a physical component to perform encryption of the stored data. Physical security properties can include tamper switches triggered by physical access, and a tamper proof membrane surrounding the physical boundary of the device for example.

The set of algorithms supported by the HSM may be defined by a trusted party. For example, computer program code embodying the algorithms can be embedded in the HSM when manufactured by the trusted party, or can be provided by the trusted party as a whole or in part after manufacture, in the form of a download, an update, or plug-in.

To add a new cryptographic algorithm to the set of algorithms supported by the HSM device, the trusted party may define an interface to the new algorithm and translate the specification of the algorithm into executable code. An upgrade procedure is then carried out at the HSM by the trusted party, such that the new code is stored on the HSM. This upgrade procedure interrupts service from the HSM.

BRIEF DESCRIPTION OF THE FIGURES

Devices and methods in accordance with non-limiting embodiments will now be described with reference to the accompanying figures in which:

FIG. 4B shows a cryptographic engine according to an example;

FIG. 4C shows a mapping between the custom assembly language and the machine code instructions according to an example;

FIG. 4D shows a method performed by the HSM 31 according to an example;

FIG. 4E shows a masking mechanism according to an example;

Throughout the figures, the same reference numerals are used to refer to the same components or functionality.

DETAILED DESCRIPTION

Figure 1:
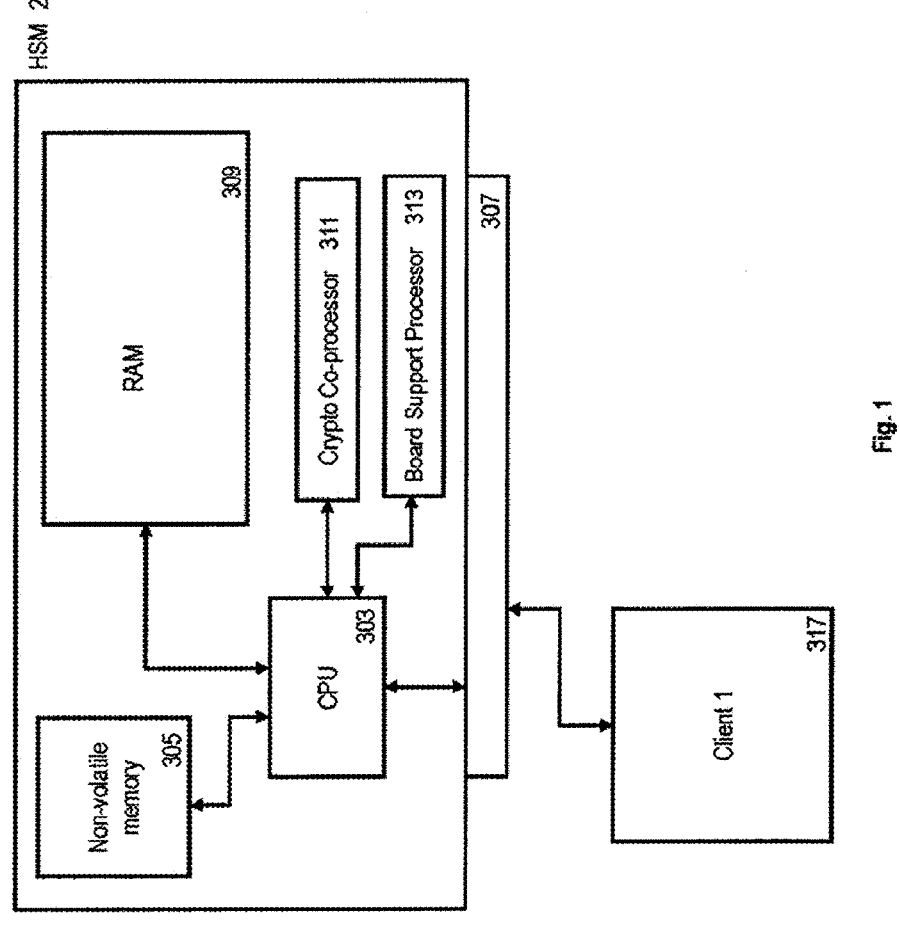
FIG. 1 is a schematic illustration of a Hardware Security Module (HSM) device 21 in accordance with an example.

According to a first aspect, there is provided a method performed by a device, the device comprising a first processor and a processing module, the method comprising:

obtaining, by the first processor, first data, the first data comprising a representation of computer program code that embodies a cryptographic algorithm;

obtaining, by the first processor, second data;

receiving, by the first processor, a request for a first mechanism to be performed, the request comprising information identifying the first mechanism, information identifying the first data as corresponding to a program, and information identifying the second data as corresponding to an input;

transmitting, by the first processor, to the processing module, a second request for the first mechanism to be performed, the second request comprising information identifying the first mechanism, information identifying the first data as corresponding to a program, and information identifying the second data as corresponding to an input; and executing, by the processing module, the program represented in the first data taking the second data as the input.

In one example, the processing module comprises a third processor implementing a first instruction set architecture, the first instruction set architecture comprising machine code instructions, and executing the program comprises using a subset of the machine code instructions.

In one example, the device is a Hardware Security Module (HSM). In one example, the processing module is a crypto co-processor.

In one example, the first processor and the crypto co-processor are physically separate, for example they are not integrated in the same physical package. In another example, the first processor and the crypto co-processor are integrated in the same physical package, in which the silicon implementations are physically separate. In some examples, the first processor, second processor and third processor are separately implemented in silicon in the same package. In one example, the first processor is separated in a different package to the second processor and third processor. In another example, the first processor and second processor are separated in a different package to the third processor.

In one example, the program is executed by the third processor. In one example, the subset of machine code instructions comprises instructions which have been designated as safe.

In one example, the information identifying the first data comprises a representation of the program in a custom assembly language, wherein; the custom assembly language comprises a plurality of instructions; and each instruction in the plurality of instructions is associated with a machine code instruction from the subset of machine code instructions.

In one example the plurality of instructions comprises only instructions that are associated with machine code instructions from the subset of machine code instructions. In one example, the machine code instructions in the subset of machine code instructions are designated as safe for use in a user-defined program. In one example, the designation of the instruction as safe is predetermined, based on a user selection or system operator definition.

In one example, the plurality of instructions in the custom assembly language comprises a first instruction, wherein the first instruction directly corresponds to only a first machine code instruction in subset of machine code instructions. In one example, when the program in the custom assembly language is executed by the third processor, only the first machine code is required to implement the first instruction.

In one example, the plurality of instructions in the custom assembly language comprises a second instruction, wherein the second instruction directly corresponds to a second machine code instruction and a third machine code instruction. In one example, when the program in the custom assembly language is executed by the third processor, only the second machine code and the third machine code are required to implement the first instruction.

In one example, the processing module comprises a plurality of hardware circuits, each instruction in the subset of machine code instructions is associated with a hardware circuit in the plurality of hardware circuits, and executing the program comprises using the plurality of hardware circuits. In one example, the plurality of instructions in the custom assembly language comprises instructions for: key transfer functions, key operations, chained mathematical operations, mathematical primitives and memory operations. In one example, the plurality of instructions consists of key transfer functions, key operations, chained mathematical operations, mathematical primitives and memory operations.

In one example, the custom assembly language comprises a set of cryptographic mechanisms and a fourth instruction; the fourth instruction comprises an indication of a first cryptographic mechanism in the set of cryptographic mechanisms, wherein the first cryptographic mechanism is associated with a first set of machine code instructions not included in the subset of machine code instructions; the program comprises the third instruction; and wherein executing the program comprises: executing the program using the first set of machine code instructions and the subset of machine code instructions.

In one example, the method further comprises: in response to the processing module receiving the second request; converting the representation of the program in the custom assembly language into machine code for execution by the third processor. In one example, the conversion is performed using an assembler.

In one example, the processing module comprises: an instruction memory configured to store machine code instructions corresponding the program; and a masking component comprising: a first input; and a second input, wherein: the first input of the masking component is coupled to an output of the instruction memory and the second input of masking component is configured to receive an indication that the program is being executed; and wherein, the masking component is configured to mask machine code instructions from the first instruction set architecture that are not part of the subset of machine code instructions in response to receiving the indication that the program is being executed.

In one example the mask converts values at bit positions into a machine code instruction in the subset of machine code instructions. In one example, the masking component is implemented in hardware.

In one example, the masking component comprises a third input, the third input configured to receive an indication that the first cryptographic mechanism is being used; and wherein:

the masking component is configured to mask machine code instructions from the first instruction set architecture that are not part of either: 1) the subset of machine code instructions or 2) the first set of machine code instructions in response to receiving the indication that the program is being executed and the first cryptographic mechanism is being used.

In one example, the method, further comprises:

performing a first determination in response to receiving the request for the first mechanism, the first determination comprising:

determining whether a first policy associated with the second data permits the second data to be used with the program represented in the first data, and determining whether a further policy associated with the computer program code permits the computer program code to be used with the second data; and if the first determination is successful, transmitting, by the first processor, to the processing module, the second request for the first mechanism to be performed.

In one example, the transmission is performed only if the determination is successful. In one example, the first determination is performed at the processing module.

In one example, the first determination further comprises determining whether the first policy permits the second data to be used in the first mechanism.

In one example, the first policy is a first access control list comprising a list of permissions relating to use of the second data.

In one example, the further policy is a third policy, and the third policy is a third access control list comprising a list of permissions relating to use of the program.

In one example, the method further comprises:

obtaining, by the first processor, third data, comprising a representation of output policy information;

wherein:

the request for the first mechanism to be performed further comprises information identifying the third data as corresponding to a second policy; and wherein: the method further comprises:

associating the second policy with output data from the program.

In one example, the output data is the encrypted derived key

In one example the first determination further comprises determining whether the first policy permits the second data to be used with the output policy in the third data.

In one example, the first determination further comprises determining whether a fourth policy associated with the output policy permits the output policy to be used with the program represented in the first data.

In one example, the method further comprises: obtaining fourth data; wherein the request further comprises information identifying the fourth data as corresponding to input data, and wherein the request further defines the role of the second data and the fourth data; wherein performing the first determination further comprises determining whether a fifth policy associated with the fourth data permits the fourth data to be used with the program represented in the first data.

In one example, the first determination further comprises determining whether the fifth policy permits the fourth data to be used with the second data and/or determining whether the first policy permits the second data to be used with the fourth data.

In one example, the first processor obtains the second data in an encrypted form. The first processor provides the processing module with the encrypted second data. The processing module decrypts the second data. In one example, the first processor obtains the first data in an encrypted form. The first processor provides the processing module with the encrypted first data. The processing module decrypts the first data. In one example, the processing module provides the output for the program to the first processor in an encrypted form.

In one example, the third processor is used by a single tenant at a time. In one example, the HSM device comprises multiple processing modules or a processing module comprising multiple third processors. The first processor or second processor may control the transmission of requests to the third processor so that no two tenant's programs are executed on the same third processor at the same time.

According to a second aspect, there is provided a method performed by a device, the device comprising a first processor and a processing module, the method comprising:

obtaining, by the first processor, encrypted input data;

providing, by the first processor, the encrypted input data and information indicating an operation to the processing module;

decrypting, by the processing module, the input data;

performing, by the processing module, the operation on the input data.

According to a third aspect, there is provided a carrier medium comprising computer readable code configured to cause a computer to perform any of the above methods. The methods are computer-implemented methods. Since some methods in accordance with embodiments can be implemented by software, some embodiments encompass computer code provided on any suitable carrier medium. The carrier medium can comprise any storage medium such as a CD ROM, a magnetic device or a programmable memory device, or any transient medium such as any signal e.g. an electrical, optical or microwave signal. The carrier medium may comprise a non-transitory computer readable storage medium.

According to a fourth aspect, there is provided a device comprising a first processor and a processing module, the first processor being configured to:

obtain first data, comprising a representation of computer program code that embodies a cryptographic algorithm;

obtain second data;

receive a request for a first mechanism to be performed, the request comprising information identifying the first mechanism, information identifying the first data as corresponding to a program, and information identifying the second data as corresponding to an input; and transmit to the processing module a second request for the first mechanism to be performed, the second request comprising information identifying the first mechanism, information identifying the first data as corresponding to a program, and information identifying the second data as corresponding to an input;

the processing module being configured to:

execute the program represented in the first data taking the second data as the input.

According to a fifth aspect, there is provided a device comprising a first processor and a processing module, the first processor being configured to obtain encrypted input data and provide the encrypted input data and information indicating an operation to the processing module, the processing module being configured to decrypt the input data and perform the operation on the input data.

FIG. 1 is a schematic illustration of a Hardware Security Module (HSM) device 21 in accordance with an example. The HSM 21 comprises a Central Processing Unit (CPU) 303, a non-volatile memory 305 and a working memory in the form of a Random Access Memory (RAM) 309. The RAM 309 is the operating memory of the CPU 303. The non-volatile memory 305 may include any form of non-volatile device memory such as flash, optical disks or magnetic hard drives for example. The non-volatile memory 305 may be physically secure and may be resistant to tamper by a third party, for example by the inclusion of physical security such as a membrane that covers the entire device, that cannot be removed without destroying the underlying physical hardware, thus making it un-usable. The CPU 303 (also referred to as the "main processor") is in wired bi-directional communication with the non-volatile storage 305 and the RAM 309.

Computer program code is stored in the non-volatile memory 305. When executed, a program is represented as a software product, or process, in the RAM 309. The CPU 303 comprises logic circuitry that responds to and processes instructions in code in the working memory, RAM 309. The below description refers to "firmware", which is a program comprising a set of computer instructions. The firmware comprises machine code stored in the non-volatile memory 305 on the HSM 21. Also stored in the non-volatile memory 305 on the HSM 21 are any components necessary to execute the firmware, including runtime system files. When executed, a copy of the firmware machine code is stored in the working memory, RAM 309. The "firmware process" is the instance of the firmware that is being executed, comprising the machine code in the RAM 309.

The CPU 303 runs an operating system, for example a Linux operating system. The operating system comprises system software that manages the hardware and software resources of the HSM device 21, and acts as an intermediary between the firmware and the HSM hardware.

In the example of FIG. 1, the firmware comprises computer instructions embodying a set of one or more cryptographic algorithms. For example, the firmware comprises computer instructions embodying one or more of the following cryptographic algorithms: cryptographic key generation; key derivation; encryption; decryption; and digital signature algorithms (for example digital signing or validation of a digital signature). The firmware can be embedded in the non-volatile memory 305 of the Hardware Security Module (HSM) 21 when the HSM 21 is manufactured by a trusted party, or can be provided by the trusted party as a whole or in part after manufacture. For instance, the firmware can be introduced by the trusted party as a computer program product, which may be in the form of a download. Alternatively, modifications to existing firmware can be made by the trusted party by an update or plug-in.

The HSM device 21 may be located within a larger system. For example, the HSM 21 may be communicatively coupled to a computer or server device in the larger system through an interface 307, which comprises a communication link to the computer or server device. For example, the HSM device 21 can be a PCI express card directly plugged into the computer or server device, or the HSM device 21 can be communicatively connected to the computer or server device by a USB connection. In use, the HSM device 21 receives client requests through interface 307. The term "client" is used throughout the description to refer generally to a user of the HSM device 21.

The HSM 21 may be located in the client system. In this case, the client system has a dedicated local HSM 21 device. The HSM 21 is communicatively coupled to a general computer 317 in the client system directly through interface 307, for example the HSM device 21 can be communicatively connected to the computer 317 in the client system by a USB connection.

Alternatively, the HSM 21 may be located in a host system which is separate to the client computer 317. The host system may be a service provider system for example. In this case, the client computer 317 communicates with a computer or server device in the host system. The HSM device 21 is coupled to the computer or server device in the host system through interface 307. For example, the HSM device 21 can be a PCI express card directly plugged into the computer or server device in the host system, or the HSM device 21 can be communicatively connected to the computer or server device by a USB connection. The client device (e.g. the client computer 317) is thus communicatively coupled to the HSM device 21 through the computer or server device in the host system. Communication between the client device and the host computer or server device may be performed via an internet connection for example. Although only a single client computer 317 is shown in FIG. 1, it is to be understood that two or more clients can use the HSM device 21 in this case.

The non-volatile memory 305 may also store data items such as one or more cryptographic keys associated with the client. For example, one or more master keys associated with the client may be stored. The master key or keys define a "security world" associated with the client, in which the HSM device 21 is enrolled. The term "security world" refers to one or more security appliances (for example HSMs), or parts of a security appliance which share at least one private key and are configured to safeguard cryptographic keys and perform a set of cryptographic algorithms. The master keys stored on the non-volatile data memory 305 may comprise a module security world key (KMSW) key. This is a symmetric key used as a root for other application keys. A number of cryptographic application keys are associated with the client for use with the cryptographic algorithms embodied in the firmware. The application keys may be securely stored outside of the HSM device 21 using the KMSW key. In this case, the application keys may be encrypted using Triple-DES encryption for example.

A Hardware Security Module (HSM) can enforce a policy on the use of cryptographic keys. This may be implemented by cryptographically binding a key to an Access Control List (ACL) representing the policy in the form of a list of operations that it may participate in, together with the authorisations required (if any) for those operations. When a user requests some operation using an application key, the ACL of the application key is searched for the operation. Only if it is found, and only if any authorisations required are satisfied, does the operation proceed. The key and ACL are encrypted with the KMSW key. This forms a "key blob". Encrypted key blobs can be stored outside the HSM device 21, either on smart cards or server storage such as hard discs within the host system for example, and loaded onto the HSM device 21 when needed. Encrypted key blobs may also be stored on the HSM device 21, in the non-volatile data storage 305.

The application keys associated with the client are used to perform one or more cryptographic algorithms supported by the HSM 21. When a client request is received to perform an algorithm, the relevant application key or keys are retrieved. The Access Control List (ACL) associated with the relevant application key or keys are checked to confirm the key is permitted to be used when performing the algorithm. If the requirements of the ACL are satisfied, then the application key may then be used by the Hardware Security Module (HSM) to perform one or more cryptographic algorithms, including performing various encryption and decryption algorithms, and performing digital signature algorithms.

The HSM device 21 further comprises a Board Support Processor 313. Board Support Processor 313 is configured to communicate with a plurality of on-board sensors, monitoring the operation of the CPU 303 and the other hardware components of the Hardware Security Module (HSM)

device 21. The sensors may include but are not limited to CPU and/or board temperature sensors, voltage and/or current sensors.

The HSM device 21 further comprises a crypto co-processor 311. The crypto-coprocessor 311 is in wired bi-directional communication with the CPU 303 (also referred to as the "main processor"). The crypto co-processor 311 is configured to perform various cryptographic operations in hardware, including various standard encryption and decryption algorithms and digital signature algorithms. For example, the crypto co-processor 311 is configured to provide at least one of: a public key hardware accelerator (PKSA), a random number generator, an advanced encryption standard accelerator (AESA) and a message digest hardware accelerator (MDHA). The crypto co-processor 311 comprises an application-specific integrated circuit (ASIC). The ASIC comprises fixed logic circuitry configured to perform the operations. In other words, in the crypto co-processor 311, one or more cryptographic operations are implemented directly in hardware in a fixed manner. Examples of the crypto co-processor 311 include: the NXP C291 Crypto Coprocessor, the NXP C292 Crypto Coprocessor, the NXP C293 Crypto Coprocessor, the MaxLinear 9240 Data Compression and Security Coprocessor, and the Intel QuickAssist Adapter 8950.

The crypto co-processor 311 is configured to: 1) receive a request to perform a cryptographic operation from the CPU 303 and 2) return the output of the operation to the CPU 303. Likewise, the CPU 303 is configured to off-load various operations to the crypto co-processor 311. The crypto co-processor 311 is separate to the processor 303, and is configured to perform certain operations in hardware, meaning that these operations may be performed more efficiently on the crypto co-processor 311 than on the CPU 303. Operations may be performed on the crypto co-processor 311 concurrently with operations performed on the processor 303. In an example the CPU 303 uses a PowerPC instruction set, which offloads complex mathematical operations to the crypto co-processor 311.

Various other components may be included in the HSM which are not shown in FIG. 1.

In an example the firmware of the HSM 21 supports a number of cryptographic operations including a key derivation operation. The key derivation operation is parameterised by a mechanism identifier and a collection of input keys. The mechanism identifier identifies computer program code in the firmware on the HSM device 21 embodying the cryptographic algorithm. The effect of the operation is to create a derived cryptographic key in a manner defined by the mechanism identifier.

Figure 2:
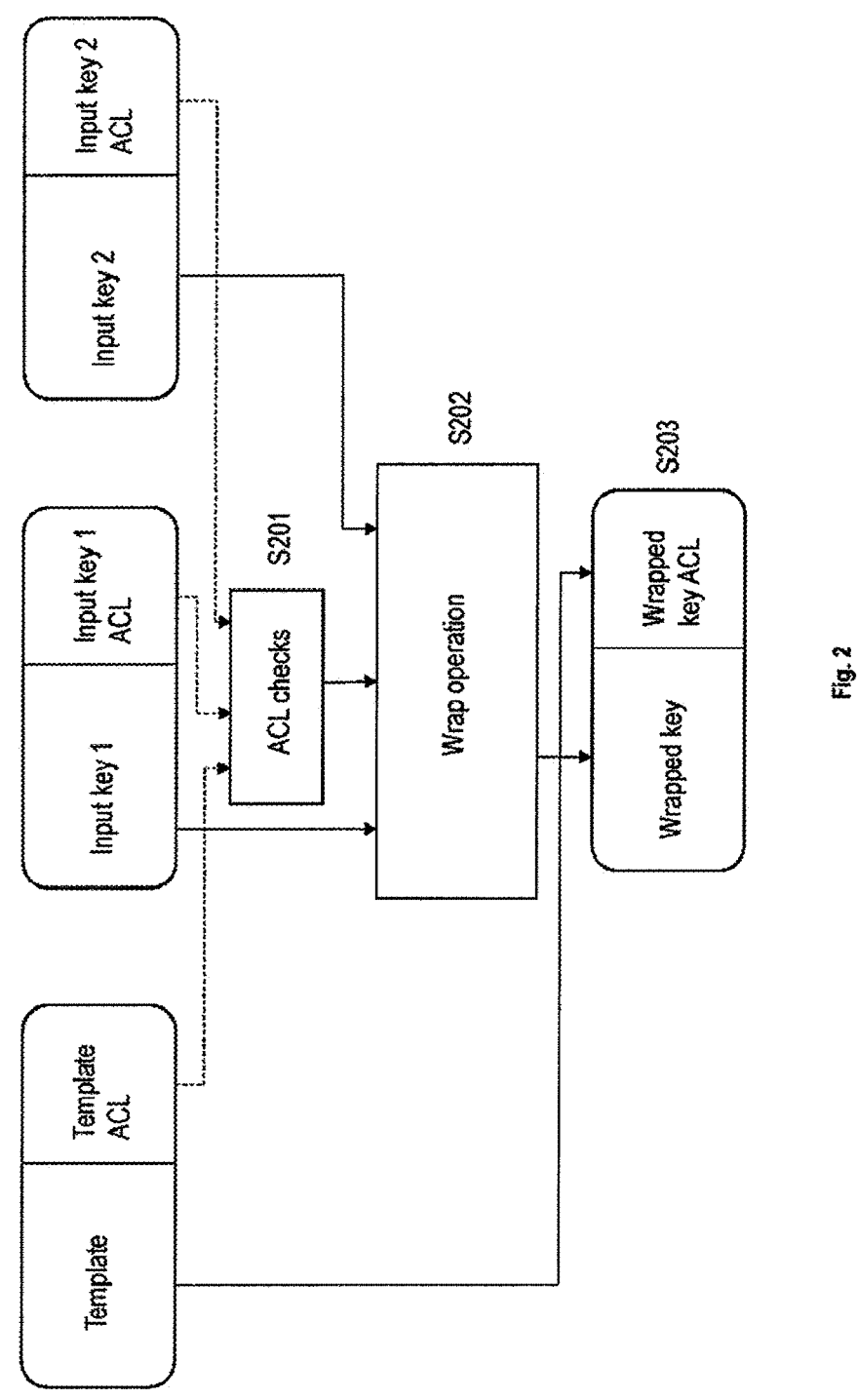
FIG. 2 shows an example key wrapping algorithm, in which a first input key is encrypted under a second input key.

FIG. 2 shows an example key wrapping algorithm, in which a first input key is encrypted under a second input key. In FIG. 2 the mechanism used to derive a cryptographic key is the key wrapping algorithm. Initially, a template and the two input keys are loaded into the RAM space of the firmware process in the HSM device 21. They may be imported, or decrypted from a wrapped form, or may be the result of earlier key derivation operations for example.

A client, or an application acting on behalf of a client, requests that the wrap mechanism be performed, in a command, "Cmd DeriveKey", comprising an identifier of the mechanism to be performed (the wrap mechanism in this case) and a reference to the keys to be used, including the template. This command is sent to the HSM device 21. The command "Cmd DeriveKey" takes as argument the mechanism identifier and the list of two or more keys, and produces a result key. For the operation illustrated in FIG. 2, the command comprises a wrap mechanism identifier.

Computer program code in the firmware on the HSM device 21 is identified by the received "Cmd_DeriveKey" command and executed by the CPU 303 (also referred to as the main processor). This code embodies the steps S201 and S203 illustrated in FIG. 2. Computer program code in the firmware on the HSM device 21 embodying the wrap mechanism, comprising a wrap algorithm encrypting a base key, is identified from the mechanism identifier. This code embodies the step S202 illustrated in FIG. 2. The code may be identified from a table on the HSM device 21 associating numeric constants corresponding to the "Cmd_DeriveKey". The memory address of the corresponding code in the RAM 309 is then retrieved.

The interpretation of the input keys depends on the mechanism. Each key is assigned to a particular role. This may be defined by the order they are presented in for each mechanism—for example, for the wrap key mechanism, the first "key" in the list is taken to be the template "key", the second is the key to be wrapped (the base key), and the third is the wrapping key (the wrap key). For all "Cmd DeriveKey" commands, it may be defined that the first "key" is always a template "key", regardless of the mechanism specified. As explained later, alternative ways of defining the various key roles may be used.

Although the term "key" is used to refer to the template, in fact the template "key" is not a cryptographic key, rather a data packet comprising Access Control List (ACL) information for the output key. The template also has its own ACL, which specifies how the template may be used.

The operation must be permitted by the ACL of each input key and template that participates in it. In S201, the ACL of each input key and template "key" is checked to determine that it permits the key to be used in a Derive Key operation using the wrap mechanism, and in the role to which it has been assigned. Moreover, each input key's ACL may constrain the type and value of the other keys that participate in the operation. For example, the input key to be wrapped (the base key) may constrain the input key it is wrapped under (the wrap key), in order to prevent it being wrapped under an unauthorised key. This is also checked in S201.

If the check of the ACL of each input key and template is successful, the wrap mechanism is performed in S202. The computer program code in the firmware on the HSM device 21 embodying the wrap mechanism, i.e. an encryption algorithm, is executed by the CPU 303 (also referred to as the main processor), taking the input key 1 as the base key and the input key 2 as the wrap key. Finally, the derived key (the wrapped key) is cryptographically bound to an ACL in S203. Cryptographically binding the derived key to the ACL includes formatting the derived key and the ACL into a single data stream and encrypting the single data stream using a cryptographic key stored by the HSM device 21. In an example this key is referred to as the "binding key". The ACL is supplied in the special-purpose input "key" called the template. Thus any or all of the input keys participating in the operation may constrain the ACL of the derived key by constraining the template "key".

In the above described manner, various operations resulting in an output key, or derived key, may be performed. However, the operations that may be performed are limited to those for which the computer program code is stored in the firmware on the HSM device 21. In particular, a wrap algorithm may only be performed if computer program code embodying the wrap algorithm is already stored in the firmware on the HSM device 21.

A user may wish to perform an algorithm for which computer program code is not stored in the firmware on the HSM device 21. Allowing the user to provide computer program code embodying the desired algorithm in the form of an update to the firmware would compromise the security of the HSM device 21.

In order to avoid this, a trusted party may define an interface for the new algorithm and translate the specification of the new algorithm into executable code. This new code may need to be tested and signed before delivery, in order to ensure security of the HSM device is not compromised. An upgrade procedure is then carried out at the HSM by the trusted party. However, this procedure interrupts service from the HSM. It may also involve the client presenting physical authorisation tokens to reinitialise the HSM before it can return to service for example, which can be inconvenient.

Furthermore, combining multiple operations for deriving keys can present difficulties, even if the code for each separate operation is stored on the HSM device 21. For example, where it is desired that the output key from one operation is taken as an input key for a subsequent operation, generating the policies for the subsequent operation can be problematic. For example, where the subsequent operation uses a wrap mechanism, and where the wrapping key is to be the output of a previous operation, the ACL of the base key (the key to be wrapped) would need to be generated after the previous operation is performed, to constrain the wrapping key. Furthermore, the ACL of the wrapping key would need to permit the subsequent operation. In order to maintain security, it would also be desirable for the ACL of the wrapping key to permit the subsequent operation with the desired mechanism and no other mechanism, in order to avoid intermediate use of the key. Connecting multiple operations in order to generate a cryptographic algorithm in this way quickly becomes complex. Furthermore, a potential security weakness arises at each connection, since intermediate use could be made of the output keys.

Finally, in the above example the specified operation was executed by the CPU 303 (also referred to as the main processor). In this case the CPU 303 handles unencrypted (e.g. plain text) cryptographic keys while executing the desired operations. In an example the HSM device 21 is used as part of a deployment (e.g. a "cloud" deployment) that allows multiple tenants to use the functionality of the HSM device 21. In this case a single processor (e.g. CPU 303) could handle unencrypted cryptographic keys from multiple different parties (who may not necessarily consent to their secret information being shared with each other). Consequently, the approach described above could give rise to a security vulnerability.

Figure 3:
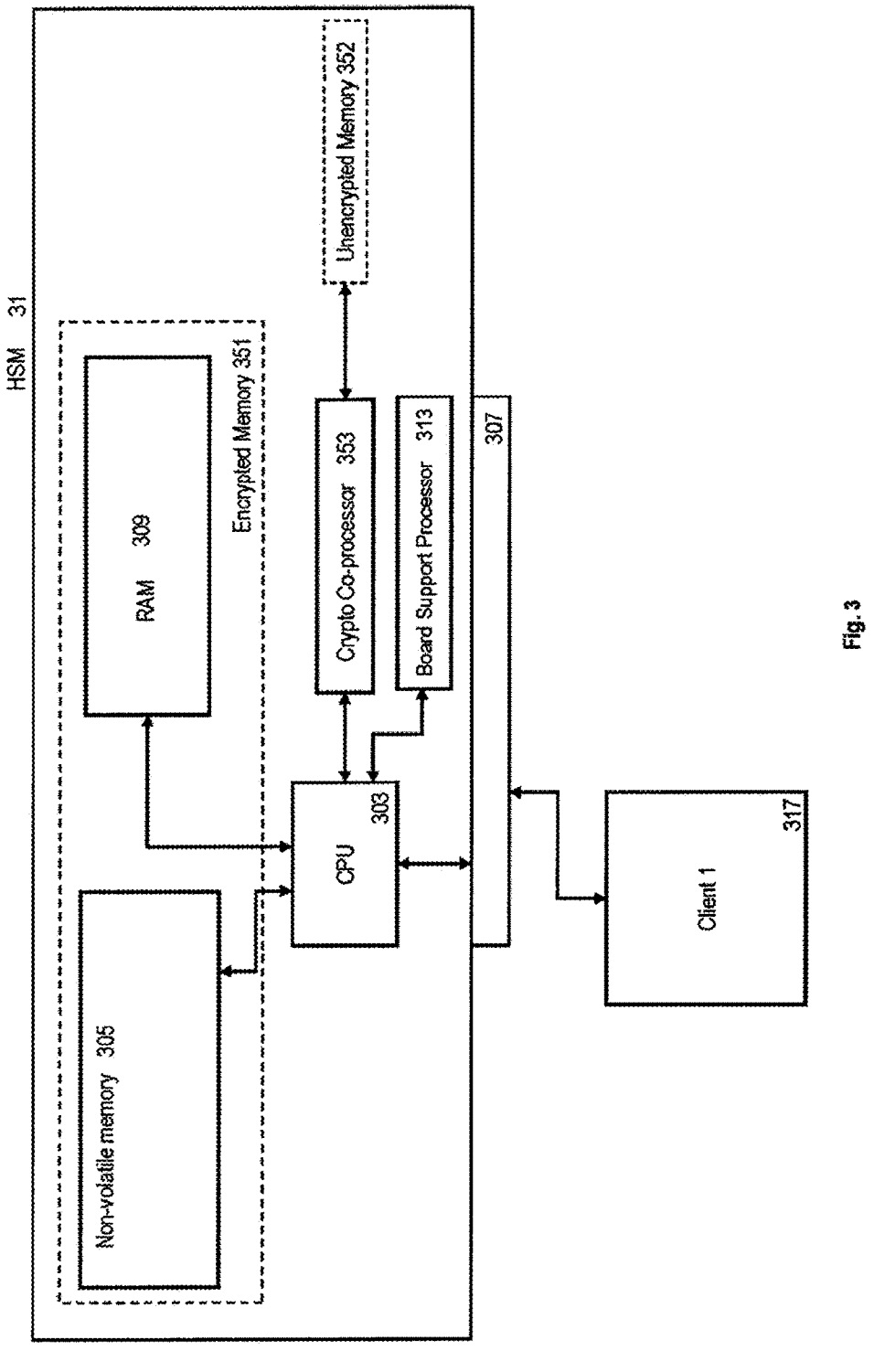
FIG. 3 is a schematic illustration of a Hardware Security Module (HSM) device 31 according to an embodiment.

FIG. 3 is a schematic illustration of a Hardware Security Module (HSM) device 31 according to an embodiment. FIG. 3 uses same reference numbers as FIG. 1 to denote same components. In particular, FIG. 3 shows a CPU 303 (also referred to as the "main processor"). As known in the art, an Instruction Set Architecture (ISA) is an abstract model that defines the instructions supported by a processor (i.e. the instructions that can be performed by the processor). The CPU 303 is a processor configured to perform general purpose computation. That is to say, the CPU 303 implements an Instruction Set Architecture (ISA) that contains instructions allowing the CPU 303 to operate in a Turing-complete manner and perform general computation. In an example, the CPU 303 implements one of: the RISC-V, MIPS, or Intel x86 Instruction Set Architectures (ISA). In an example, the CPU 303 implements a PowerPC Instruction set.

In FIG. 3 the non-volatile memory 305 forms part of an encrypted memory 351. The HSM 31 of FIG. 3 comprises encrypted memory. Encrypted memory includes components that store (persistently and/or non-persistently) encrypted data. Consequently, throughout the description encrypted memory is used to refer to a memory component in which the data is stored in an encrypted way. In the example shown in FIG. 3, the encrypted memory 351 comprises the non-volatile 305 memory and the Random Access Memory 309. In this case, the data being stored in encrypted memory 351 is encrypted before being transmitted to, and stored on, the encrypted memory 351. Advantageously, by encrypting data transmitted to the encrypted memory 351, the security of the HSM 31 is improved. In particular, encrypting data that is stored on memory external to the CPU 303 (such as the non-volatile memory 305 and the RAM 309) prevents a malicious party with physical access to the HSM 31 from obtaining plain text data.

FIG. 3 also shows a crypto co-processor 353 communicatively coupled to the CPU 303. The crypto co-processor 353 is configured to perform various operations involving cryptographic keys as will be discussed in more detail below. The crypto co-processor 353 is also communicatively coupled to an unencrypted memory 352.

The unencrypted memory 352 is a memory component that is configured to store unencrypted data. In an example, the unencrypted memory 352 comprises a second Random Access Memory (not shown) for non-persistent storage of data. In an example, the crypto co-processor 353 is implemented using programmable logic including, but not limited to, a Field Programmable Gate Array (FPGA), discussed in more detail below. In an example the crypto co-processor 353 and the unencrypted memory 352 are implemented on the same physical device (i.e. within the same package).

In a further example, unencrypted memory comprises a memory component that presents an interface for receiving and providing unencrypted data. In the further example, the unencrypted memory comprises an interface component communicatively coupled between the crypto co-processor 353 and a memory component. Data that is written to, or read from, the interface is unencrypted. However, the unencrypted data is encrypted by the interface to generate encrypted data. The encrypted data is then stored in the memory component. In this way, the crypto co-processor 353 "views" the memory component as being "unencrypted memory" since the interface between the crypto co-processor 353 and the unencrypted memory communicates unencrypted data. However, in this further example the data that is actually stored in the memory component is encrypted. Optionally, the memory component is not in the same physical device as the crypto co-processor (i.e. the memory component is an "off-device" memory component). In this case an external memory can be used while still maintaining security of the system. In an example, the interface component is provided in the same physical device as the crypto co-processor 353 such that any data communicated to the memory component (e.g. over communication busses) is encrypted.

Figure 4A:
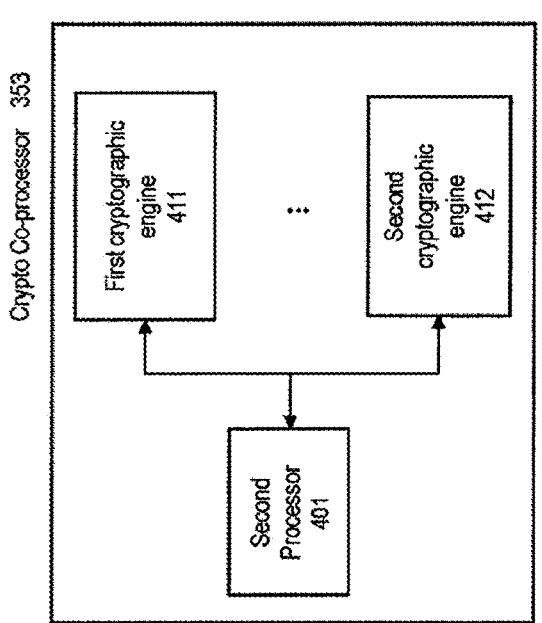
FIG. 4A shows a crypto co-processor 353 according to an example.

FIG. 4A shows a crypto co-processor 353 according to an example. In particular, FIG. 4A shows a crypto co-processor 353 comprising a second processor 401. The second processor 401 is communicatively coupled to a first cryptographic engine 411 and a second cryptographic engine 412.

The second processor 401 is also communicatively coupled to the CPU 303 and the unencrypted memory 352.

As will be discussed in more detail below, the second processor 401 is configured to receive a request perform a user defined program, such as a request to generate a cryptographic key. In an example the request comprises information identifying a first cryptographic key (e.g. a key handle of an input cryptographic key), information identifying a second cryptographic key (e.g. a key handle of a second input cryptographic key) and information identifying a program (i.e. a set of steps to be performed by a processor) in order to generate the cryptographic key. The second processor 401 is configured to transmit the request to one of the first cryptographic engine 411 or the second cryptographic engine 412 where the program is executed (i.e. the set of steps/instructions specified in the program are performed).

In an example where the second processor 401 is a multi-threaded processor (e.g. supports a plurality of computational threads of activity), each thread is associated with a cryptographic engine, such that requests generated by a first thread on the second processor 401 are transmitted to the first cryptographic engine 411 and requests generated by a second thread on the second processor 401 are transmitted to the second cryptographic engine 412 etc.

Each cryptographic engine is configured to perform various cryptographic operations including but not limited to deriving a new cryptographic key according to a supplied program. In an example, each cryptographic engine is configured to accelerate cryptographic operations by providing a hardware implementation of at least some cryptographic mechanisms. In an example each cryptographic engine includes one or more of: a public key hardware accelerator (PKSA), a random number generator, an advanced encryption standard accelerator (AESA) and a message digest hardware accelerator (MDHA).

Although FIG. 4A shows two cryptographic engines (i.e. a first cryptographic engine 411 and a second cryptographic engine 412) it will be appreciated that any number of cryptographic engines greater than or equal to one may be provided in other examples.

Figure 4B:
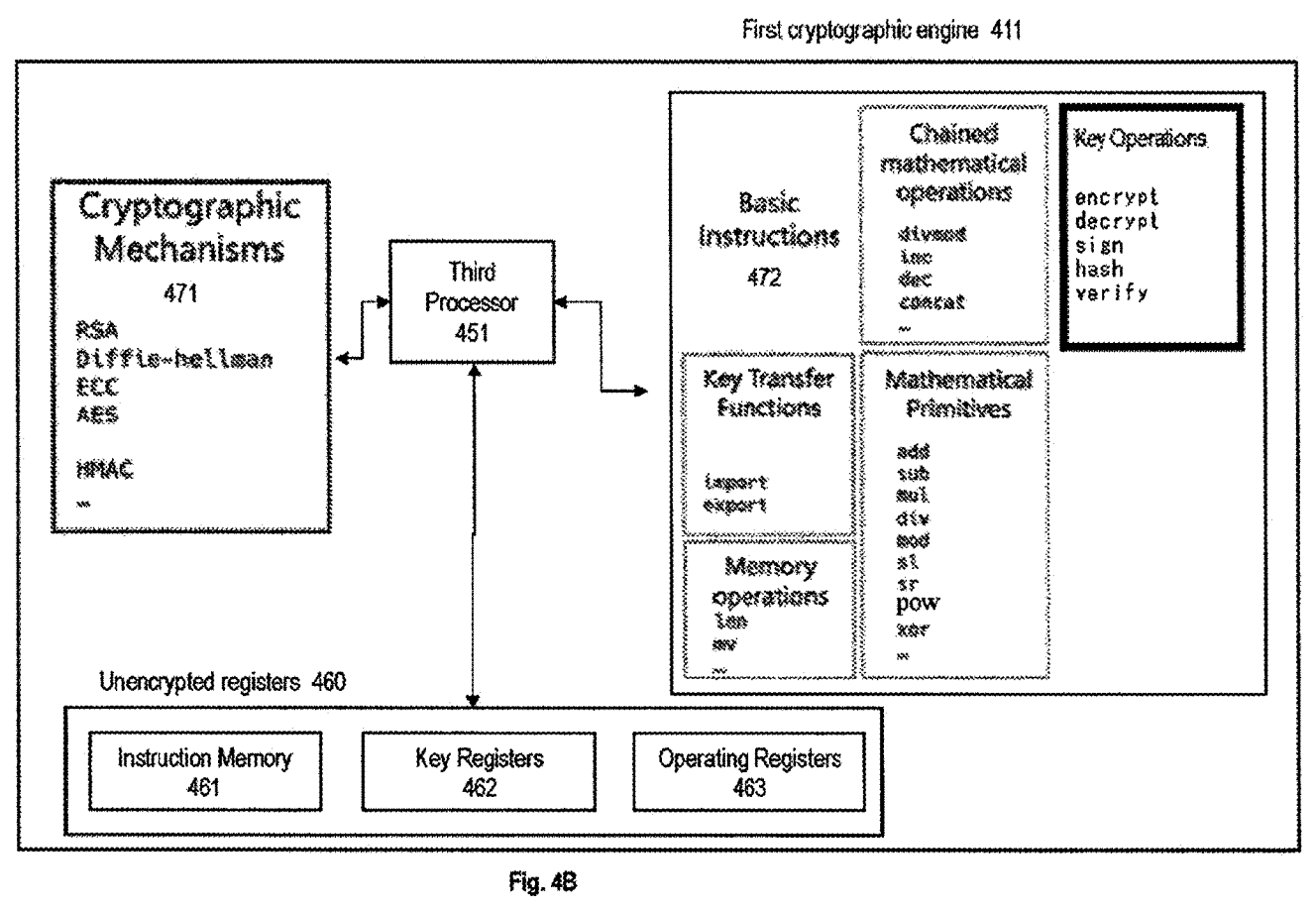

FIG. 4B shows a cryptographic engine according to an example. The first cryptographic engine 411 comprises a third processor 451. The third processor 451 is communicatively coupled to a set of cryptographic mechanisms 471 and a set of unencrypted registers 460. A register provides non-persistent storage for data. The registers are "unencrypted registers" in the sense that they store data that is not encrypted. The relevance of whether the data is encrypted and unencrypted will become apparent from the description below, where it will be seen that some examples provided herein provide clear separation of encrypted data and unencrypted data when programmatically deriving a cryptographic key, achieving improved security and reducing vulnerabilities. The set of unencrypted registers 460 comprises: an instruction memory 461, key registers 462 and operating registers 463. The instruction memory 461 is configured to store the program instructions to be executed by the third processor 451. As will be discussed in more detail below, in an example the instructions to be executed by the third processor 451 are contained within a program specified by the client and sent by the client to the HSM device 31. The key registers 462 are configured to store data representing (unencrypted) cryptographic keys. The operating registers 463 are configured to store data that is generated and used while executing the program (e.g. intermediate values).

The third processor 451 is associated with a first Instruction Set Architecture (ISA). The first Instruction Set Architecture (ISA) comprises the instructions that can be performed by the third processor 451. The instructions in the first Instruction Set Architecture (ISA) are also referred to as the "machine code instructions". In an example, each machine code instruction in the first Instruction Set Architecture (ISA) is uniquely associated with an opcode (abbreviation for operation code, a.k.a. instruction machine code). The opcodes are used by the hardware implementation of the third processor 451 to identify the operation to be performed. Based on the opcode, the third processor 451 accesses hardware resources to perform the required instruction.

Optionally, the third processor 451 is a Reduced instruction Set processor. Optionally, the third processor 451 implements a RISC-V instruction set architecture.

In an example the first instruction set architecture supported by the third processor 451 includes, but is not limited to, machine code instructions such as: "ADD" (e.g. to add two operands), "AND" (e.g. to logically AND two operands), "JMP" (e.g. to perform an unconditional jump by changing a program counter), "SHL" (e.g. to logically shift all the bits of an operand), and "XOR" (e.g. to logically Exclusive-OR two operands).

Each machine code instruction in the first Instruction Set Architecture (ISA) is associated with a hardware implementation. That is to say, there is provided a hardware circuit in the third processor 451 to perform each instruction in the first Instruction Set Architecture (ISA). For example, there is a hardware circuit to add two operands which is used when performing the "ADD" instruction, and there is a hardware circuit to perform determine the logical Exclusive-Or of two operands, which is used when performing the "XOR" instruction.

As will be discussed in more detail below, there is provided a mechanism by which a user can execute user-defined code in the HSM 31 (specifically in the third processor 451). This could be used, for example, to programmatically generate a cryptographic key according to a desired algorithm generated by a user.

Allowing a user to execute user-defined code in the HSM 31 provides flexibility. However allowing a user to use all of the machine code instructions provided by the third processor 451 in an uncontrolled way could result in a security vulnerability.

In order to solve this problem there is provided a first set of basic instructions 472. The first set of basic instructions 472 are assembly instructions and form a custom assembly language. As known in the art, an assembly language is a low-level programming language in which there is a strong correspondence between the instructions in the language and the machine code instructions. In an example, there is a 1-to-1 or a 1-to-many correspondence between instructions in the first set of basic instructions 472 and instructions in the first instruction set architecture.

FIG. 4C shows a mapping between the custom assembly language and the machine code instructions according to an example. In particular, FIG. 4C shows a representation of a first Instruction Set Architecture (ISA) 491 supported by the third processor 451. The instructions shown in the first Instruction Set Architecture (ISA) 491 are for illustration only, and it is emphasized that the first Instruction Set Architecture (ISA) 491 may contain different instructions in different examples. FIG. 4C also shows the first set of basic instructions 472 included in the custom assembly language. The instructions shown in the first set of basic instructions 472 are for illustrative purposes only, and it is emphasized that the first set of basic instructions 472 may contain different instructions in different examples.

In an example, there is a 1-to-1 mapping between an assembly instruction from the first set of basic instructions 472 and a machine code instruction in the first instruction set architecture 491. For example, there is a direct mapping from the "ADD" assembly instruction to the "ADD" machine code instruction. Likewise there is a direct mapping between the "XOR" assembly instruction and the "XOR" machine code instruction.

The first set of basic instructions 472 also comprises "macro" instructions. Macro instructions are assembly instructions that make use of two or more machine code instructions specified in the first instruction Set Architecture 491. For example, the "CONCAT" assembly instruction (for concatenating two operands) maps to (or in other words, makes use of) the Shift Left ("SHL") machine code instruction and the Exclusive-OR ("XOR") machine code instruction. This is because, in one example, a concatenation of two inputs is performed by shifting a first input left by a number of bits and performing an Exclusive-Or operation on the bit-shifted first input and the (un-shifted) second input.

The instructions in the first of basic instructions 472 comprise the instructions that can be used by the user-defined program that is to be executed by the third processor 451. The assembly instructions in the first set of basic instructions 472 map to a subset of instructions in the first instruction set architecture 491. For example, in FIG. 4C, the first set of basic instructions 472 map to the subset of instructions in the first instruction set architecture 491 comprising: "ADD", "SHL" and "XOR".

In an example, the first set of basic instructions 472 map (i.e. are implemented using) a subset of instructions in the first instruction set architecture 491 that have been approved for use in user-defined algorithms. Optionally the approved machine code instructions are selected by a system implementer.

In an example, a machine code instruction in the first instruction set architecture 491 is approved for use in user-defined algorithms if execution of the instruction represents a low security risk. For example, it may be determined that there is a low security risk from a user using the "ADD" machine code instruction as part of their user-defined algorithm. As a result, the "ADD" machine code instruction can be added to the subset of machine code instructions that instructions in the first set of basic instructions 472 can make use of. Assembly instructions can then be added to the first set of basic instructions 472 that make use of the "ADD" machine code instruction. As discussed above, use could take the form of a direct mapping (i.e. providing an assembly instruction with the same functionality as the "ADD" machine code instruction). Alternatively, the "ADD" machine code instruction could be used as part of a macro instruction in which the assembly instruction makes use of a plurality of machine code instructions including the "ADD" machine code instruction.

In contrast, it may be considered that the "JMP" machine code instruction represents a high security risk since a user-defined program could use this machine code instruction to manipulate, the behaviour of the third processor 451. Consequently, the "JMP" machine code instruction is not included in the subset of first instruction set architecture 491 instructions that can be used by the first set of basic instructions 472 and the first set of basic instructions 472 does not comprise any instructions that make use of the "JMP" machine code instruction.

In an example the desired algorithm (to be executed by the third processor 451) is specified in the custom assembly language (either by being written directly by the user in the custom assembly language or by being written in another programming language and being converted by a compiler into the custom assembly language). As a result, even though the third processor 451 can perform a "JMP" instruction, this functionality is not exposed to the user writing the user-defined algorithm, since there are no assembly instructions in the first set of basic instructions 472 that make use of the "JMP" instruction.

In this way, user-defined algorithms can be performed safety by the HSM 31 since only "safe" machine code instructions can be used as part of the user-defined program. However, it will be appreciated that these instructions can be combined in any arbitrary way in the desired algorithm generated by a user, thereby enabling a user to perform various algorithms on the HSM 31, for example for generating a cryptographic key.

Furthermore, each machine code instruction in the first instruction set 491 is directly implemented in hardware. Consequently, by virtue of each assembly instruction in the first set of basic instructions 472 being implemented using one or more machine code instructions, each of the assembly instruction in the first set of basic instructions 472 is accelerated in hardware and provides an efficient implementation. In this way the first set of basic instructions 472 exposes an interface for accelerated hardware.

Returning to FIG. 4B, in an example the first basic set of instructions 472 (i.e. the assembly instructions) supported by the third processor 451 comprises key transfer functions, key operations, memory operations, chained mathematical operations and mathematical primitives.

Key transfer functions relate to a set of instructions that can be accessed to move and/or transfer cryptographic keys. Key transfer functions include:

1. IMPORT. The IMPORT instruction takes at least one argument including the cryptographic key to be imported into the cryptographic engine. In response to receiving machine code instructions corresponding to the IMPORT (assembly) instruction the third processor 451 stores the cryptographic key to be imported into the key registers 462.
2. EXPORT. The EXPORT instruction takes at least one argument including the cryptographic key to be exported from the cryptographic engine to the second processor 401. In response to receiving the EXPORT command the third processor 451 communicates the cryptographic key to be exported to the second processor 401.

Key operations relate to a set of instructions that make use of cryptographic keys. Key operations include:

1. ENCRYPT. The ENCRYPT instruction takes a plurality of arguments, including but not limited to: the data to be encrypted, a cryptographic key (to encrypt the data with), and information identifying a cryptographic mechanism to be used to encrypt the data. When machine code corresponding to the ENCRYPT instruction is executed by the third processor 451, the third processor 451 encrypts the data using the cryptographic key according to the specified cryptographic mechanism. As will be discussed in more detail below, a cryptographic mechanism represents a process/technique to be used when performing the cryptographic operation. For example there are many different techniques that could be used to encrypt data. For example, data could be encrypted according to the RSA algorithm. In this case, the cryptographic mechanism is RSA. Similarly, data could be encrypted according to the Advanced Encryption Standard (AES) technique. In this case, the cryptographic mechanism is AES.

2. DECRYPT. The DECRYPT instruction takes a plurality of arguments, including but not limited to: the data to be decrypted, a cryptographic key (to decrypt the data with), and information identifying a cryptographic mechanism to be used to decrypt the data.

3. SIGN. The SIGN instruction takes a plurality of arguments, including but not limited to: the data to be signed, the destination register to store the signature, the cryptographic key to be used when signing the data, and the cryptographic mechanism to be used when generating the signature.

4. HASH. The HASH instruction takes a plurality of arguments, including but not limited to: information indicating the data to generate a hash from, information identifying the destination where the hash is to be outputted and a hashing mechanism used to hash the input data.

5. VERIFY. The VERIFY instruction is the dual of the SIGN operation and is used to verify a signature.

Memory operations relate to a set of instructions that can be used to obtain information associated with the unencrypted registers 460. Memory operations include:

1. LEN. The LEN instruction take at least two arguments: the variable stored in memory for which information is to be obtained, and information identifying a register in which to store the result of the operation. In response to receiving the LEN instruction, the third processor 451 determines the length (e.g. the number of bytes) that are used to store the variable and stores the result in the specified register.

2. MV. The MV instruction takes two arguments: a first address of a register to copy data from, and a second address of a register to copy the data to. In response to receiving the MV instruction, the third processor 451 moves the data stored in the first address to the second address.

Mathematical primitives relate to a set of instructions that can be used to manipulate data according to a mathematical operation. In an example at least some of the mathematical primitive instructions correspond to single machine code instructions that can be achieved using a single hardware circuit. Mathematical operations include:

1. ADD. The ADD instruction takes three arguments: a first data value, a second data value and information identifying an operating register 463 in which the output is to be stored. In response to receiving machine code instructions corresponding to the ADD instruction, the third processor 451 performs signed addition, by adding the first data value to the second data value and stores the output in the specified operating register.

2. SUB. The SUB instruction takes three arguments: a first data value and a second data value and information identifying an operating register 463 in which the output is to be stored. In response to receiving machine code instructions corresponding to the SUB instruction, the third processor 451 performs signed subtraction, by subtracting the second data value from the first data value and stores the output in the specified operating register.

3. MUL. The MUL instruction takes three arguments: a first data value and a second data value and information identifying an operating register 463 in which the output is to be stored. In response to receiving machine code instructions corresponding to the MUL instruction, the third processor 451 multiplies the first data value by the second data value and stores the output in the specified operating register.

4. DIV. The DIV instruction takes three arguments: a first data value and a second data value and information identifying an operating register 463 in which the output is to be stored. In response to receiving machine code instructions corresponding to the DIV instruction, the third processor 451 divides the first data value by the second data value and stores the output in the specified operating register.

5. MOD. The MOD instruction takes three arguments: a first data value and a second data value and information identifying an operating register 463 in which the output is to be stored. In response to receiving machine code instructions corresponding to the MOD instruction, the third processor 451 determines the modulo (i.e. the remainder) when the first data value is divided by the second data value and information identifying an operating register 463 in which the output is to be stored.

6. SL. The SL instruction is associated with machine code that causes an operand to be logically shifted left.

7. SR. The SR instruction is associated with machine code that causes an operand to be logically shifted right.

8. POW. The POW instruction takes three arguments: a first data value and a second data value and information identifying an operating register 463 in which the output is to be stored. In response to receiving machine code instructions corresponding to the POW instruction, the third processor 451 takes the first data value raised to the power of the second data value and stores the output in the specified operating register.

9. XOR. The XOR instruction takes two arguments: a first data value and a second data value. In response to receiving the XOR instruction, the third processor 451 performs a bit-wise exclusive-OR of the first data value and the second data value and returns the result.

Chained mathematical operations relate to a set of instructions that can be used to manipulate a data value. Chained mathematical operations include:

1. DIVMOD. This is a chaining of the DIV and MOD operations to return both the result of the division, and a remainder. The DIVMOD instruction takes four arguments: a first data value a, a second data value b, information identifying a first output register OUT1 within the operating registers 463 and information identifying a second output register OUT2 within the operating registers 463. In response to receiving machine code instructions corresponding to the MOD-DIV instruction, the third processor 451 performs MOD (DIV (a, b), b), i.e. the DIV operation followed by the MOD operation, where the MOD and DIV instructions have parameters a and b and their results are stored in OUT1 and OUT2 respectively.

2. INC. The INC instruction takes two arguments: a first data value and information identifying an output register within the operating registers 463. In response to receiving machine code instructions corresponding to the INC instruction, the third processor 451 increments the first data value by adding 1 to the value of the first data value and stores the output in the specified register, 3. DEC. The DEC instruction takes two arguments: a first data value and information identifying an output register within the operating registers 463. In response to receiving machine code instructions corresponding to the DEC instruction, the third processor 451 decrements the first data value by subtracting 1 from the value of the first data value and stores the output in the specified register.

4. CONCAT. The CONCAT instruction takes three arguments: a first data value, a second data value and information identifying an output register within the operating registers 463. In response to receiving instructions corresponding to the CONCAT instruction, the third processor 451 concatenates the second data value to the first data value and stores the output in the specified register.

5. MODPOW. The MODPOW instruction is a chained operation (also referred to as a "macro" instruction) and makes use of the Modular and Power Instructions. The MODPOW instruction takes four arguments: a first data value a, a second data value b, a third data value c and information identifying an operating register 463 in which the output is to be stored. In response to receiving instructions corresponding to the MODPOW instruction, the third processor 451 performs (aˆb) mod c, i.e. the POW operation followed by the MOD operation, and stores the output in the specified operating register.

Chained mathematical operations re-use machine code instructions in the first instruction set architecture 491. However, a chained mathematical operation may constrain the functionality of the instruction, or include the functionality of more than one instruction.

As an example, in one implementation the "INC" (increment) assembly instruction is implemented using an ADD machine code instruction, where one of the operands is fixed to one. In this case, the chained mathematical operation re-uses the ADD machine code instruction. However it constrains the functionality by fixing one of the inputs equal to one As another example, in another implementation the "CONCAT" (concatenation) assembly instruction is implemented using a Shift left machine code instruction and an XOR machine code instruction. In this way, the chained mathematical instruction includes the functionality of more than machine code instruction. It will be noted that the same output could be obtained by using the "SL" assembly instruction (from the mathematical primitives) followed by an "XOR" assembly instruction (from the mathematical primitives). However, it will be appreciated that adding chained mathematical operations like "CONCAT" to the first set of basic instructions 472 improves code readability and reduces the potential for human error when specifying the user defined program.

As discussed above, the first cryptographic engine 411 also comprises a plurality of cryptographic mechanisms 471. A cryptographic mechanism is a technique used to perform a cryptographic operation. For example, there are various different techniques that can be used to encrypt data including, but not limited to, the RSA encryption algorithm and the Advanced Encryption Standard (AES) algorithm. As discussed above, when a user-defined program uses the ENCRYPT assembly instruction, the user specifies which mechanism (i.e. which method/technique) to use when encrypting the data.

Each cryptographic mechanism in the first set of cryptographic mechanisms is associated with one or more instructions in the first instruction Set Architecture 491. Consequently, when the encrypt instruction using, for example, the RSA cryptographic mechanism is specified by a user, the machine code instructions corresponding to the RSA cryptographic mechanism are processed by the third processor 451.

In an example, the first set of cryptographic mechanisms includes: the RSA encryption/decryption algorithm, the Diffie-hellman algorithm, Elliptic-curve cryptograph, Advanced Encryption Standard (AES).

The first set of cryptographic mechanisms represent state machine accessible configurations. That is to say using the cryptographic mechanisms that can be used in executing user-defined code causes a series of machine code instructions to be executed by the third processor 451, where the instructions to be performed are predetermined based on how the cryptographic mechanism is implemented. For example, there is a first set of machine code instructions that correspond to encryption using the RSA algorithm.

As discussed above, the custom assembly language provides a plurality of instructions that can be used in an unrestricted way in a user defined program. By limiting which assembly instructions can be included in the user defined program (by virtue of limiting the machine code instructions that can be utilised), the system provides a secure way to implement user defined code. Consequently, the first set of basic instructions 472 use instructions from a subset of the first instruction set architecture 491, where the subset only contains machine code instructions that are considered to be safe.

In an example, the machine code used to implement the cryptographic mechanisms may use machine code instructions that are not in the subset of "safe" instructions. For example, by implementing encryption using the RSA cryptographic mechanism using a "JMP" (Jump) machine code instruction, which may be considered to be an "unsafe" machine code instruction for a user-defined program. Since the implementation of the cryptographic mechanisms is not user-defined (i.e. the implementation of the cryptographic mechanism is fixed), the use of any commands can be tightly controlled to ensure there is no potential security vulnerability.

Optionally, the first cryptographic engine 411 comprises specialised hardware for performing one or more of the cryptographic mechanisms and the third processor 451 is configured to access the specialised hardware in response to receiving an instruction to perform the cryptographic mechanism.

As discussed above, a user operating a client computer 317 may wish to perform an algorithm for which computer program code is not stored on the HSM device 31. Allowing the user to provide computer program code embodying the desired algorithm in the form of an update to the firmware would compromise the security of the HSM device. In order to avoid this, a mechanism is provided to allow a user to execute user-specified code on the HSM device 31.

The process for generating and executing user-specified code will be discussed in more detail below. However, in brief, in a first step a user (e.g. at the client 317) generates or obtains a user-specified program (e.g. by writing a program to be performed by the HSM 31). FIG. 4D shows a method performed by the HSM 31 according to an example. In step 493 the HSM 31 obtains user specified code in the custom assembly language. In an example the program generated by the user is written in the custom assembly language. In an example, the HSM 31 obtaining the user specified code comprises receiving a representation of the user specified code from the client 317. After obtaining the user-specified code in step 493 the method proceeds to step 484. In step 494 the HSM 31 converts the user-specified code in the custom assembly language into a format that can be executed by the third processor 451 (e.g. into bytecode comprising the machine instructions that can be recognised and processed by the third processor 451).

In an example, the program used to convert the user-specified program into byte code is referred to as an assembler. If the assembler recognises a command in the user-specified program that is not in the first set of basic instructions 472, then the assembler generates an error and execution of the user-defined program by the third processor 451 is not performed. This check provides a first level of security and prevents malicious code from being executed by the third processor 451.

In an example the crypto co-processor 353 (specifically the second processor 401) is configured to convert the user-specified code in custom assembly language to byte code using the assembler. As will become apparent from the description below, in examples provided herein the crypto co-processor 353 is configured to provide a secure area in which operations are restricted. As a result, the ability to compromise the assembler so that "un-safe" machine code instructions are outputted (which would compromise the security of the HSM 31 if executed) is reduced.

In another example, the first cryptographic engine 411 also provides a masking mechanism to ensure only permitted machine code instructions are executed by the third processor 451. In an example, the masking mechanism is implemented in hardware, optionally within the configurable logic fabric of a Field Programmable Gate Array (FPGA).

FIG. 4E shows a masking mechanism according to an example. As discussed above, the instruction memory is configured to store the program instructions to be executed by the third processor 451. The output of the instruction memory 461 is a next instruction to be executed by the third processor 451. The output of the instruction memory 461 is coupled to a first input of the masking component 495. The masking component has a second input coupled to memory (e.g. a register) indicating whether a user-defined program is being executed by the third processor 451.

As discussed above, allowing a user to execute user-specified code enables flexibility but can compromise the security of the HSM 31, especially if the user is executing "unsafe" instructions. The assembler only generates byte code that uses allowed instructions. However, a security vulnerability could arise if a malicious user was to directly attempt to execute byte code containing un-allowed instructions on the third processor 451 (i.e. bypassing the assembler). In light of this, there is a need for another mechanism to restrict the machine code instructions that can be executed by the third processor 451.

In an example there is provided a masking component 495 configured to restrict the instructions that are sent to the third processor 451 for execution. As discussed above, instructions in the first instruction set architecture 491 are represented by opcodes. In an example opcodes are 8 bit binary numbers. Each machine code instruction in the first instruction set architecture 491 is associated with a unique binary number. In this case, the masking component 495 is configured to convert an opcode corresponding to a machine code instruction that is not allowed to be performed by the third processor 451, into an opcode corresponding to a machine code instruction that is allowed to be performed.

The masking component is configured to convert the opcode corresponding to a "not-allowed" machine code instruction to an "allowed" machine code instruction in response to receiving an indication that a user-defined program is being executed by the third processor 451. The implementation of the other operations, and other mechanisms (e.g. DeriveKey, using the "Wrap Key" mechanism as discussed in relation to FIG. 2) can be fixed by the manufacturer of the HSM 31. Consequently, the machine code instructions that are used when implementing the "Wrap key" operation, do not need to be controlled to prevent a security vulnerability. For example, if a "JMP" command was to be used when implementing the "Wrap key" mechanism, the destination of the jump operation would be controlled, as a result the same concerns do not arise for the fixed functionality of the HSM 31. Instead, executing the user-defined code could present a malicious party with the opportunity to use one or more instructions from the first instruction set architecture 491 in an uncontrolled way. Allowing execution of all machine code instructions in an arbitrary (user-defined) way could lead to the third processor 451 becoming vulnerable to an attack (e.g. a micro-architectural attack) that compromises the security of the data being managed by the HSM, which includes cryptographic keys.

Optionally, the masking component 495 also comprises a third input, for receiving an indication of whether a cryptographic mechanism is being executed. As discussed above, although cryptographic mechanisms can be called from a user-defined program and although they can use "un-safe" commands, because the series of instructions is fixed (i.e. the instructions that form the cryptographic mechanism are not user-defined), the same security concerns as for unrestricted use of the "un-safe" commands do not apply. Consequently, if the masking component 495 receives an opcode associated with an "unsafe" instruction from the instruction memory 461 (e.g. "JMP"), but the third input indicates that a cryptographic mechanism is being performed, then the opcode does not need to be altered to a "safe" command, since the "unsafe" command (e.g. JMP) is permitted in this mode of operation (i.e. when a cryptographic mechanism is being performed). In contrast, if a cryptographic mechanism is not being performed and a user-defined program is being performed, then use of the "unsafe" machine code instructions is not permitted, and so the masking component 495 is used to convert the instruction from an "unsafe" instruction to a "safe" instruction (e.g. by masking a group of bits).

The output of the masking component 495 (i.e. the masked op code) is outputted to the third processor 451, where the machine code instruction is performed. A "NOOP" instruction (no-operation) may be used when a not-allowed instruction is requested. In such a case, processor 451 would "skip" and do nothing for that instruction. An example NOOP can be 0000 0000, i.e. all bits zero. Optionally, a counter may be incremented when NOOPs occur. A comparison of this against the number of intended NOOPs may be performed, to determine how many errors were encountered in the DKProgram. Intended NOOPs may be implemented for reasons such as a piece of hardware taking some time to complete its operation for example. Since proper execution would compromise the security of the HSM 31 because it would use unsafe commands, using a NOOP is preferable to proper execution of the user-defined program in this instance.

Figures 4F, 4G:
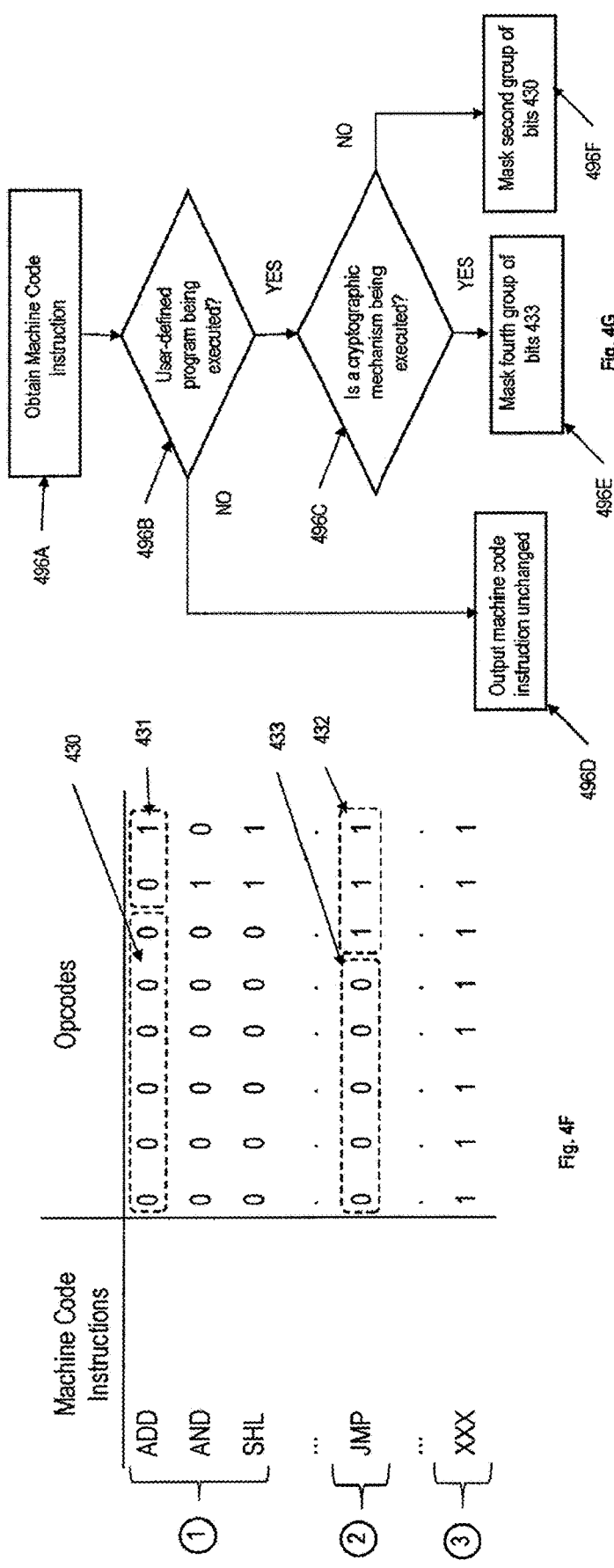
FIG. 4F shows opcodes associated with the first Instruction Set Architecture (ISA) according to an example.
FIG. 4G shows an example method performed by the masking component according to an example.

FIG. 4F shows opcodes associated with the first Instruction Set Architecture (ISA) according to an example. Although FIG. 4F is discussed in relation to specific machine code instructions, it is emphasised that these instructions are provided as an example only, and different machine code instructions could be used in different examples.

FIG. 4F shows a first group of machine code instructions comprising 'ADD', 'AND' and 'SHL'. The first group of machine code instructions comprises instructions from the "safe" instructions (i.e. the subset of the first instruction Set Architecture of the third processor 451 that can be accessed by assembly instructions in the first set of basic instructions 472). The second group of machine code instructions comprises instructions from the "unsafe" instructions (i.e. machine code instructions from the first instruction set architecture 491 that cannot be accessed unrestricted by the under-defined program, but can be accessed in a controlled way, for example, as part of a cryptographic mechanism). In an example the second group of machine code instructions includes the "JMP" instruction. The third group of machine code instructions includes machine code instructions supported by the third processor 451, which cannot be accessed by the HSM 31. For example, the third group of machine code instructions includes instructions that are part of the first instruction set architecture 491, but not part of the "safe" or the "unsafe" commands. Each machine code instruction is uniquely associated with an opcode (e.g. a binary number).

In an example, the first group of machine code instructions (i.e. the "safe" machine code instructions) are associated with a binary number comprising a first group of bits 431 and a second group of bits 430. For machine code instructions in the first group of machine code instructions, bit positions in the second set of bits 430 is constant (e.g. all "0" in the example shown in FIG. 4F). In contrast, bit positions in the first group of bits 431 change depending on the instruction associated with the opcode.

In the example shown in FIG. 4F the second group of machine code instructions comprises a third group of bits 432 and a fourth group of bits 433. Bit positions in the fourth group of bits 433 are constant for all instructions in the second group of machine code instructions (e.g. all '0's in the example of FIG. 4F).

FIG. 4G shows an example method performed by the masking component according to an example. In step 496A the method obtains the machine code instruction from the instruction memory 461. The machine code instruction is represented as a binary number (e.g. an opcode). The method proceeds to step 496B. In step 4968 the masking component 495 determines whether user-defined code is being executed (e.g. by determining whether a bit stored in a register is active (e.g. '1') or inactive (e.g. '0'). If a user-defined program is not being executed by the third processor 451, then the method proceeds to step 496D.

In step 496D, the machine code instruction obtained in step 496A is outputted unmodified. If it is determined that user-defined code is being executed, the method proceeds to 496C.

In step 486C the masking component 485 determines whether a cryptographic mechanism is being executed (e.g. by determining whether a bit in a register is active (e.g. '1') or inactive (e.g. '0'). If a cryptographic mechanism is not being executed then the method proceeds to step 496F.

In step 496F the masking component masks the second group of bits 430 (e.g. by changing all the bits in the second group of bits 430 to a constant value e.g. '0'). In this state, a user defined algorithm is being performed, but a cryptographic mechanism is not being performed. As a result, only machine code instructions in the first group of machine code instructions can be executed. Consequently, masking the bits in the first group of bits 430 converts an input instruction (e.g. '1111 1111') into a machine code instruction associated with the first group of machine code instructions (e.g. '0000 0011').

If it determined in step 496C that a cryptographic mechanism is being performed then the method proceeds to step 496E. In this state "unsafe" commands are allowed to be executed even though a user-defined program is being executed. Consequently, in this state bit positions in the fourth group of bits are masked 433, converting the fourth group of bits to a constant value (e.g. all '0's). This state effectively prevents use of any machine code instructions that are not allowed for use by user-defined programs or cryptographic mechanisms.

Figures 4H, 4I, 4J:
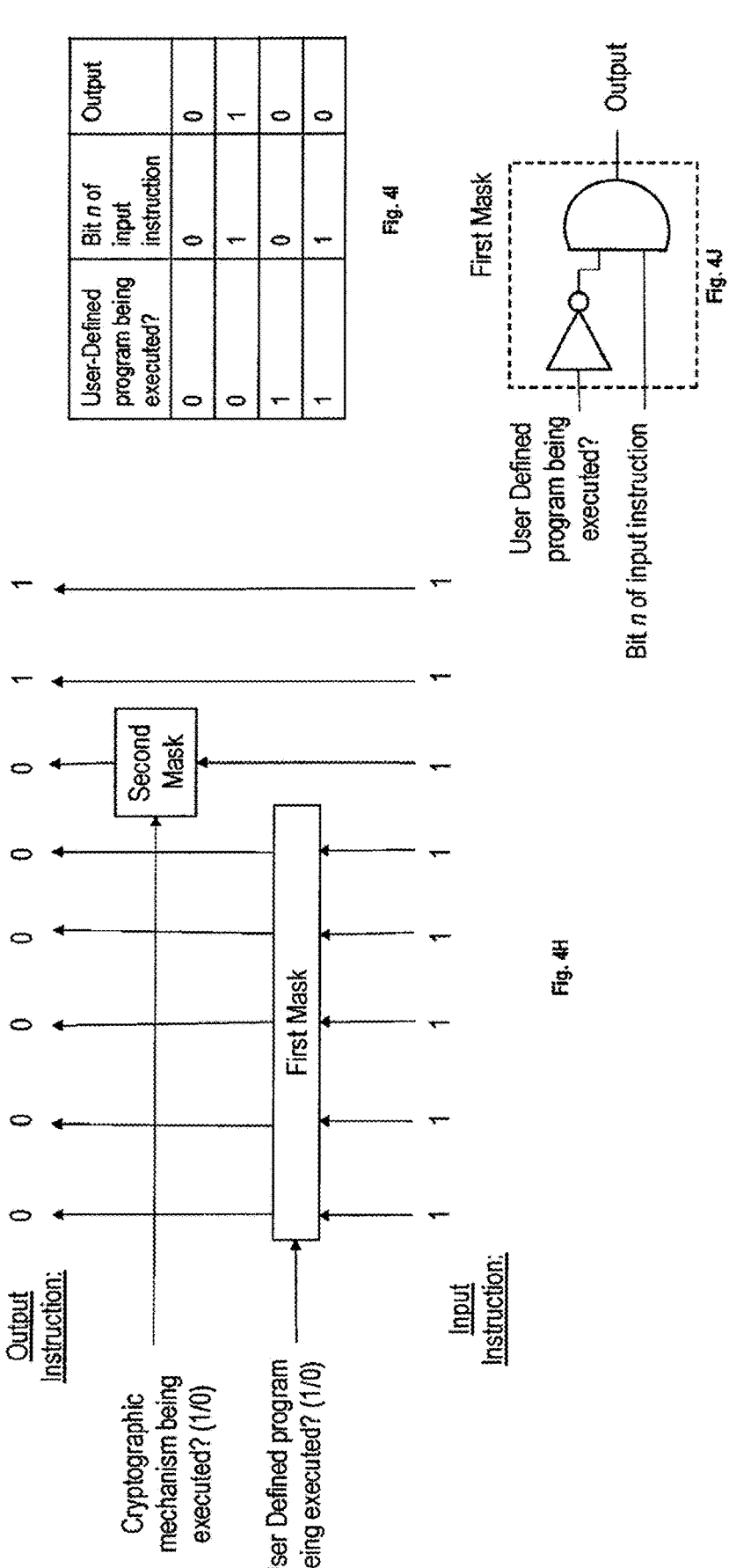
FIG. 4H shows an implementation of the masking component according to an example.
FIG. 4I shows a logic truth table for an implementation of the first mask according to an example.
FIG. 4J shows an example implementation of the first mask according to an example.

FIG. 4H shows an implementation of the masking component according to an example. The masking component comprises a first mask and a second mask. In this example, the input instruction is represented by binary number '1111 1111', which corresponds to an instruction in the third group of instructions (e.g. "XXX"). In an example implementation, the bit positions associated with the fourth group of bits 433 are inputted to the first mask. These bit positions are the positions that could be masked depending only whether a user defined program is being executed. Or put in other words, these bit positions are constant for machine code instructions that could be used when executing a user-defined program (including the instructions that could be used as part of a cryptographic mechanism called in a user-defined program). The first mask is configured to mask (e.g. convert to a binary value associated with the bit to the same value as used in the same bit position of the allowed commands, e.g. '0') depending on whether a user-defined program is being executed.

In an example, where the input instruction is represented by the binary number '1111 1111' and a user-defined program is being executed, the instruction after the first mask is applied becomes '0000 0111'. At this point a command that is not allowed to be executed by the third processor 451 (i.e. "XXX") has been converted into a command (e.g. 'JMP') that may or may not be executed by the third processor 451 depending on whether a cryptographic mechanism is being performed (e.g. 'JMP' may be executed by the third processor 451 if a cryptographic mechanism is being performed, but may not be executed by the third processor 451 if a cryptographic mechanism is not being performed).

In an example, the third group of bits 432 that are not constant for the second group of instructions (e.g. bit position 0, bit position 1, and bit position 2) comprises the bits in the first group of bits 431 that are not constant for the first group of instructions (e.g. bit position 0 and bit position 1). In this case, only the value of bit position 2 changes depending on whether a cryptographic mechanism is being performed. In this case, a second mask is applied to only the bit positions that are included in the third group of bits 432, but not in the first group of bits 431. The second mask comprises a similar mechanism to the first mask, however in this case the input to the second mask indicates whether a cryptographic mechanism is being performed.

In the example, after the first mask is performed the input of '1111 1111' (which is an un-allowed command—'XXX') is converted to '0000 0111' (corresponding to 'JMP'), which may or may not be allowed. If the cryptographic mechanism is not being performed, after the second mechanism, the binary number becomes '0000 0011', since bit position 2 is masked to '0'. Consequently, the masking component has changed an un-allowed command 'XXX' to a "safe" command 'SHL' (associated with binary number '0000 0011').

In this way, the security of the third processor 451 and the HSM in general is maintained.

It will be appreciated that in the case the input instruction is 'JMP' ('0000 0111') and a cryptographic mechanism is being performed, the binary representation is not changed and the output representation is '000 0111', allowing a JMP command to be executed by the third processor 451 (since a cryptographic mechanism is being performed).

FIG. 4I shows a logic truth table for an implementation of the first mask according to an example. FIG. 4I shows that if the user-defined program is being executed, the output of the first mask is '0'. It will be appreciated that the first mask is only applied to bit positions in the fourth group of bits 433, and so the masking performed by the first mask does not affect legitimate instructions in the first group of machine code instructions. If a user-defined program is not being executed, then the input to the first mask equals the output (and therefore the first mask does not change the instruction outputted by the instruction memory). A similar truth table is used for the second mask, replacing the user defined program being executed? input with the cryptographic mechanisms being executed? input. In this example '0' represents a user defined program not being executed, and '1' represents the user defined program being executed.

FIG. 4J shows an example implementation of the first mask according to an example. As discussed above, in an example, the masking component is implemented in hardware. In an example, the first mask comprises an 'AND' gate having a first input and a second input. The first input is coupled to a bit position of the input instruction. The second input is coupled to an output of a NOT gate. The input of the NOT gate is coupled to the indication that a user program is being executed.

In order to facilitate the execution of user-specified code the examples discussed below provide a mechanism, the first mechanism, by which an algorithm for which computer program code that is not stored on the HSM device 31 may be securely performed on the HSM device 31. The first mechanism is also referred to in this description as the "DeriveMech Programmed" mechanism.

In an example the HSM 31 provides an interface that is configured to receive a command (e.g. "Cmd_DeriveKey"). The command ("Cmd_DeriveKey") is the operation. The command comprises a parameter/field named "Derive-Mech", which indicates the mechanism that is to be used by the HSM when deriving the cryptographic key. In an example, when the "DeriveMech" field of the command is set equal to a constant (e.g. "42"), a cryptographic key is derived according to the first mechanism (i.e. using the program code supplied by the user).

Figure 5A:
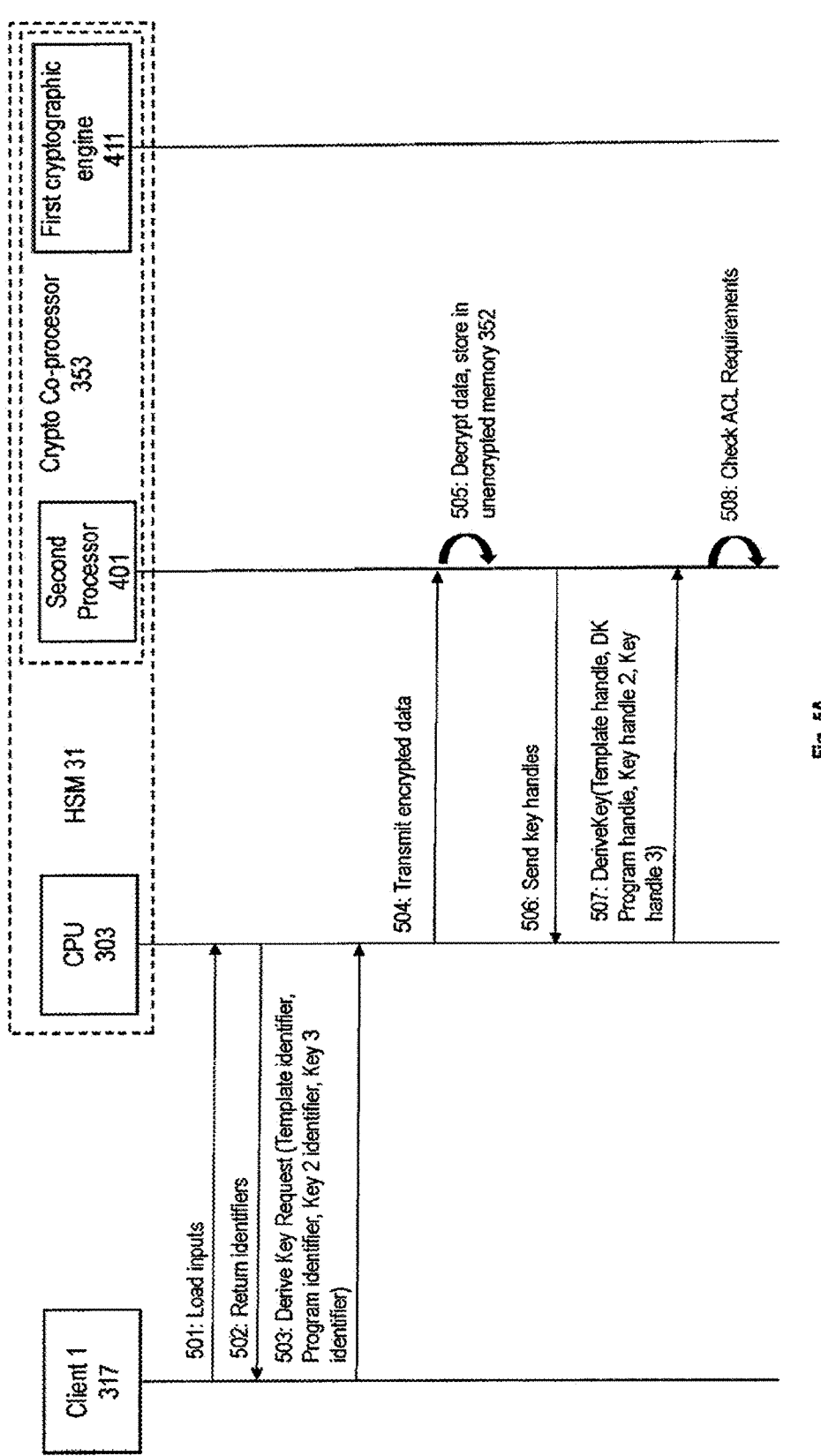
FIG. 5A shows a first part of a method for performing the first mechanism according to an example.
Figure 5B:
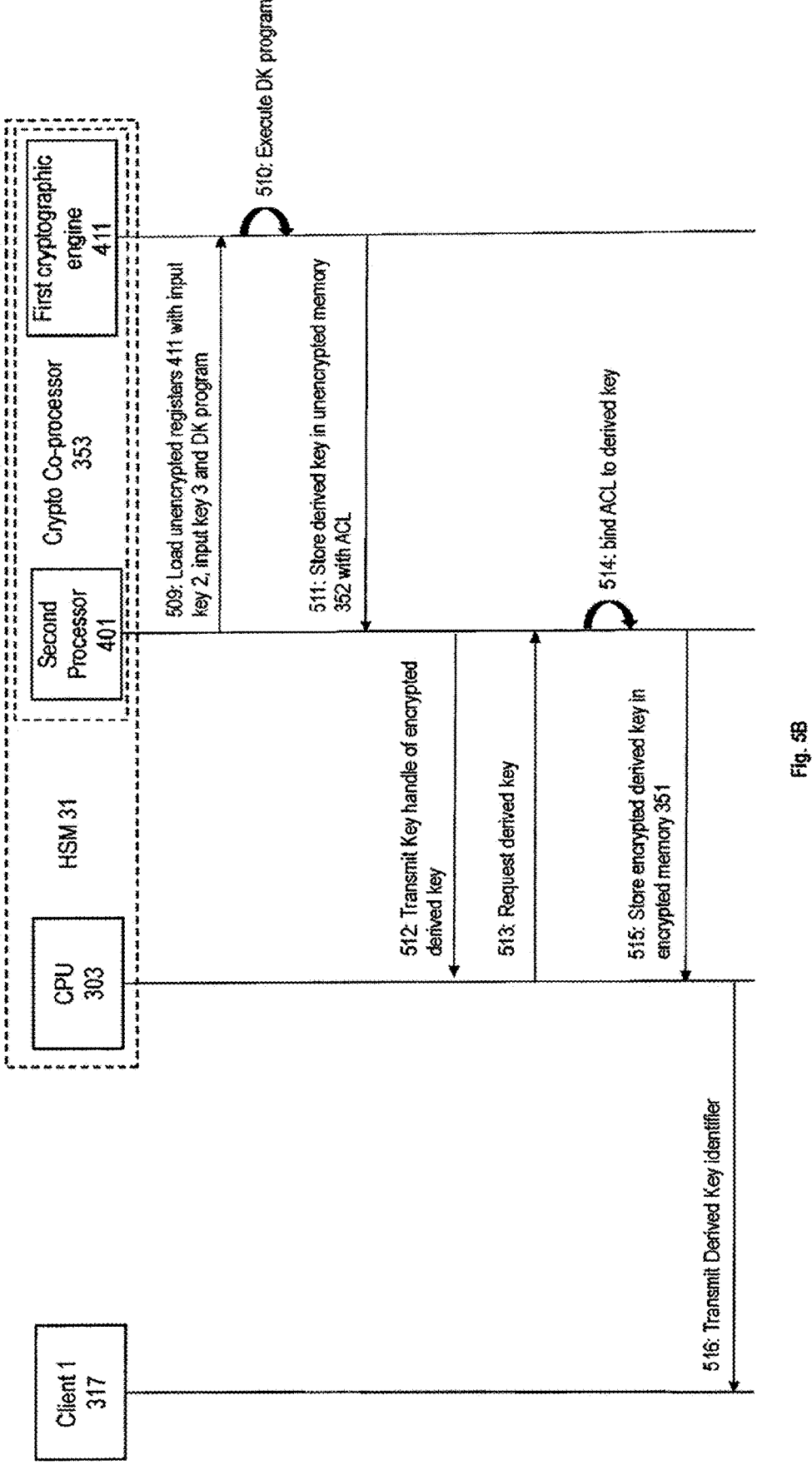
FIG. 5B shows a second part of the method for performing the first mechanism according to an example.

FIG. 5A shows a first part of a method for performing the first mechanism according to an example. FIG. 5B shows a second part of the method for performing the first mechanism according to an example. The steps shown in FIG. 5A and FIG. 5B will be used as a reference throughout the following description.

The method begins in step 501 by the client computer 317 providing input data to the HSM 31 and/or causing the HSM 31 to retrieve input data used to perform the first mechanism. In this step at least part of the input data used to perform the first mechanism (in this example, to generate a cryptographic key programmatically) is provided to the HSM 31. As will be discussed in more detail below, this step includes at least one of: importing data from the client computer 317 to the HSM and/or transmitting a request for the HSM 31 to retrieve data from memory accessible to the HSM 31.

In this example, in 501, the CPU 303 obtains the input data. At least some of the input data is encrypted using a cryptographic key which is not accessible to the CPU 303 but can be accessed by the crypto co-processor 353.

Figure 6:
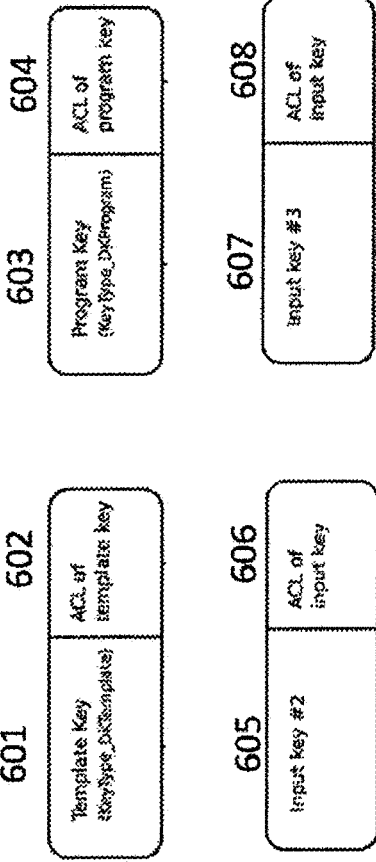
FIG. 6 shows the inputs for programmable key derivation according to an example.

FIG. 6 shows the inputs for programmable key derivation according to an example. In this example, generating a cryptographic key programmatically (i.e. performing the first mechanism) uses four inputs.

The first input comprises a template key 601 and a fourth Access Control List (ACL) 602 associated with the template key. As discussed above, the template "key" 601 is in fact not a cryptographic key, rather a data packet comprising Access Control List (ACL) information for the programmatically derived output key. The template also has its own Access Control List (ACL) (i.e. the fourth ACL 602), which specifies how the template may be used.

The second input comprises a program key 602 and a third Access Control List (ACL) 604. The program "key" 602 is a representation of a client program embodying the desired algorithm. Again, although the term "key" is used, in fact the program "key" is not a cryptographic key, rather a representation of a computer program, the client program.

The third input comprises a second input key 605 (named "input key #2") and a first Access Control List (ACL) 606 associated with the cryptographic key 605.

The fourth input comprises a third input key 607 (named "input key #3") and a fifth Access Control List (ACL) 608 associated with the third cryptographic key 607.

Unlike FIG. 2, where the operations that were performed as part of the wrap operation to generate the cryptographic key (i.e. S202) were included in the firmware and stored on the HSM device 21. In the methods of FIG. 5A and FIG. 5B the desired algorithm (to generate the cryptographic key) is not required to be stored on the HSM device 31 in advance, but may be provided in the input program "key" 603.

The system shown in FIG. 3 provides functionality to implement an operation (e.g. the Derive Key operation) and a mechanism (e.g. the first mechanism to generate a cryptographic key programmatically). This operation and mechanism may then be used to implement various algorithms provided by a user in program "keys". The remaining input keys discussed in FIG. 6 are made available to the client program (specified in the program key 603) to operate on. As will be apparent from the description below, the ultimate result of the client program's execution is a derived key, which is assigned an ACL from the template "key", and can then be used in any way that this ACL permits.

Returning to FIG. 5A, in step 501 the client 317 provides and/or causes the CPU 303 to retrieve at least one of the inputs as discussed in relation to FIG. 6. At least some of the obtained inputs are encrypted, such that the CPU 303 obtains the encrypted inputs in S501.

Figure 7:
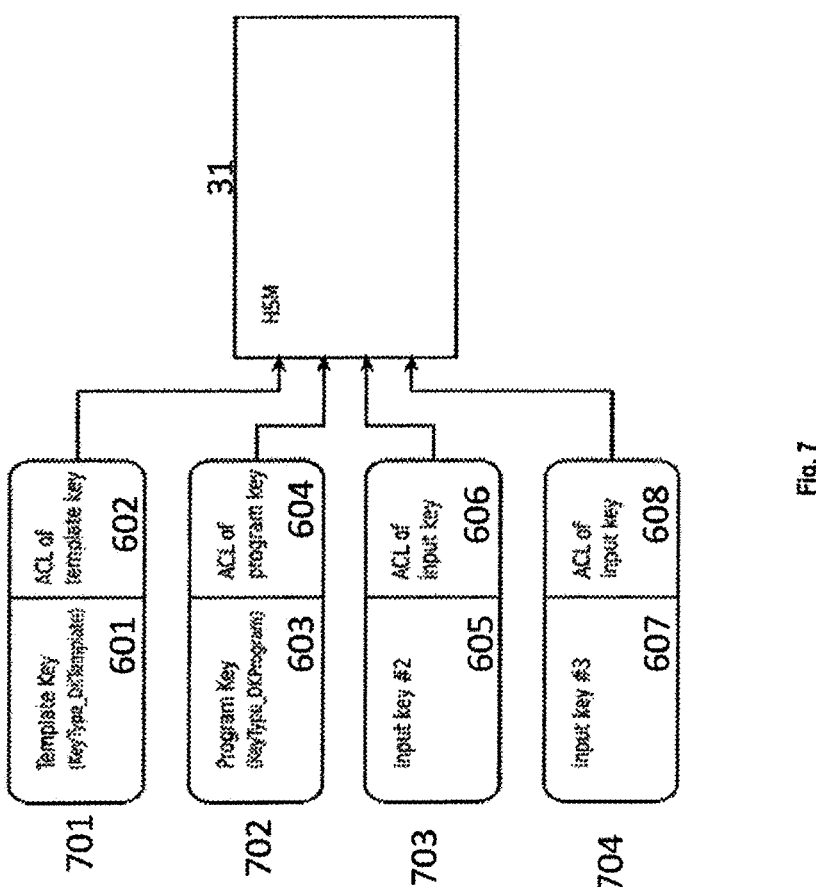
FIG. 7 shows a method of obtaining, by the CPU 303, the inputs used for a method according to an example.

FIG. 7 shows a method of obtaining, by the CPU 303, the inputs used for a method according to an example. In particular, FIG. 7 shows a first data packet 701, a second data packet 702, a third data packet 703 and a fourth data packet 704.

The first data packet 701 comprises the template key 601 and the fourth Access Control List (ACL) 602 associated with the template key.

The second data packet 702 comprises the program key 602 and the third Access Control List (ACL) 604 (also referred to as the program ACL).

The third data packet 703 comprises the second input key 605 (named "input key #2") and the first Access Control List (ACL) 606 associated with the second input key 605.

The fourth data packet 704 comprises the third input key 607 (named "input key #3") and the fifth Access Control List (ACL) 608 associated with the third input key 607.

In this example, each data packet is encrypted, in other words each data packet comprises the "key" and the corresponding ACL, encrypted using a cryptographic key (e.g. a "binding key"). The CPU 303 obtains and stores the encrypted data packets in S501.

In a first step, the second data packet 702, comprising the program "key" 603 and the program ACL 604, is obtained by the CPU 303. The program "key" 603 comprises a representation of the computer program code embodying the algorithm desired by the user (otherwise referred to as the client program). The program ACL 604 is an example of a policy associated with the client program. The program ACL 604 is associated with the program "key" 603.

There are two mechanisms that can be used in order for the CPU 303 to obtain the inputs required for programmable key derivation. Keys can either be imported (by sending a "Cmd import" command containing the keys from the client 317 to the HSM 31) or loaded (by sending a "Cmd Load-Blob" from the client 317 to the HSM 31 in order to retrieve the key from the HSM's memory).

Obtaining the program "key" 603 will be discussed in relation to using the "Cmd import" command. However, for the avoidance of any doubt it is noted that the program "key" 603 could be retrieved from the HSM's memory using the "Cmd LoadBlock" command.

Obtaining the program "key" 603 and the program ACL 604 at the HSM 31 by importing the key starts with the client 317 transmitting a "Cmd import" command to the HSM 31. The "Cmd import" command comprises the program "key" 803 and the program ACL 604.

In example the program "key" 603 and the program ACL 604 are serialised (i.e. converted into a series of bits) and cryptographically bound before being transmitted by the client 317. As a result, in this example, the HSM 31 initially receives a series of bits containing a cryptographically bound serialised representation of the program "key" 603 and the program ACL 604. The resulting data is referred to as a "Blob".

In an example the serialised client program (contained in the serialised program "key" 603) and the corresponding serialised access control list are cryptographically bound by the import command. The representation of the client program code is bound to policy. For example, the ACL is bound to the representation of the client program by the import command. The client program code is bound directly to policy, i.e. it is not bound to signing keys with the signing keys bound to policy.

Binding the serialised client program and the corresponding serialised access control list includes encrypting a bit stream comprising the serialised client program and the corresponding ACL using a cryptographic key (e.g. a "binding key"). In an example, the import command has access to the "binding key". The cryptographic technique used to secure the key material (i.e. the creation of the blob) guarantees both confidentiality and integrity, i.e. an attacker cannot discover the contents of the blob, and they cannot modify it without detection. Furthermore, the CPU 303 does not have access to the binding key.

The HSM 31 subsequently receives the import command from the client 317. The import command comprising the blob (i.e. the serialised client program cryptographically bound to the serialised ACL associated with the client program).

After receiving the "Cmd_import" command, the CPU 303 of the HSM 31 stores the "Blob" (i.e. the serialised client program cryptographically bound to the serialised ACL associated with the client program) associated with a corresponding identifier.

Returning to FIG. 7, to discuss obtaining the other inputs. In a second step the first data packet 701, comprising the template "key" 601 and fourth Access Control List (ACL) 602 (also referred to as the template ACL 602), is obtained. The template "key" 601 comprises a representation of an output access control information relating to use of output data. The template ACL 602 is associated with the template "key" 601. In this example, the template "key" 601 and template ACL 602 are imported to the HSM 31.

In an example the template "key" 601 and template ACL 602 are serialised, and cryptographically bound as part of using the import command ("Cmd_import") performed by the client as discussed in relation to obtaining the program key 603. The serialised template comprises a series of bits. The CPU 303 of the HSM 31 stores the "Blob" (i.e. the serialised template key cryptographically bound to the serialised ACL associated with the template key) associated with a corresponding identifier.

In a third step, the third data packet 703 comprising the second input key 605 and the first ACL 606 is also obtained. The second input key 605 may be referred to as second data. The first access control list 606 comprises a list of permissions relating to use of the second input key 605. The first access control list 606 is an example of a first policy associated with the second data.

Obtaining the third data packet 703 will now be discussed in relation to an example where the third data packet 703 is retrieved from memory by sending a "Cmd LoadBlob" from the client 317 to the HSM 31.

In this case, a "Blob" is stored in the non-volatile memory 305 comprising the second input key 605 and the first ACL 606. That is to say, in this example the second input key 605 and the first ACL 606 have been encrypted under a long-term symmetric key held in the HSM device 31 (e.g. the "binding key"), and are stored in storage accessible to the HSM device 31. Consequently, in order obtain the third data packet, a load command can be used by the client to retrieve the data from the memory of the HSM 31.

To begin the method of obtaining the third data packet 703, a load command (e.g. "Cmd LoadBlob") is transmitted from the client 317 to the HSM device 31. In an example the load command comprises information identifying a key that is stored on or accessible to the HSM device 31 (e.g. a file name or a key block identifier).

In response to receiving the load command, the CPU 303 of the HSM device 31 retrieves the "Blob" (comprising the second input key 605 cryptographically bound to the first ACL 606). The CPU 303 of the HSM 31 stores the "Blob" (comprising the second input key 605 cryptographically bound to the first ACL 606) associated with a corresponding identifier. In the example above, the HSM 31 obtains the second input key 605 and the first ACL 606 by the client 317 loading the "Blob" into the HSM's 31 working memory, In a fourth step, the fourth data packet 704, comprising the third input key 607 and its associated ACL is also obtained. The ACL 608 of the third input key 608 is also referred to as the fifth ACL 608. The fifth ACL 608 is associated with the third input key. In this example, the third input key 607 is cryptographically bound to the fifth ACL 608. For example, they may be encrypted under a long-term symmetric key held in the HSM device 31 (e.g. using the "binding key"), and stored in storage accessible to the HSM device 31. The third input key 607 may be referred to as fourth data. The fifth access control list 608 comprises a list of permissions relating to use of the third input key 607. The fifth access control list 608 is an example of a fifth policy associated with the fourth data.

As with the third data packet 703, the client 317 sends a "Cmd LoadBlob" command in relation to the third input key 607 to the HSM 31. The load command comprising information identifying the location (in memory) of the third input key 607. In response to receiving the load command, the CPU 303 of the HSM device 31 retrieves "Blob" (comprising the third input key 607 cryptographically bound to the fifth ACL 608) The CPU 303 of the HSM 31 stores the "Blob" (comprising the third input key 607 cryptographically bound to the fifth ACL 608) associated with a corresponding identifier.

In this example, the second input key 605 and corresponding ACL are encrypted using a cryptographic key (e.g. a "binding key") and the third input key 607 and corresponding ACL are encrypted using the cryptographic key (e.g. a "binding key") to form "key blobs". The key blobs can be decrypted by the second processor 401 of the crypto co-processor 353. In an example symmetric encryption is used, whereby a client performs the encryption "using an encryption key (the binding key) and stores the encrypted key blobs in memory accessible to the HSM 31. As will be apparent from the description below, the CPU 303 does not have access to the encryption key (the binding key), consequently the CPU 303 only handles encrypted material (i.e. not "plain text" encryption keys), which can improve the security of the HSM 31.

In the example discussed in relation to FIG. 7, the first data packet 701 (a blob comprising the template key 601 and the fourth ACL 602) and the second packet 702 (a blob comprising the program key 603 and the third ACL 604) are obtained by the HSM 31 in response to receiving an import command ("Cmd_Import") and the third data packet 703 (a blob comprising the second input key 605 and the first ACL 606) as well as the fourth data packet 704 (a blob comprising the third input key 607 and the fifth ACL 608) are obtained by the HSM 31 in response to receiving a load command ("Cmd_LoadBlob"). However, for the avoidance of any doubt it is emphasized that all of the data packets obtained in FIG. 7 could be obtained by importing or by loading. The precise means of entering the data into the working memory of the HSM 31 is immaterial. Optionally, at least one key will be entered into the HSM in a way that preserves its confidentiality and the binding to the policy (ACL) controlling its use. In an example template keys and program keys are imported into the HSM 31, whereas the input keys may be stored in an encrypted manner (e.g. as a "Blob") on the HSM 31 or in storage accessible to the HSM and are therefore obtained by loading the encrypted key blobs.

In the example above, each key is associated with an Access Control List (ACL). The Access Control List (ACL) defines the policy under which a key may be used. The Access Control List comprises a collection of permission groups. Only one permission group has to match for an action to be permitted.

Each ACL comprises a table of permission groups, each of which defines a set of operations and the credentials required (if any) to perform them. As will be discussed in more detail below, permission groups are checked in order, where the first permission group that permits the action is used. If no group matches the desired operation then the command will return an error message. A permission group is one entry in an Access Control List. It defines a collection of operations and the credentials required to perform them (if any). It comprises a collection of general restrictions, plus a list of actions, which are matched directly against the action to be performed. An action defines one or more operations which are allowed. There are many possible different actions. "Act_DeriveKey" is the action that represents any attempt to use the command "Cmd_DeriveKey", described above. For a Derive Key operation, for each key participating, the key's ACL should comprise an Act-_DeriveKey entry in which the role field matches the role in which the key will be used, the mech field matches the requested mechanism (i.e. the first mechanism), and for each other role, the otherkeys field either does not mention that role, or mentions the key hash of the key acting in that role.

For example, if it is desired to constrain which input keys can be used with the program key, the program key ACL 604 lists the permitted input keys together with the roles (e.g. ("DeriveRole WrapKey", "DeriveRole Key3"). Thus in the present example, the program ACL 604 may list an Act-_DeriveKey entry in which the role field lists "DeriveRole BaseKey" (which may be identified by the numeric constant 1), the mech field lists "DeriveMech Programmed" (which may be identified by the numeric constant 42), and the otherkeys field does not mention the "DeriveRole TemplateKey", lists the role "DeriveRole WrapKey" (which may be identified by the numeric constant 2) with an identifier of the input key #2 (which may be a cryptographic hash of the key value and type) and lists the role "DeriveRole Key3" (which may be identified by the numeric constant 3) with an identifier of the input key #3 (which may be a cryptographic hash of the key value and type). The roles may include "template", "program" and various generic input roles, but further or alternative specification of the roles may be defined, to differentiate between the different roles of the different input keys for example. The key types also include "template" and "program", however the cryptographic key types may take various known cryptographic key types, such as an AES key for example.

If it is not desired to constrain which keys can be used in a particular role with the object, that role is not listed in the ACL of the object. In this case, any key can be used in the role (so long as it is permitted by the ACLs of the other objects used in the mechanism). Thus for example the program ACL 604 does not list the role "template", meaning that the program "key" 603 may be used with any template "key".

In the example above the program key 603 is provided by a client. As discussed above the program key 603 represents the desired algorithm that is to be used by the HSM 31 to programmatically generate a cryptographic key. As discussed in relation to FIG. 7, the program key 603 is one of the keys obtained by the HSM 31 (e.g. by loading the blob comprising the program key from storage accessible from the HSM 31, or by importing the blob comprising the program key from the client 317). It will now be discussed how to generate a program key.

Figure 8:
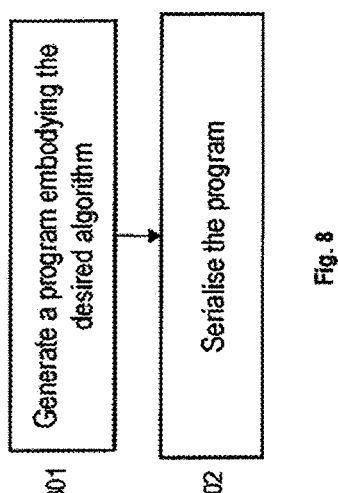
FIG. 8 shows a method of generating a program key according to an example.

FIG. 8 shows a method of generating a program key according to an example. In step 801, the client generates, on the client device 317, a program embodying the desired algorithm.

In the example described herein, the client writes a textual representation of the desired algorithm, using the custom assembly language. The custom assembly language representation maps directly to instructions in the Instruction Set Architecture (ISA) supported by the third processor 451 (e.g. either in a 1-to-1 relationship or a 1-to-many relationship). After generating a program embodying the desired algorithm in step 801, the method proceeds to step 802.

In step 802 the program generated in step 801 is serialised. In an example a translator program executes on the client device 317. The textual representation is taken as input to the translator program, which takes the textual representation and converts it to a serialised representation.

The translator is an executable program, comprising serialisation code, and various definitions. Thus computer program code in a general-purpose computer language embodying the translator program is stored on the client device 317. In this example, the computer language of the translator is Python. In this example, the translator comprises Python language type definitions, and code for serialisation, de-serialisation and various other functions. The output of the translator is a serialised representation of the client program, i.e. a string of bits.

By constraining the client to writing the desired program that uses instructions included in the custom assembly language (corresponding to those instructions that are permitted to be executed by the third processor 451) it is possible to limit the extent to which a malicious party can (legitimately) run customised code that attempts to compromise the security of the Hardware Security Module (HSM) 31. It will be appreciated that although the instructions supported by the third processor 451 are predetermined, these instructions may be combined in various combinations by the client to generate a desired algorithm enabling programmable key derivation.

Returning to FIG. 5A. In step 501 the data used by the method is obtained by the HSM 31, either by being provided to the HSM 31 from the client 317 or by being retrieved by the HSM 31. As discussed above, this is achieved by the client 317 transmitting either an import command (e.g. "Cmd import") or a load command (e.g. "Cmd LoadBlob") to the HSM device 31.

In an example, the HSM 31 obtains the first data packet (a blob comprising the template key 601 and the ACL of the template key 602) and the second data packet (a blob comprising the program key 603 and the ACL of the program key 604) by the client 317 using an import command (e.g. "Cmd import"). In this example the HSM 31 obtains the third data packet 703 (a blob comprising the second input key 605 and the first ACL 606) and the fourth data packet 704 (a blob comprising the third input key 607 and the fifth ACL 608) by the client 317 loading the blobs into working memory using the load command (e.g. "Cmd LoadBlob").

In response to each received import or load command, in S502 the HSM device 31 transmits a response to the client 317 comprising an identifier. As discussed above, the identifier can be used to identify where the data (e.g. the blob comprising the key and the associated ACL) is stored in the working memory (i.e. the RAM 309). In the example above where 4 inputs are loaded into the working memory of the HSM device 31 (i.e. blob comprising the program key 603, the blob comprising the template key 603, the blob comprising the second input key 605, and the blob comprising the third input key 607), the client 317 will receive 4 responses each comprising an identifier. As a result, after step 502 is completed the client 317 possesses information identifying where the data is stored in the HSM device 31. Returning to FIG. 5A. In step 503 a client, or an application acting on behalf of a client, then requests that the first mechanism be performed by transmitting a command to the HSM 31 comprising an identifier of the first mechanism and a reference to the data to be used. In an example, the command "Derive Key Request" is used, taking as arguments, the mechanism identifier and a list comprising information identifying the data comprising two or more keys (e.g. a list of identifiers for the two or more key blobs). The mechanism identifier identifies the first mechanism, "DeriveMech Programmed" (indicating to the HSM 31 that a cryptographic key is to be derived programmatically according to the program supplied in the arguments of the command). In an example the list of identifiers includes an identifier of the blob comprising the template key 601, an identifier of the blob comprising the program key 603, an identifier of the blob comprising the second input key 605 and an identifier of the blob comprising the third input key 607.

The command may be sent from the client 317 to the HSM device 31. Although here a case is described in which the program key (in step 501) and the command (in step 503) are both sent from the same client device 317 to the HSM device 31, it is to be understood that the program key and the command may be sent to the HSM device 31 from separate devices.

Each key is again assigned to a particular role in the command. This may be defined by the order the identifiers are presented in the command—the first key (represented by the corresponding identifier) in the list is the template key, the second is the program key, and the subsequent keys occupy sequentially numbered roles for example. Various different orders or methods of defining the roles may be used however.

Figure 9:
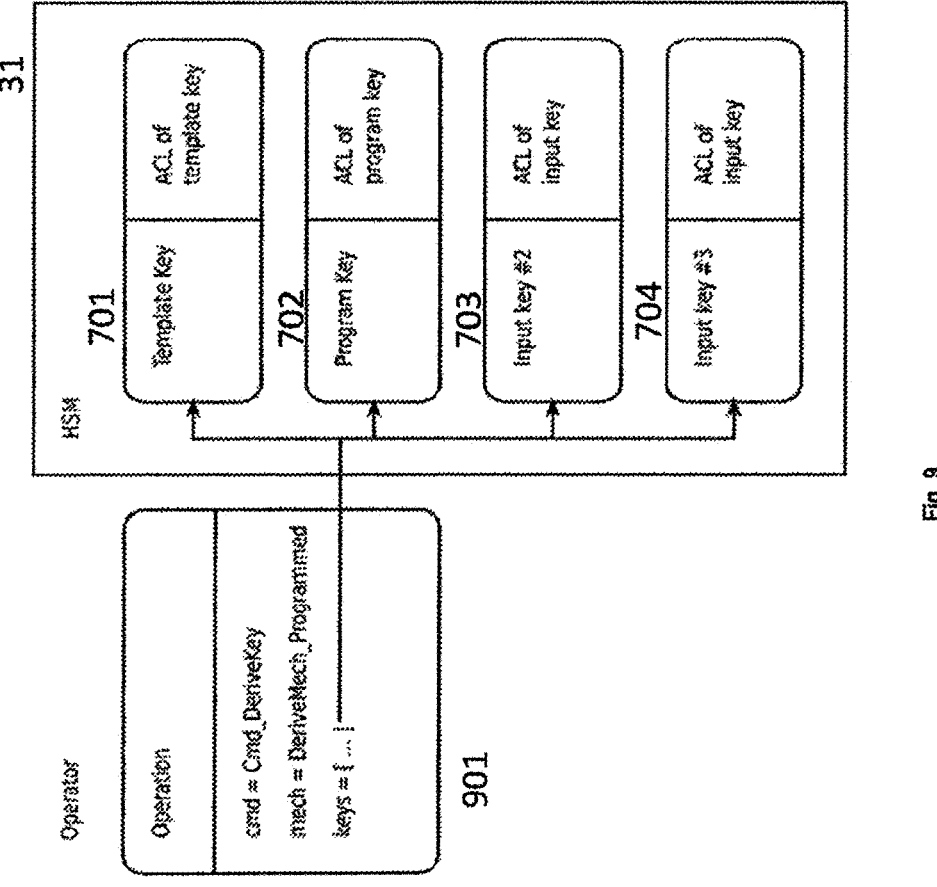
FIG. 9 shows an example of a "Cmd DeriveKey" command 901 according to an example.

FIG. 9 shows an example of a "Cmd DeriveKey" command 901 according to an example. Computer program code in the firmware on the HSM device 31 is identified by the "Cmd DeriveKey" command and executed. The code may be identified using a table on the HSM device 31 including a command identifier. The command identifier may be a numeric constant. The "Cmd DeriveKey" command may be identified by the numeric constant 75 in the client request, and the memory address of the code to be executed in response to the "Cmd DeriveKey" command on the HSM device 31 retrieved.

The "Cmd DeriveKey" command 901 comprises information identifying the first mechanism, "DeriveMech Programmed". The mechanism identifier may be a numeric constant. For example, the first mechanism "DeriveMech Programmed" corresponds to the identifying numeric constant 42. This mechanism identifier allows computer program code in the firmware on the HSM device 31 to be identified. This code specifies that the cryptographic key is to be generated programmatically using the program steps referenced in the program key.

The command 901 further comprises information identifying the second data packet 702 as comprising a representation of a program to be executed, the first data packet 701 as comprising a representation of a second access control list for the output key, the second data packet 703 as comprising input data, and the fourth data packet 704 as comprising input data. The different roles of different inputs may also be defined by the order. This identifying information may comprise a list of key identifiers, ordered such that the first identifier in the list identifies the template key, the second the program key, and the subsequent occupy sequentially numbered roles. The keys may be identified by a key handle or filename, which allows the corresponding key stored in RAM 309 on the HSM device 31 to be identified.

Returning to FIG. 5A, after receiving the command in step in step 503, in step 504, the CPU 303 retrieves the data associated with the identifiers. In the example discussed in relation to FIG. 5A the CPU 303 retrieves encrypted data packets or blobs comprising the input key #2, input key #3, template and program from RAM 309. For the avoidance of doubt it is noted that the keys retrieved by the CPU 303 are encrypted (i.e. they are not the plain text cryptographic keys). In 504, the CPU 303 sends the blob comprising the serialised client program cryptographically bound to the serialised ACL associated with the client program to the second processor 401. The CPU 303 sends the blob comprising the serialised template "key" 601 cryptographically bound to the serialised template ACL 602 to the second processor 401. The CPU 303 sends the blob comprising the second input key 605 cryptographically bound to the first ACL 606 to the second processor 401. The CPU 303 sends the blob comprising the third input key 607 cryptographically bound to the second ACL 608 to the second processor 401.

In 505, the second processor 401 decrypts the "Blob" (i.e. the serialised client program cryptographically bound to the serialised ACL associated with the client program) into the serialised program code and the serialised ACL. In an example, the second processor 401 retrieves the "binding key" (which is the same key as is accessed by the import command at the client 317). In this case the second processor 401 decrypts the "blob" using the "binding key". In this example, the program key and the corresponding ACL are secured using symmetric encryption techniques (since the key used to encrypt the data to get a blob, and decrypt the blob to get the data is the same). The second processor 401 subsequently de-serialises the program "key" 603 and the ACL of the program key 604 and stores the key and the ACL together.

In the de-serialisation step, the serialised program key 603 and program ACL 604 are read at the second processor 401 according to the serialization format. The serialised program key 603 is converted into a form which can be executed by the third processor 451 of the first cryptographic engine 411 (of the crypto co-processor 353). In this case, the serialised program is converted into an in-memory representation of the program, the memory in this case being the instruction memory 461. In an example, the serialised client program may be translated into machine code.

In particular, during de-serialisation the second processor 401 converts the serialised representation of the client program (i.e. a bit string) into a data structure in memory representing the client program, i.e. an in-memory representation corresponding to the client program. The in-memory representation may be an array, which is populated during the de-serialisation process. Each element of the array corresponds to a step in the client program, identified by the corresponding numeric constant (e.g. "sign" is identified by the numeric constant 5).

In an example the deserialization step contains two steps. Firstly converting the serialised representation to a representation that uses the custom assembly language. Secondly converting the representation using the custom assembly language into a representation that uses machine code instructions (e.g. byte code) that can be processed by the third processor 451. In an example, the second step is performed using an assembler program.

Alternatively, the serialised representation may be such that it can be executed by the third processor 451 directly. In this case, the de-serialisation step is not performed, and the serialised representation of the program key 603 is simply stored by the second processor 401. In this case, a customer could include "un-allowed" bytecodes in the representation. As explained in relation to FIGS. 4E to 4J above however, a masking mechanism may restrict the machine code instructions that can be executed by the third processor 451.

The ACL is stored in a manner that associates it with the client program on the HSM device 31.

In 505, the "blob" comprising the serialised template "key" 601 cryptographically bound to the serialised template ACL 602 is also decrypted by the second processor 401 (e.g. using the "binding key") and the template "key" 601 and template ACL 602 are de-serialised by the second processor 401 and stored together in the unencrypted memory 352. A key handle is created that refers to the result.

In 505, the "blob" comprising the second input key 605 cryptographically bound to the first ACL 606 is decrypted by the second processor 401 using the "binding key" to return the second input key 605 and first ACL 606. The second processor 401 of the HSM 31 then stores the second key and its associated ACL in the unencrypted memory 352. Each key is stored in such a way that it is associated with its ACL. A key handle is created that refers to the result.

In 505, the "blob" comprising the third input key 607 cryptographically bound to the second ACL 608 is decrypted by the second processor 401 using the "binding key" to separate the cryptographically bound "Blob" into a third input key 607 and a fifth ACL 606. The second processor 401 of the HSM 31 then stores the key and its associated ACL in the unencrypted memory 352. Each key is stored in such a way that it is associated with its ACL. A key handle is created that refers to the result.

As described above, in step 504 the CPU 303 (i.e. the main processor) transmits the retrieved encrypted data to the crypto co-coprocessor 535. The second processor 401 subsequently receives the encrypted data. In step 505, the second processor 401 decrypts the input keys. As discussed above, the input keys obtained by the CPU 303 (in response to the client 317 transmitting an import command or a load command) are encrypted under a binding key. In an example, the crypto co-processor 353 stores the binding key (e.g. in unencrypted memory 352). The second processor 401 is configured to retrieve the binding key (e.g. from the unencrypted memory 352) and use the binding key to decrypt the template, the program and input key #2 and input key #3.

In this case, symmetric key encryption is used to protect the confidentiality and the security of the input keys. The general purpose CPU 303 represents a greater security vulnerability for programmable key derivation since a more advanced program can be created by user which could potentially exploit security vulnerabilities of the HSM 31, enabling a user of the HSM 31 to obtain the cryptographic keys of another party using the HSM 31. With the approach shown in FIGS. 5A and 5B, the general purpose CPU 303 only handles encrypted input keys, thereby improving the security of programmable key derivation.

In an example, the binding key used by the second processor 401 to decrypt the input keys (e.g. input key #2, and encrypted input #3) is loaded into the memory accessed by the crypto co-processor (e.g. unencrypted memory 352) during initialisation of the HSM 31.

In step 505, each key is stored in such a way that it is associated with its ACL. A key handle is created that refers to the result. The ACL is stored associated with the corresponding key, e.g. in the same location. A key handle is created that refers to the result. The key handle enables the corresponding key to be identified.

In 506, the second processor 401 transmits the key handles to the CPU 303.

In step 507 the CPU 303 of the HSM device 31 (also referred to as the main processor) transmits a request to derive a cryptographic key programmatically to the crypto co-processor 353. In an example the request is a "DeriveKey" request. In an example the crypto-coprocessor 353 provides an interface (e.g. an API) through which the CPU 303 (e.g. the main processor) can make requests to be implemented by the crypt co-processor 353. The "DeriveKey" command transmitted by the client 317 in step 503 is not the same command as the "DeriveKey" command transmitted by the CPU 303 in step 505.

The "DeriveKey" command transmitted by the CPU 303 in step 507 comprises a reference (for example a first key handle) to the program to be executed by the first cryptographic engine 411 (i.e. the desired algorithm to programmatically generate the cryptographic key). The "DeriveKey" command transmitted by the CPU 303 in step 507 also comprises a second key handle (associated with input key #2) and a third key handle (associated with input key #3). The "DeriveKey" command transmitted by the CPU 303 in step 507 also comprises a fourth key handle (associated with the template key). As discussed above, each key handle contains information enabling the data associated with each key to be retrieved from memory location in which it is stored.

The second processor 401 of the crypto co-processor 353 subsequently receives the "DeriveKey" request (transmitted by the CPU 303 (e.g. the main processor) in step 507). The method subsequently proceeds to step 508.

The second processor 401 checks the ACL requirements in step 508.

Figure 10:
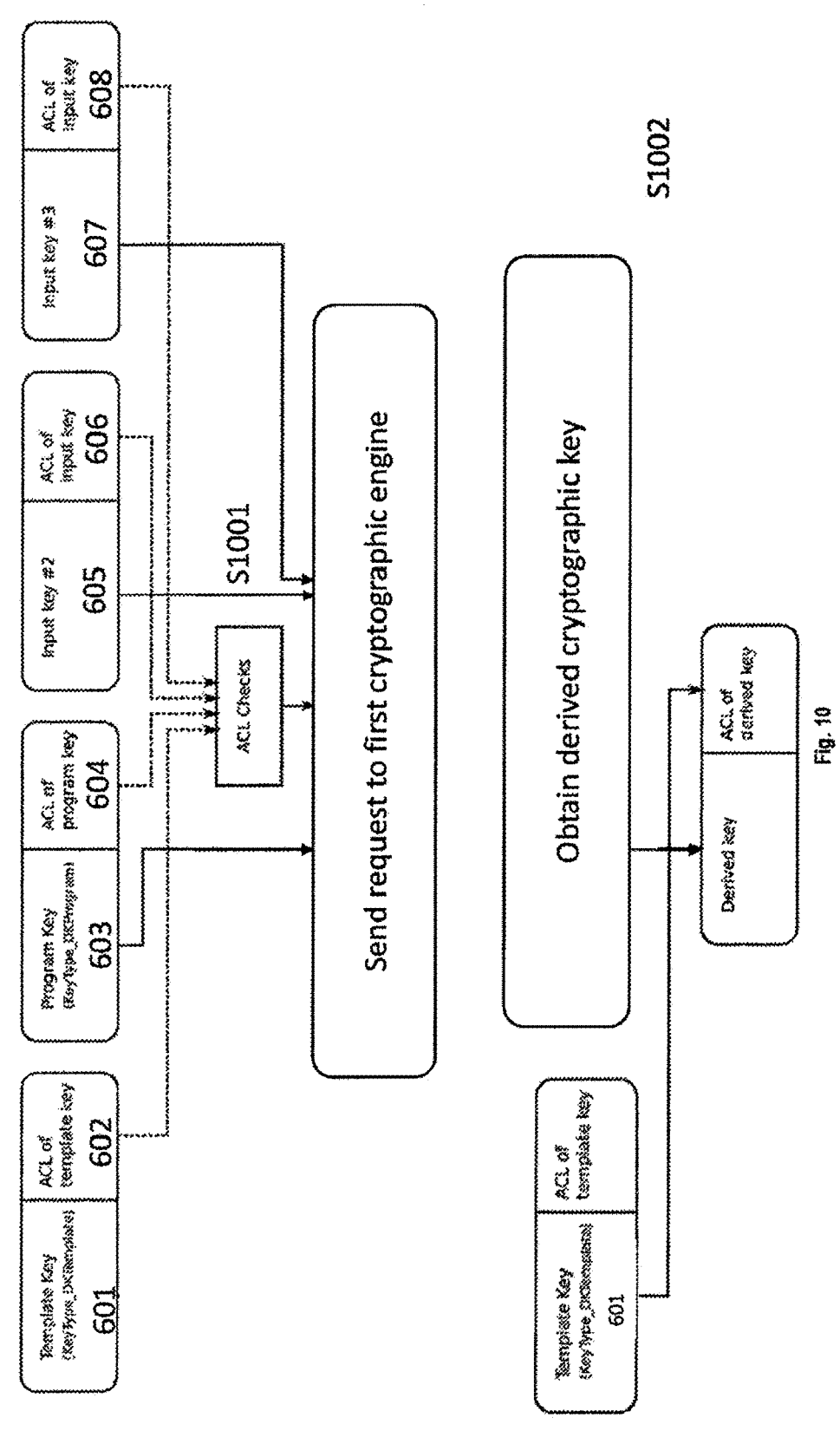
FIG. 10 shows a schematic illustration of a computer implemented method performed by the second processor 401, of the HSM 31 in accordance with an embodiment.

FIG. 10 shows a schematic illustration of a computer implemented method performed by the second processor 401, of the HSM 31 in accordance with an embodiment. In particular, in response to receiving the derive key command in step 507 (i.e. "Cmd_DeriveKey"), the second processor 401 first obtains the inputs specified by received key handles, in the example above, these inputs are the template key 601, the program key 603, the second input key 605 and the third input key 607, and their associated Access Control Lists (i.e. the fourth ACL 602, the third ACL 604, the first ACL 606 and the fifth ACL 608 respectively). After obtaining the inputs the second processor 401 performs Access Control List checks.

Computer code to obtain the required inputs based on the key handles received in the derive key command is part of the firmware executed by the CPU 303, for example it is included in the firmware during manufacture of the device or included in a firmware update. Computer code to perform the Access Control List (ACL) is also included during manufacture of the device. However, the computer code embodying the desired algorithm to generate the cryptographic key is not included in the firmware on the HSM device 31, but provided by the client as part of the program key 603.

When checking the Access Control Lists (ACLs) all of the constraints in all of the ACLs of the objects used in the operation are checked. If all of the constraints are met, the process moves to the next step (i.e. step 509). If any of the constraints are not met, the operation is terminated at this stage. In this case, the program represented in the program key 603 does not execute.

For a Derive Key operation, for each key participating, that key's ACL is searched for an Act_DeriveKey entry in which the role field matches the role in which the key will be used, the mech field matches the requested mechanism (i.e. the first mechanism), and for each other role, the otherkeys field either does not mention that role, or mentions the key hash of the key acting in that role. For example, the template "key" ACL 602 must allow the template 601 to be used in the template role. The program "key" ACL 604 must allow the program 602 to be used in the program role.

As described previously, each object may constrain the keys permitted to be used in one or more of the roles, by listing the permitted keys together with the role in the otherkeys field. An object for which the ACL does not list a particular role does not constrain that role, and therefore no check for that role need be made. The first determination thus comprises, for each ACL, a first step of determining whether each role which is included In the command is listed in the ACL, and then a second step of determining, for each role listed, whether the key identified in the role in the command 901 is included in the list in the ACL. If any key is identified in a role in the command 901 for which there is a constraint in an ACL, and the key does not meet the constraint, the first determination falls.

In this example, a first determination thus comprises determining whether the first access control list 606 of the second input key 605 (i.e. input key #2) permits input key #2 to be used. In the first mechanism, in the role to which is has been assigned, i.e. in this case as "DeriveRole WrapKey". This is confirmed by comparing the actions in the ACL 606 to the command 901, the mechanism identifier in the relevant action against the mechanism identifier in the command 901, and the role in the relevant action against the position in the order of the input key #2 identifier in the command 901. Note that although the first input key role is labelled as a "Wrap key", the first key is not necessarily used as a wrap key, but may perform any role specified by the cryptographic algorithm.

In this example, the first access control list 606 comprises a constraint relating to the program key. Thus the first access control list 606 comprises one or more identifiers of keys in the program role. The first determination thus further comprises determining whether the first access control list 608 of input key #2 permits input key #2 to be used with the program "key" 603 identified in the command 901. The first ACL 606 comprises a list of identifiers of all permitted keys in the "DeriveRole BaseKey" role, i.e. the program role. For example, the first ACL 606 comprises a cryptographic hash (such as SHA-1 or SHA-256) of the key type and key material for all permitted keys. In the case of the program key the "key material" is the serialised program. A cryptographic hash using the same hash function is taken of the program key 603 identified in the command 901 together with the key type "program" in step S1001 while performing the ACL checks. This is then compared to the list in the first ACL 606. If there is no match, the first mechanism is stopped and an error message returned to the client 317. The program code in the program key 603 is not executed.

Any further constraints are also confirmed. Each key may optionally constrain the identities of some or all of the other keys. For example, any of the input keys may constrain the ACL of the derived key, by constraining the template key with which they may be used. Optionally, the first access control list 606 comprises a constraint relating to the template key 601, i.e. the first access control list 606 comprises one or more identifiers of keys in the template role. The first determination thus further comprises determining whether the first access control list 606 of input key #2 605 permits input key #2 605 to be used with the template "key" 601 identified in the command 901. This is confirmed in the same way as described above, where in the case of the template "key", the "key material" is a serialised ACL.

The program "key" may also constrain the other keys. For example, the third access control list 604 may comprise a constraint relating to the input key, i.e. the third access control list 604 comprises one or more identifiers of keys in the various input roles. The first determination thus further comprises determining whether the third access control list 604 permits the computer program code in the program "key" 603 to be used with the input key #2 as input data, and/or to be used with the input key #3 as input data. In this way, the program may constrain what key(s) it may operate on. Authorisation may thus be two-way, in that a program's ACL may constrain the keys it operates on, just as a key's ACL may constrain the programs that can operate upon it. It may additionally or alternatively be determined whether the third access control list 604 permits the computer program code in the program "key" 603 to be used with the template key 601 as a template. Such checks are performed in the same manner as has been described above, by comparing cryptographic hash of the key identified in the command 901 to that in the third ACL.

The template "key" 601 may also constrain the other keys. For example, the fourth access control list 602 may comprise a constraint relating to the input keys, i.e. the fourth access control list 602 comprises one or more identifiers of keys in the input roles. The first determination may further comprise determining whether the fourth access control list 602 permits the template 601 to be used with the input key #2 as input data, and/or to be used with the input key #3 as input data. It may additionally or alternatively be determined if the fourth access control list 602 permits the template 601 to be used with the program 603 as program data. Again, such checks are performed in the same manner as has been described above, by comparing cryptographic hash of the key identified in the command 901 to that in the fourth ACL 602.

Figure 11:
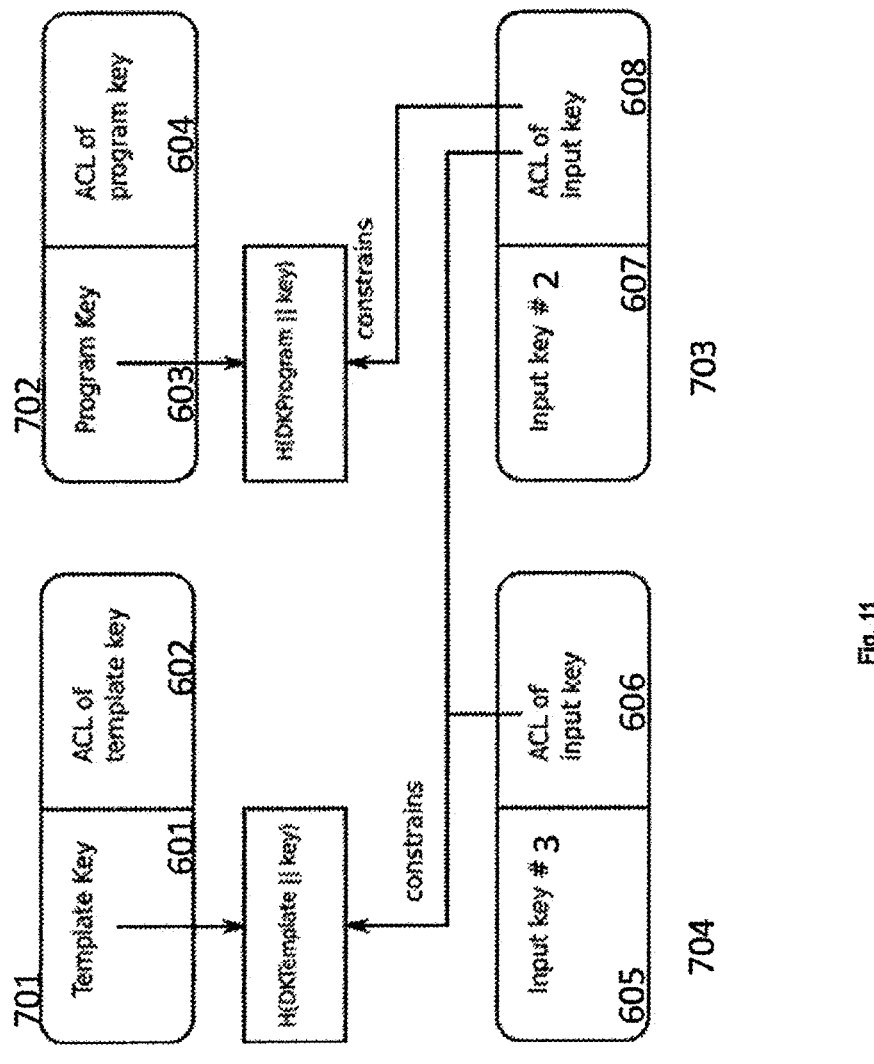
FIG. 11 shows an illustration of the constraints in the Access Control Lists (ACL) according to an example.

FIG. 11 shows an illustration of the constraints in the Access Control Lists (ACL) according to an example. In the example shown in FIG. 11, input keys #2 and #3 constrain the template key 601. Thus the ACL of both input key #2 and input key #3 lists an identifier of the template key 601 together with the role "template". One or more identifiers of other template keys may also be listed together with the "template" role. Input key #2 constrains the program key 603, thus the ACL of input key #2 lists an identifier of the program key 603 together with the role "program". Again, identifiers of other programs may also be listed with the "program" role in the ACL of the input key #2. However, input key #3 does not constrain the program key 603, and therefore the role "program" is not listed in the ACL of input key #3. During the first determination, it is checked whether the template key 601 is identified in the list of keys having the "template" role in the ACL of the input key #2 and input key #3. It is also checked whether the program key 605 is identified in the list of keys having the "program" role in the ACL of the input key #2. No check as to whether the program key 603 is identified in the ACL of the input key #3 is made, since the ACL of the input key #3 does not comprise the "program" role ("DeriveRole BaseKey"). As explained above, the constraint can be expressed as a cryptographic hash (such as SHA-1 or SHA-256) of the key type and key material. In the case of the template key the "key material" is the serialised ACL, while for the program key it is the serialised program.

If the first determination is successful, i.e. if all of the constraints in all of the ACLs are met, the process implemented by the HSM 31 proceeds to step 509. If any of the constraints is not met, the mechanism is terminated at this stage. In this case, the program contained within the program key 603 does not execute.

In summary when the first mechanism is performed (e.g. in response to receiving a command to perform the first mechanism as discussed in step 503), the policy (ACL) of each key is checked by the second processor 401 to determine whether the key may participate in the action in its selected role. Each key's ACL may also constrain the values of the keys in the other roles. If any ACL check falls the whole operation fails at this stage. An error message informing the client 317 is transmitted by the HSM 31 in this case.

If the ACL checks are successful, the second processor 401 proceeds to step 509.

Moving to FIG. 5B, after decrypting the keys and performing the ACL checks, the method proceeds to step 509.

In step 509 the second processor 401 loads the unencrypted registers 460 of the first cryptographic engine 411 with input key #2 and input key #3. In particular, the second processor 401 loads the unencrypted (i.e. "plain text") input key #2 and input key #3 into the key registers 462 of the first cryptographic engine 411. In step 509 the second processor 401 also loads the unencrypted registers 460 (specifically the instruction memory 461) with the representation of the desired algorithm that is to be used to programmatically generate the cryptographic key. After completing step 509, input key #2 and input key #3 are stored, unencrypted, in the key registers 462 and the desired algorithm is stored in the instruction memory 461. The method proceeds to step 510.

In step 510 the first cryptographic engine 411 executes the Derive Key (DK) program. In particular, the third processor 451 carries out the instructions listed in the derived key program, which are stored in the instruction memory 461. While executing the Derive Key (DK) program, the third processor 451 may retrieve the input key data stored in the key registers 462 and store information in the operating registers 463. In an example, the first cryptographic engine 411 runs through instructions in the DK program loaded in the instruction memory 461. In an example the third processor 451 uses a fetch, decode, execute, writeback loop such as the one used in a classic RISC architecture. Optionally, the third processor 451 accesses the hardware-accelerated cryptographic mechanisms 471 when executing the program instructions, thereby accelerating the program steps using specific hardware components.

If an error occurs during program execution, either because an error is explicitly raised, or because an impossible operation is attempted, an error is returned to the second processor 401, which is relayed to the CPU 303 of the HSM 31, which is relayed to the client 317.

As discussed above, one purpose of the user-defined DKprogram is to generate a cryptographic key programmatically (i.e. according to a user-defined algorithm). As a result, an output of the DKprogram is the generated cryptographic key. In an example, the final instruction of the DKProgram is to write the derived key back to the unencrypted memory 352. This operation is performed in step 511.

In step 511 the first cryptographic engine 411 writes the derived key (i.e. the output of the derive key program) to the un-encrypted memory 352. In an example, the first cryptographic engine 411 transmits a request to the second processor 401 containing the derived key, the request being for the second processor 401 to store the derived key in the unencrypted memory 352. For the avoidance of doubt it is noted that the derived key is "plain text" (i.e. unencrypted).

In response to receiving the request from the first cryptographic engine 411, the second processor 401 stores the derived key in the unencrypted memory 352.

In 511, an ACL is generated and stored associated with the derived key in the unencrypted memory 352, e.g. In the same location. The second processor 401 generates an Access Control List (ACL) associated with the derived cryptographic key. A second Access Control List (ACL) is generated and associated with the output key (i.e. the encrypted derived key). The second Access Control List (ACL) is generated from the template key 601 stored in unencrypted memory 352.

In step 512 the second processor 401 transmits a key handle of the derived key to the CPU 303: This signifies that a cryptographic key has been derived programmatically and that the second processor 401 has completed executing the derive key command sent by the CPU 303 to the second processor 401.

If the CPU 303 is to use the derived key, for example if the client has requested that the derived key is provided to the client or stored in a different location, then it will send a request to the second processor 401 for the derived key in 513.

In step 514, the second processor 401 retrieves the derived cryptographic key and, cryptographically binds the generated ACL to the derived cryptographic key. In step 515 the second processor 401 stores the cryptographically bound data packet in the encrypted memory 361. In this example, cryptographically binding the derived cryptographic key and the generated ACL comprises combining the key and the ACL and encrypting the combination using a cryptographic key (e.g. the "binding key").

Thus in step 514, the second ACL is bound to the output key. The second access control list and the output key are encrypted with a symmetric key for example. Some or part of the calculation performed in this step may be offloaded to a cryptographic engine for example.

Step 514 in FIG. 5B is also shown in FIG. 10, which shows a method performed by the second processor 401 of the HSM device 313 according to an example. FIG. 10 shows that in step 1002, the second processor 401 obtains the derived cryptographic key (e.g. by retrieving the derived cryptographic key from the unencrypted memory 352u). In step 1004 the derived key is cryptographically bound to an ACL. In an example, the ACL is the template key 601 of the first data packet 701.

In step 515 the second processor 401 stores the derived key cryptographically bound to the ACL in the encrypted memory 351. In an example, storing the derived key in the encrypted memory 351 comprises transmitting a request, from the second processor 401, to the CPU 303 (i.e. the main processor), to store the data in the encrypted memory 351. In response to receiving the request, the CPU 303 stores the data in the encrypted memory 351. The method proceeds to step 516.

After binding the second Access Control List (ACL) to the encrypted derived key in 514, and storing the result in encrypted memory 351. In 515, the method proceeds to step 516. In step 516 a reference to the result (i.e. the cryptographically bound derived key and corresponding ACL) is returned to the client 317, who can then use it like any other key (within the constraints defined by the ACL).

Unlike FIG. 2, where the operations that were performed as part of the wrap operation to generate the cryptographic key (i.e. S202) were included in the firmware run by the CPU 303 and stored on the HSM device 21. In the method shown in FIG. 5A and FIG. 5B the desired algorithm (to generate the cryptographic key) is not required to be stored on the HSM device 31 in advance, but may be provided in an input data packet as part of the program "key".

In the example discussed throughout the description two input keys (i.e. input key #2 and input key #3) are used to programmatically generate a cryptographic key. However, for the avoidance of doubt it is noted that the techniques described herein can be used with only one or more keys. As a result, in another example the "DeriveKey" command transmitted by the CPU 303 to the Crypto co-processor 353 contains one or more key handles and the subsequent actions (e.g. transmitting a derive key in step 505, fetching in step 506, decrypting in step 508, etc.) only use the one or more keys received in the "DeriveKey" command.

Figures 12A, 12B:
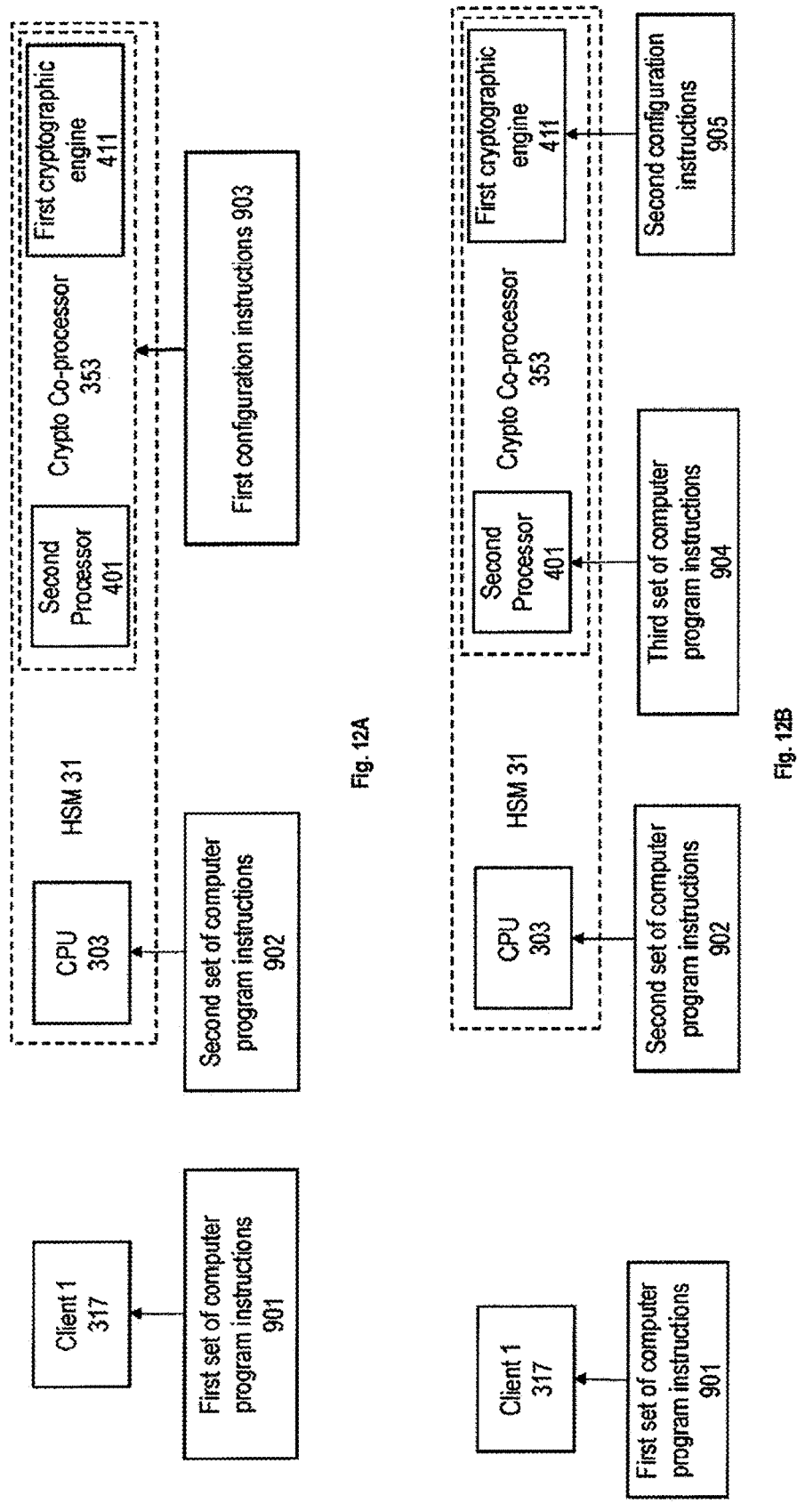
FIG. 12A shows a first implementation of the system according to an example.
FIG. 12B shows a second implementation of the system according to an example.

FIG. 12A shows a first implementation of the system according to an example. In an example there is provided a first set of computer instructions 901 accessed by the client 317. The first set of computer instructions 901 comprise instructions to import and load cryptographic keys onto the HSM 31 (as discussed in relation to step 501), receive key identifiers in return (as discussed in relation to step 502), transmit a DeriveKey request (as discussed in relation to step 503) and receive a derived key identifier (as discussed in relation to step 517).

In an example there is provided a second set of computer program instructions 902 that are stored in the non-volatile memory 305. In an example, the non-volatile memory 305 stores computer program instructions that are carried out by the CPU 303 in response to receiving a command corresponding to the operation (i.e. the Derive Key Operation) and the mechanism (i.e. the first mechanism to derive a cryptographic key programmatically). In an example the second set of computer program instructions 902 comprises instructions to load and import keys (as discussed in relation to step 501), return key identifiers (as discussed in relation to step 502), perform a number of actions in response to receiving a derive key command including: transmit encrypted data (as discussed in relation to step 504), receive key handles (as discussed in relation to step 506), transmit a DeriveKey message to the crypto co-processor (as discussed in relation to step 507), receive key handles of the encrypted derived key (as discussed in relation to step 512), request the derived key (as discussed in relation to step 513), store the encrypted derived key (as discussed in relation to step 515) and transmit a derived key identifier (as discussed in relation to step 516).

As discussed above, in an example the crypto co-processor 353 is implemented using a Field Programmable Gate Array (FPGA).

Figure 16B:
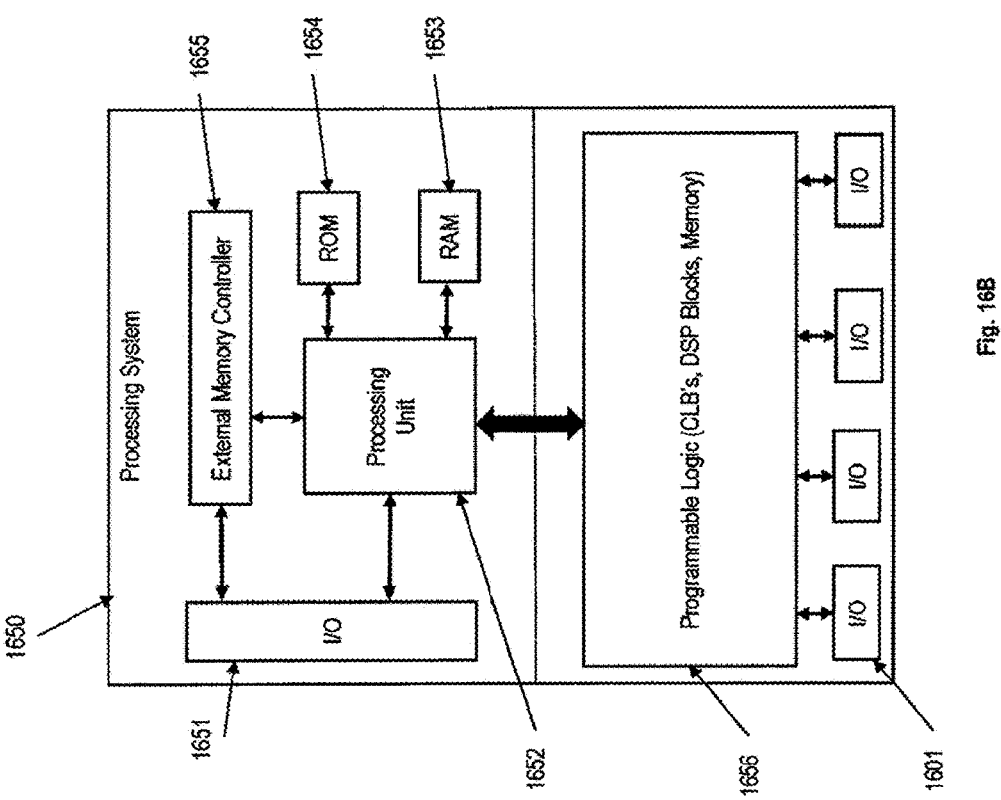
FIG. 16B shows a schematic illustration of a SOC Field Programmable Gate Array (FPGA), which may be included in a HSM device according to an alternative embodiment.
Figure 16A:
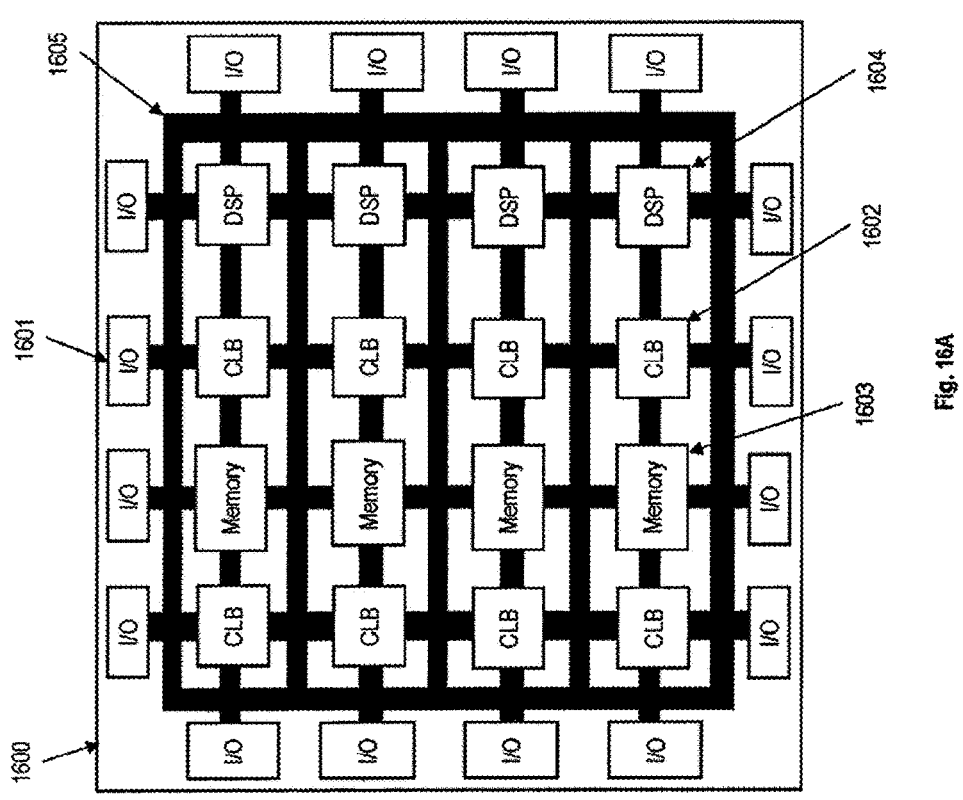
FIG. 16A shows a schematic illustration of an example Field Programmable Gate Array (FPGA), which can be included in a HSM device according to an embodiment.

FIG. 16A shows a schematic illustration of an example Field Programmable Gate Array (FPGA), which can be included in a HSM device according to an embodiment. For example, the crypto co-processor 353 included in the HSM of FIG. 3 may comprise an FPGA as shown in FIG. 16A.

FIG. 16A shows an FPGA 1600 comprising a plurality of Input/Output (I/O) interfaces 1601, a plurality of Configurable Logic Blocks (CLB) 1602, a plurality of memory blocks 1603, a plurality of Digital Signal Processing (DSP) blocks 1604 and a wiring network 1605. The wiring network 1605 comprises a plurality of vertical and horizontal channels communicatively coupled to the Input/Output (I/O) interfaces 1601, the Configurable Logic Blocks (CLB) 1602, the memory blocks 1603, and the Digital Signal Processing (DSP) blocks 1604, thereby forming a communication bus to which each of the blocks are connected and through which each of the blocks can communicate.

The wiring network 1605 also comprises a plurality of switch blocks at the intersection of vertical and horizontal channels. The switch blocks programmably route connections, i.e. can be programmed to form a connection, from a source to a destination (e.g. a 1 to 1 connection) or from a source to a plurality of destinations (e.g. a 1 to many connection), thereby forming a connection between the different blocks of the FPGA 1600. The FPGA architecture shown in FIG. 16A is known as an island-style architecture because it comprises a two-dimensional array of blocks comprising configurable logic blocks, memory blocks and DSP blocks (i.e. the islands) within a sea of routing interconnections. Other FPGA architectures can alternatively be used.

A Configurable Logic Block (CLB) 1602 comprises a programmable Look Up Table (LUT). A Look Up Table (LUT) comprises an array of data which maps input values to output values. In an example, the Look Up Table is implemented as a 3-input LUT, in which the Look Up Table takes 3 digital inputs and generates a single digital output based on the input values. Alternatively the Configurable Logic Block (CLB) comprises a 4-input LUT or a 6-input LUT. A Configurable Logic Block (CLB) may further comprise a full adder, comprising a circuit that adds three numbers; two inputs and a carry in, and produces two outputs, an output value and a carry out and a D-type flip flop, for generating synchronous logic.

A memory block 1603 comprises Random Access Memory (RAM) that is used by the configurable logic of the FPGA. Optionally the memory block 1603 is Block RAM, optionally of size 36 Kilo Bytes (KB).

A Digital Signal Processing (DSP) block 1604 comprises dedicated logic circuits (i.e. fixed circuits) for performing digital signal processing operations. In an example, the Digital Signal Processing (DSP) block 1604 comprises dedicated circuitry to perform two's-complement multiplication, addition and subtraction.

An Input/Output (I/O) interface 1601 comprises an interface through which information can be received into the FPGA 1600 and through which information can be transmitted out of the FPGA 1600. Optionally each Input/Output interface 1601 is associated with a pin of the FPGA package i.e. a metal connection to which a wire or a trace on a PCB, such as an electrically conductive connection, can be connected. Optionally the Input/Output (I/O) interface 1601 supports various different signalling techniques including, but not limited to, Low Voltage CMOS signalling (LVCMOS), Low Voltage Differential Signalling (LVDS) and/or Stub Series Terminated Logic (SSTL).

The process of configuring the FPGA to implement the desired logic functions is referred to as the FPGA design flow. A first step of the FPGA design flow is design entry. In this step a user generates a description of the hardware circuit that the FPGA is to implement. The description may take the form of a schematic. Alternatively, and more likely for complicated designs, the hardware circuit may be described using a Hardware Description Language (HDL) such as VHDL (Very high speed integrated circuit Hardware Description Language).

A second step of the FPGA design flow is synthesis. During synthesis the high-level hardware description of the circuit, which may be in the form of a Hardware Description Language, is converted to a hardware architecture (i.e. a gate-level circuit) that uses the primitives of the specific FPGA, i.e. the smallest atomic logic elements of the FPGA like flip-flops, multiplexers, block RAM etc. The output of synthesis is a netlist, also referred to as an un-routed netlist or a post-synthesis netlist, comprising an indication of the FPGA elements used to implement the hardware circuit and an indication of the interconnections between these elements.

A third step of the FPGA design flow is place and route. During place and route the netlist (generated in step 2) is analysed and mapped to a specific physical hardware resource in the FPGA (place), the elements are then interconnected (route) to form the functionality of the hardware circuit (specified in step 1). The place and route step can be subject to a number of constraints. For example, a user can specify timing constraints to ensure logic elements will comply with timing requirements, for example a synchronous circuit being able to process data accurately at a specified clock rate. Alternately or additionally, the location of design elements can be constrained to specific areas of the FPGA die, known as Absolute LOC (Location) constraints.

The output of place and route is a FPGA bitstream, also referred to as a bit file. The FPGA bit stream comprises programming information that is used by the FPGA to implement the hardware circuit, i.e. implementing the functionality specified in step 1, using physical FPGA resources, according to the user constraints regarding timing/placement etc. of step 3.

In an example the FPGA bit file is loaded in to a non-volatile memory of the HSM, and the FPGA is configured to read the bit file from the non-volatile memory during power up and implement the functionality of the bit file. In another example a bit file is loaded onto the FPGA using a JTAG programmer (named after the Joint Test Action Group).

In an example there is provided a bit file comprising configuration instructions to configure the crypto co-processor 353 (for example, by configuring the internal fabric of the FPGA to implement the functionality discussed in relation to the crypto co-processor 353). For example, to configure the internal fabric of the FPGA to realise the hardware components (e.g. the hardware that performs the instructions in the first instruction set architecture the unencrypted registers 460, the hardware-accelerated cryptographic mechanisms 471, the third processor 451). The configuration instructions may also comprise instructions to configure the FPGA internal fabric to replicate the functionality of the second processor 401 as discussed above (e.g. in the form of a hardware implemented state machine). Optionally the bit file is an encrypted bit file.

FIG. 12B shows a second implementation of the system according to an example. Like reference numerals denote like components. In FIG. 12B the crypto co-processor 353 is implemented on a SOC-based FPGA (i.e. a FPGA that comprises a fixed processor).

FIG. 16B shows a schematic illustration of a SOC Field Programmable Gate Array (FPGA), which may be included in a HSM device according to an alternative embodiment. For example, the crypto co-processor 353 included in the HSM of FIG. 3 may comprise an SOC FPGA as shown in FIG. 16B. A SOC FPGA integrates processor and FPGA architecture. An SOC FPGA is a device that comprises a System-on-a-Chip and programmable logic on the same device, thereby combining the high-level management functionality of a processor and the data processing capability of the configurable logic into a single device.

The SOC FPGA is logically divided into a processing system 1650 and programmable logic 1656.

The processing system 1650 forms the System-on-a-Chip (SoC), and comprises an Input/Output (I/O) interface 1651, processor 1652, on-chip Read Only Memory (ROM) 1654, on-chip Random Access Memory (RAM) 1653 and external memory controller 1655. The Input/Output (I/O) interface 1651 is communicatively coupled to processor 1652. Processor 1652 is optionally an application processor unit. In one example the processing unit 1652 is an ARM Cortex-A9 Based processor. The processor 1652 is coupled to on-chip Read Only Memory (ROM) 1654, and on-chip Random Access Memory (RAM) 1653. The processor 1652 is also coupled to external memory controller 1655 configured to communicate via Input/Output (I/O) interface 1661 with off-chip memory.

The processing system 1650 is configured to execute program instructions retrieved from memory, for example boot instructions retrieved from the on-chip ROM 1654 and computer program instructions (e.g. the third set of computer program instructions 904), optionally retrieved from the non-volatile memory, such as Flash memory. Optionally the computer program instructions are retrieved from the unencrypted memory 352.

The processor 1652 is configured to communicate with programmable logic 1656 via an interconnect, for example a bus. In one example, the interconnect is an ARM AMBA® AXI based interface. In this way, the software being executed by the processing unit 1652 can interact with the programmable logic. 1656, for example to obtain a value calculated by the programmable logic 1656, or to start a hardware operation etc.

The programmable logic 1656 comprises Configurable Logic Blocks (CLBs), Digital Signal Processing (DSP) blocks, and memory blocks as described in relation to FIG. 16A. The FPGA also comprises Input/Output (I/O) interface 1601 similar to those described in relation to FIG. 16A that are communicatively coupled to the programmable logic 608. A bit file for the programmable logic 1656, including instructions on how to configure the programmable logic to perform the desired functionality, can be generated in the same way as discussed in relation to FIG. 16A and stored in non-volatile memory of the HSM, optionally in unencrypted memory 352.

An example of a SOC FPGA is the XILINX® Zynq®-7000 family.

In the example of FIG. 12B, there is provided a third set of computer program instructions 904. In an example the third set of computer program instructions are stored in the memory.

The third set of computer program instructions 904 comprises instructions to perform the functionality of the second processor 401 as discussed above.

In FIG. 12B there is also second configuration instructions 905. In an example the second configuration instructions 905 is a bit file, optionally an encrypted bit file. The bit file comprises configuration instructions to configure the crypto co-processor 353 (for example, by configuring the internal fabric of the FPGA to implement the functionality discussed in relation to the first cryptographic engine 411). For example, the bit file comprises instructions to configure the internal fabric of the FPGA to realise the hardware components of the first cryptographic engine 411 (e.g. the hardware that implements the instructions in the first instruction set architecture 491, the unencrypted registers 460, the hardware-accelerated cryptographic mechanisms 471, the third processor 451).

In an example where the second configuration instructions 905 is a bit file, the bit file is loaded by the FPGA (implementing the crypto co-processor 353) from the unencrypted memory 352 on start-up of the HSM 31 as discussed in relation to FIG. 11A. In another example, the bit file is stored in the non-volatile memory 305, retrieved by the CPU 303, and loaded onto the FPGA (implementing the crypto co-processor 353).

As discussed above once the CPU 303 loads the first set of computer program instructions 901 into working memory, the operation (e.g. the "Cmd_DeriveKey" operation) and mechanism (e.g. the "DeriveMech Programmed" mechanism) may then be used (e.g. by a user of the client 317) to implement various algorithms provided by a user in program "keys". The remaining input keys (identified in the operation) are made available to the client program to operate on. As discussed above, the ultimate result of the client program's execution is a derived key, which is assigned an ACL from the template "key", and can then be used in any way that this ACL permits.

By providing the program "key" and requesting the first mechanism to be performed, a client may implement a cryptographic algorithm, without having to carry out a firmware upgrade. By exploiting the ACL system, a client may constrain which keys the algorithm may be applied to and control what authorisation is required to execute it. As discussed, this check of the relevant ACLs is performed by the CPU 303 (i.e. the main processor) before the client program code in the program "key" is executed by the crypto-coprocessor 353. The client program code in the program "key" is only executed (by the crypto co-processor 353) once permission has been established by the CPU 303 (i.e. the main processor). It then runs to completion, producing one or more derived keys.

Expanding on the example discussed in relation to FIGS. 5A and 5B.

Figure 13:
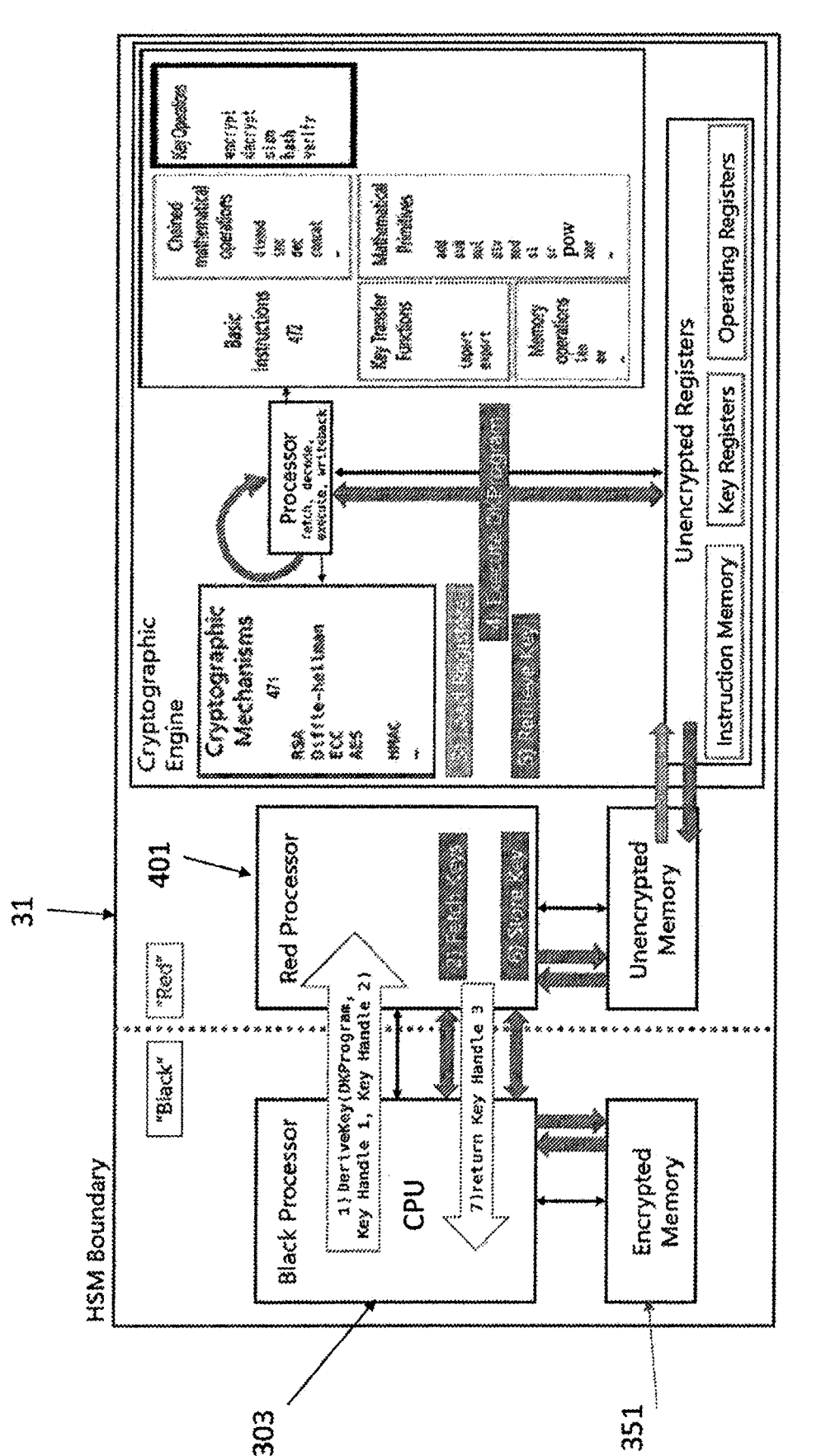
FIG. 13 shows an illustration of the method performed by the HSM 31 according to an example.

FIG. 13 shows an illustration of the method performed by the HSM 31 according to an example. FIG. 13 omits some of the components in the HSM device 31 discussed in relation to FIG. 3 for clarity. FIG. 13 shows how information security is maintained when performing the method of FIGS. 5A and 5B.

The CPU 303 is termed a "Black" processor.

The red/black concept refers to a segregation in cryptographic systems between sensitive information ("red" information), for example comprising plaintext of cryptographic keys and non-sensitive information ("black" information), which may comprise encrypted keys for example. By design, in the methods described above, the CPU 303 only handles black information (including encrypted information). As a result the CPU 303 is referred to as a "black" processor.

Likewise, the second processor 401 is referred to as the "red processor", "red" because the second processor 401 handles unencrypted (i.e. plain text) sensitive information.

As discussed above, the CPU 303 is a general purpose processor and could in some cases be accessed by various different users (or "tenants"). Since the CPU 303 only handles non-sensitive (e.g. encrypted) information, the likelihood of a security vulnerability is reduced.

In step 505 of FIG. 5A, the Red processor (i.e. the second processor 401) has decrypted the keys and stored them in the unencrypted memory. By decrypting the encrypted keys, the keys are "red information" in the sense that the cryptographic keys are now plaintext. As will be apparent from the dashed boundary (provided for illustrative purposes only) shown in FIG. 12, this method, by design, creates a boundary between components that handle black (encrypted) information, and those components that handle red (plain text) information.

In particular, when implementing the method discussed in relation to FIG. 5A, a first step corresponding to the step 507 in FIG. 5A, involves a DeriveKey operation initiated by the Black processor 303, which provides a reference to a DKProgram, and the keys used to execute the program (two in this example), to the red processor (i.e. the second processor 401). The CPU 303 (i.e. the "black processor") uses the key handles, (as opposed to the plain text cryptographic keys). As a result, the plain-text cryptographic keys are not known by the CPU 303.

In a second step, the first processor 401 fetches the keys that it has previously stored in unencrypted memory in step 505.

In a third step corresponding to step 509 load registers is carried out. The registers of the first cryptographic engine 411 are loaded with the key information, and the instructions of the DKProgram as discussed in relation to step 509 of FIG. 5B.

In a fourth step corresponding to step 510 execute DKProgram is carried out. The first cryptographic engine 411 runs through instructions in the DKProgram loaded in the instruction memory as discussed in relation to step 510. For example this could be a fetch, decode, execute, writeback loop such as the one used in a classic RISC architecture.

In a fifth and sixth step corresponding to step 511, retrieve key and store key is performed. The final instruction of the DKProgram will be to write the derived key back to the unencrypted (red) memory.

In a seventh step return Key Handle is performed, corresponding to step 512. The handle corresponding to the derived key is returned to the main processor.

As will be appreciated from FIG. 13, the methods described herein ensure that the general-purpose CPU 303 to handles black information (such as key handles rather than plaintext keys). Furthermore, the CPU 303 instructs a cryptographic co-processor dealing with red information to enact Programmable Key Derivation (PKD), which in turn selects one of a number of crypto-engines to perform the PKD in an accelerated manner.

Through careful control of which operations are permissible on this reduced instruction set processor, plus the maintenance of Access-Control List (ACL) requirements on the input & output keys, and on the program itself by the more general crypto-processor operating above it in the chain, the security of key information is never compromised or exposed to the black processor.

Furthermore, in an example, the CPU 303 is physically separate from the crypto co-processor and implemented in a separate device. This architecture allows some level of physical red/black separation as the crypto co-processor and crypto-engine(s) exist separately from the general purpose processor.

In such systems where red/black separation is crucial execution of arbitrary user-provided code is unacceptable. The methods described herein provide a way to strictly sandbox user-provided code for the particular functions of PKD in a secure system whilst allowing direct hardware acceleration. Advantageously, this approach restricts allowed instructions (to only those relevant to PKD), restriction of input and output values, uses dedicated memory, and uses unidirectional information paths in & out of the processor.

Furthermore, as this invention could be implemented in configurable FPGA fabric, reconfiguration in the field allow mitigations against any discovered microarchitectural attacks and/or silicon erratum which plague modern general-purpose processors.

Figure 14:
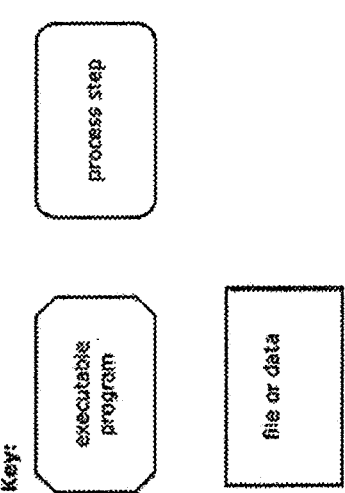
FIG. 14 shows a process for generating the HSM firmware according to an example.
Figure 14:
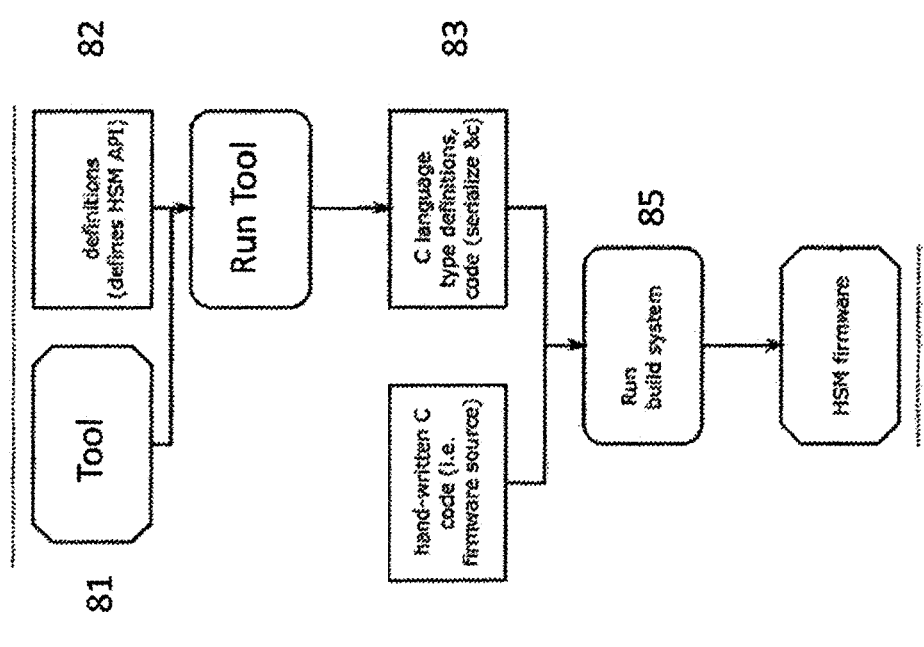

FIG. 14 shows a process for generating the HSM firmware according to an example. The HSM firmware is generated on a server of a trusted party, and then introduced to the HSM during manufacture or as a download or update. Thus the following steps are performed on the server of the trusted party.

To generate the HSM firmware code, a tool 81 is used to generate language-specific representations of data types (including the functions), and to generate language-specific code, including code to generate a serialised representation of the data types and to de-serialise serialised representations of the data types, and the interpreter program. The data types include a data type corresponding to each of the functions (Sign, Branch, etc) in the set of functions available to the client to use as part of the client algorithm. In this example, the language is C. The tool 81 runs in a build system of the trusted party, for example on servers in a data centre of the trusted party.

A syntax is associated with the tool 81. The syntax describes the data types, in a language-independent way. The tool 81 is used to automate part of the process of developing the HSM firmware. The syntax defines the format of the commands sent to the HSM and the replies it sends back. The format of the client program is also defined by this syntax (i.e. the data types corresponding to the set of functions), however, the client program is not represented in the syntax. Rather, a text representation of the program is written by the client using the custom-representation as described above.

Objects in the syntax have types, which determine what values they may hold and how they are used, Some types, called primitive types, are built in to the tool 81. The syntax provides a way of defining new types. The built in types may include:

Word: represents integers in the range $0<=n<=4294867295$;

Bignum: represents integers without any inherent bound—in practice implementations may impose some kind of limit;

Byteblock: represents sequences of bytes—in principle any length up to 4294967295 is permitted, but in practice implementations may have smaller limits.

In the syntax, some ways of defining new types include:

An enumeration type: a collection of names with associated numeric values. Values of enumeration types can also have structure types associated with them.

A bitmap type: a collection of up to 32 bit named flags, each of which can take the value 0 or 1.

A structure type: a sequence of fields, each of which has a name and a type.

Fields in a structure can have any type. Fields can be optional—in this their presence or absence in a structure depends on the value of a flag in a bitmap in the same structure. Fields can be tables, meaning that they can hold 0 or more values of their type (normally they hold exactly 1 value). Fields can be variadic, meaning that their type depends on the value of a field with an enumeration type in the same structure. Specifically, the type is the structure type associated with that value.

In the syntax, type names, enumeration value names and (with certain exceptions) flag names normally start with capital letters. Field names in structures normally start with lower-case letters.

A language binding comprises a convention for mapping these concepts into the concepts of the target language (e.g. C, Python). The tooling 81 implements this mapping. The tooling 81 implements this mapping.

The input 82 of the tool 81 is a collection of data types, represented in the syntax, including data types corresponding to each of the functions (Sign, Branch, etc). An excerpt from an Application Programming Interface (API) definition is shown in Appendix 1. This is an excerpt from a definition document, with the human-readable commentary in square brackets, which forms the API documentation. The excerpt lists the data type definitions in the syntax. These data types expressed in the syntax are taken as input to the tool 81 and the tool 81 is run on the trusted party server.

The output of the tool 81 is a language-specific representation of those data types, i.e. the same types represented in C syntax, and code that operates on those data types. Specifically, serialisation C code and de-serialisation C code that operates on these data types is output. This is combined with further C code, including C code embodying the functions (Sign, Branch etc), C code embodying the interpreter, C code embodying the first mechanism and the Derive Key operation, and C code embodying any other desired functionality of the HSM device 21.

The tool 81 generates C code and C language type definitions (C structures). This is combined with further C code 84. A compiler is run in step 85. The compiler generates compiled machine code, i.e. native code that is compiled to run on the HSM device 31. This is the HSM firmware. The HSM firmware is then introduced to the HSM during manufacture or as a download. The firmware then runs on the HSM device 31. The code running on the HSM, i.e. 'the firmware', is machine code, implementing both existing HSM functionality as well as the functionality described herein. The firmware may comprise hand-written code as well as portions generated by the tool 81. Primarily, the tool 81 generates serialization and deserialization code.

The tool 81 may also be used to generate code in a range of programming languages for use on general-purpose computing platforms, for example Java or Python. For example, as has been described above, the client writes a textual representation of the program code, i.e. a text file, using a custom-designed representation. The custom designed representation is closely related to the syntax, in the sense that the functions in the custom representation (Unpack, Loadint, Sign, Branch) map directly to the definitions in the syntax. It is not written in the syntax however. A translator 87 is executed on the client machine 317 to translate the textual representation into a serialized form.

As well as being used to generate the firmware, the tool 81 may also be used to generate the translator 87, in the manner described below.

The translator 87 comprises Python code.

Figure 15B:
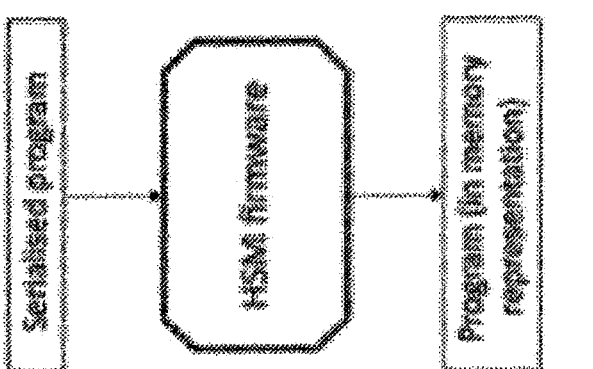
FIG. 15B shows a deserialization process according to an example.
Figure 15A:
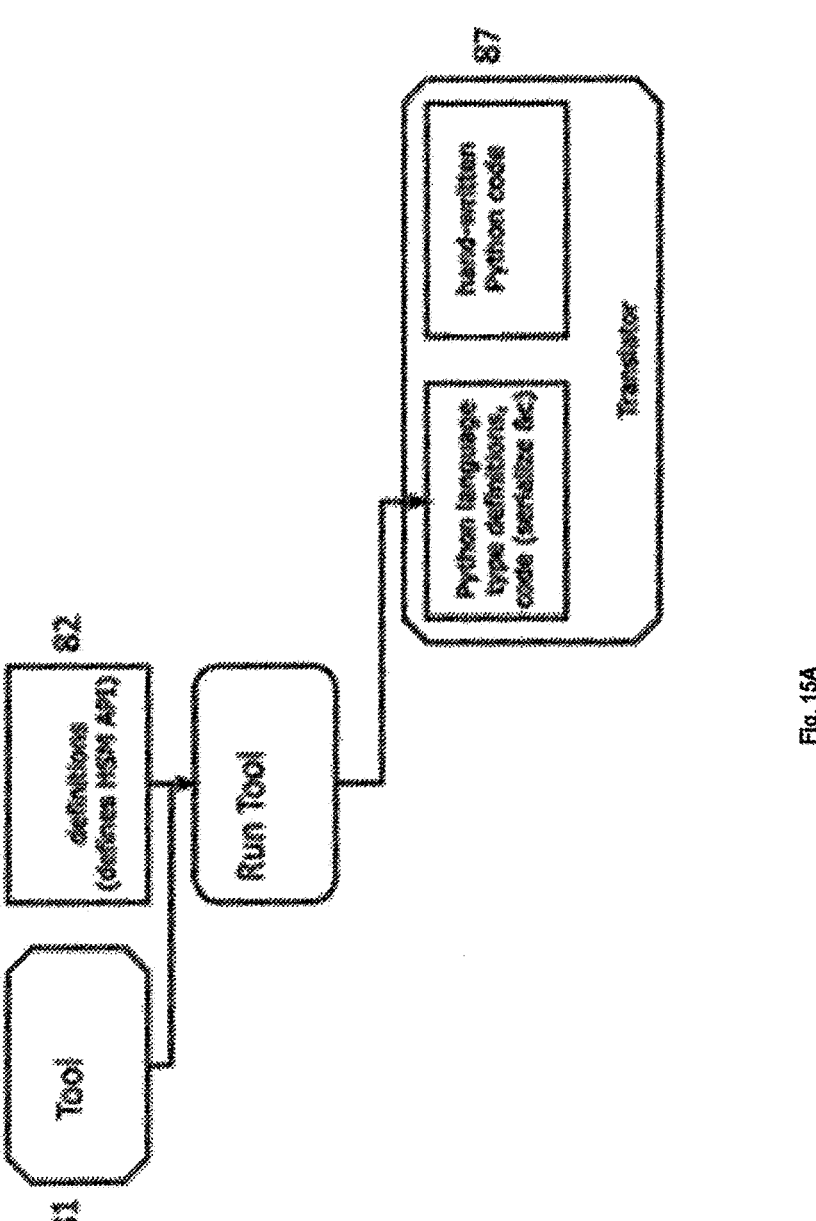
FIG. 15A shows a process for generating the translator 87.

FIG. 15A shows a process for generating the translator 87. The translator code is generated on a server of a trusted party, and then introduced to the client machine 317 as a download for example. Thus the following steps are also performed on the server of the trusted party to generate the translator 87.

As described before, the tool 81 is run on the trusted party server, this time to generate Python code. The output of the tool 81 in this case is language-specific (in this case Python) representations of the data types, i.e. Python language type definitions, and Python code. This forms the translator 87. The translator 87 comprises code that translates a text representation of the client program into Python source code, and code that translates the Python source code into a serialised representation, using the Python language type definitions.

As has been described above, the client writes a textual representation of the program code to be used in the programmable key derivation, using a custom-designed representation. The translator 87 is executed on the client machine 317 to translate the textual representation into a serialized form. The translator 87 unpacks the text representation, recognises each data type and builds Python source code corresponding to the client program, using the Python language type definitions. In particular, the Python definition corresponding to the DKProgram data structure described in Appendix 1 describes the Python structure corresponding to a client program. The translator 87 builds the Python source code representation of the client program comprising an array of program steps using this definition.

The serialisation code then serialises this Python source code, i.e. converts the Python source code into a bit string, using the numeric constants corresponding to each data type. The translator 87 thus runs on the client machine 317 and generates a serialized representation of the program, in the format expected by the HSM 31. A consistent serialization is used throughout, such that there is one true byte string (i.e. serialization) for any given client program.

In this case, the translator 87 maps from the textual representation to program source code, i.e. Python code, and then from the Python code to the serialised representation. However, it could alternatively be configured to map from the textual representation to an in memory representation, and then to a serialised representation. Alternatively, it could map directly from the textual representation to the serialised representation.

The bit string representation of the client algorithm is transmitted from the client machine 317 to the HSM device 31. The client includes the serialized representation in their application and submits it to the HSM device 31 when they wish to make use of the algorithm.

The HSM device 31 receives the serialized form of the client program and deserializes it into an internal format that is suitable for execution, as has been described previously. This process is illustrated in more detail in FIG. 15B.

FIG. 15B shows a deserialization process according to an example.

As described above, the de-serialisation code takes as input the bit string, which is the serialised representation of the client program code, and converts it into an in-memory representation. The in-memory representation may comprise an array in which each entry corresponds to a step in the client program, identified by the numeric constant corresponding to the function. This de-serialisation step is performed when the serialised program is received at the HSM device 31. The program ACL, template, and template ACL are also de-serialised using the same de-serialisation code.

Although in the above example, a tool 81 is described to generate part of the firmware and the translator, the firmware and translator code may be generated in various other ways.

An excerpt from an API definition document is shown in Appendix 1, with human-readable commentary in square brackets. The API runs on the HSM device 31, and interacts with the firmware. The API handles incoming commands to the HSM 31 and outgoing replies from the HSM. The API also defines the serialisation format, the ACL structure, etc. The definitions are in the language non-specific syntax described above, and are described in more detail below by example.

Within a computer program the definitions are represented as data structure definitions in whatever specific programming language is being used. Thus when the HSM firmware is generated as described above, data structure definitions in C code corresponding to the definitions in Appendix 1 are included in the C language type definitions in FIG. 14, and these are compiled into machine code in step 85. For example, the "Sign" function is represented as a C structure with fields called brdest, brmsg etc. Machine code corresponding to the sign function is also included in the firmware. The DKProgram definition, which is the definition for the client program data structure, is also translated to a C struct called M_DKProgram with fields called flags, nbbr, nir, etc. Similarly, within the translator 87, Python language definitions are used.

Each data type, i.e. each definition, is accompanied by generated code which will translate it from and to sequences of bytes in a consistent but language-neutral way, i.e. the serialisation and de-serialisation code described above, included in the HSM firmware and in the translator 87 on the client machine. The byte sequence format is used when communicating between the client machine 317 and the HSM device 21. The numeric values are used to give the serialized form of the enumeration type. The definitions DeriveRole WrapKey=2 and DeriveRole Key3=3 in the Appendix 1 define two of the values of the DeriveRole enumeration, used for input key #2 and input key #3 respectively.

The DKProgramOp LoadInt=8 and DKProgramOp Get-Length=9 definitions define two values of the DKPro-gramOp enumeration, each with an associated structure. These correspond to functions that may be used in the client program. The structures are translated into language-specific representations (e.g. a struct in C or a class in Java) by the tool 81. Each structure as a whole is serialized by serializing each of its fields in order. The DKProgramStep definition defines a structure called DKProgramStep, with two fields. There is a relationship between these two fields. The first, op, has enumeration type. This controls what type args will take. The second, args, has type depending on the value of op. If op=8 then the Args structure from DKProgramOp Loadint is used. If op=9 then the Args structure from DKProgramOp GetLength is used. The same principle applies for all the other values of the DKProgramOp enu-meration.

The DKProgram definition defines a structure called DKProgram, which corresponds to the client program. The flags field is a bitmap. It contains two possible flags, ExposeErrors and ?curve. The curve field is optional, it is only present if the ?curve flag is nonzero. The program field is not just one DKProgramStep, but any number of objects of that type.

Although a specific example as to how the programs and policies are presented is described above, various other options for presenting the programs and/or policies are possible. For example, the program may be passed directly to the operation, rather than presented as a key. In this case, constraints on the program (in the policies attached to keys) would be a separate type of constraint, rather than a con-straint on a key in a particular role. These constraints may still be provided in an ACL for example. For example, the program may be preloaded into the device performing the operation, in some form other than as a key, and referenced by a name or identifier in the operation. Thus a data packet comprising the program may be pre-loaded into the HSM device, and obtained, i.e. retrieved in this case, when refer-enced in the command 501. The data packet may be in the form of a file loaded onto the device. Alternatively, the program may be referenced by a name or identifier during the operation and retrieved from some external source on demand. Alternatively, the program may be physically pre-sented to the device, e.g. via an attached keyboard or keypad, or presented to the device via a removable storage medium. In such cases, the program may be identified by a filename for example. The ACL may be provided embedding in the file, or in a separate associated file for example.

Furthermore, although a specific example as to how a policy (ACL) is bound to programs and keys is described in the above example, various other means could be used. For example, a device might have fixed policies for each key type, or have some means for policies to be physically presented (e.g. if it operates in a secured physical environ-ment). Various ways of ensuring that the relationship between each object and its policy is secure, in the sense that the relationship is either immutable or can only be changed by authorised users, may be used.

Furthermore, although in the above described example a second policy for the output data is provided in a template "key", various other means could be used. For example, a device might have fixed policies for the output key, or have some means for a policy for the output data to be physically presented. The second policy may be preloaded into the device in some form other than as a key, and referenced by a name or identifier. Alternatively, the second policy may be referenced by a name or identifier during the operation and retrieved from some external source on demand. Alterna-tively, the second policy may be physically presented via a removable storage medium. Alternatively, the output may have no associated policy, if no restrictions on its use are desired. In this case, no template key is provided.

Although in the above described example, the program generates a single output key, this is not limiting, and more than one output may be generated. Each output may be generated with the same policy, or a different policy can be associated with each output. In this case, multiple template keys are taken as input, and each is designated with a role that ties it to one of the outputs. For example, such a scenario may be useful for generating an asymmetric key pair. In this case, the program code would embody an operation to generate an asymmetric key pair. A different policy would then be associated with the generated public key and private keys. These policies could be provided in separate template keys for example. Furthermore, although in the above described example, the output of the program is a derived key, the program may provide outputs other than crypto-graphic keys. For example, the program may output signed data, where the data to be signed and the signing key are taken as input.

Furthermore, although in the above described example objects (programs, templates and keys) are identified by the cryptographic hash of the type and value of the object, other methods of identification of the objects may be used. For example, any means of identifying these objects that makes it impractical to substitute one object for another may be used. For example, object identifiers could be bound to objects in the same way as policies are, a device could have fixed identifiers for objects, non-secret objects (e.g. pro-grams, templates and public keys) could be identified directly by their value; or objects could be identified by a cryptographic hash of their value (i.e. excluding their type).

Furthermore, although in the example above the machine code instructions that can be used on the third processor 451 are restricted, it will be appreciated that this is an optional feature, and in other examples, the use of the machine code at the third processor 451 is not the subject of any limitation (i.e. all of the machine code instructions at the third pro-cessor 451 could be used).

In the above described methods, a program or program-like object is supplied with a bound policy. Although the term "program" is used in the above, it may be that a client supplies an opaque "blob" of data, which is then executed as a program on the device. In such cases, the policy is bound to data.

In the above described methods, various steps are described as being performed on the client machine 317. However, a client may access a HSM device 31 in various ways. For example, some or all of the steps described as being performed on the client machine 317 may be performed on a separate server through a web application accessed on the client machine for example.

Described below is another embodiment. In the example of FIG. 1, the crypto co-processor 311 comprises an application-specific integrated circuit (ASIC) comprising fixed logic circuitry configured to perform the operations. An alternative embodiment is discussed further below.

Figure 17:
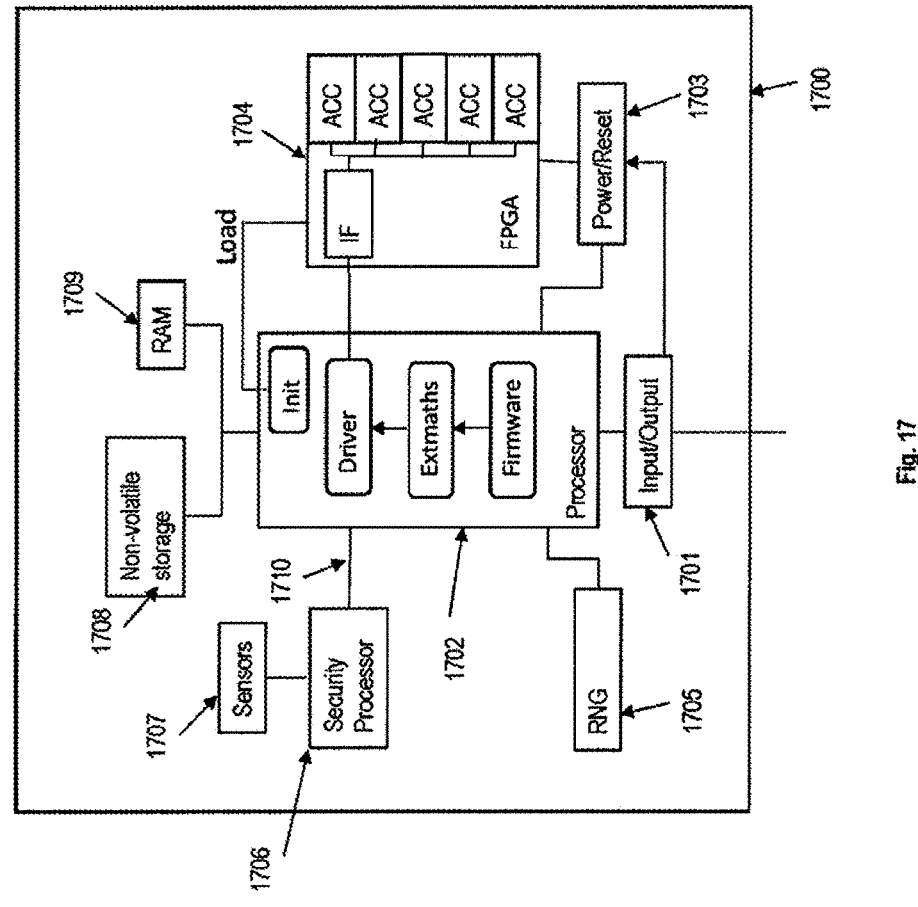
FIG. 17 is a schematic illustration of a plan view of a HSM device according to an alternative embodiment, wherein the HSM device comprises an FPGA.

FIG. 17 is a schematic illustration of a plan view of a HSM device according to an alternative embodiment, wherein the HSM device comprises an FPGA. FIG. 17 shows a Hardware Security Module (HSM) comprising a plurality of discrete interconnected hardware components. Each of the components (discussed in more detail below) are located on a surface of a Printed Circuit Board 1700. The Printed Circuit Board 1700 comprises electrically conductive connections 210 for communicatively coupling the components to each other.

The Hardware Security Module (HSM) comprises an Input/Output (IO) connector 1701. The IO connector 1701 is communicatively coupled to a processor 1702 located on the PCB 1700 and is configured to act as an interface, through which data is communicated, between the processor 1702 and an external system. The Hardware Security Module (HSM) is configured to be communicatively coupled to a computer or server device in an external system through the Input/Output (IO) connector 1701. For example, the Hardware Security Module (HSM) can be a PCI express card, which can be directly plugged into the computer or server device. In this case the Input/Output (IO) connector is a PCIe connector. In use, the Hardware Security Module (HSM) receives user requests through the Input-Output (IO) connector 1701. The requests may comprise commands to perform certain cryptographic operations.

The Input-Output (IO) connector 1701 is communicatively coupled to the processor 1702 by an electrically conductive connection 1710, also referred to as a "trace". The processor 1702 is a Central Processing Unit (CPU) and is configured to perform basic arithmetic, logic, controlling, and Input/Output (I/O) operations specified by instructions in computer program code. An example of the processor 1702 is an NXP T1042 processor. The internal structure of the processor 1702 is fixed, that is to say that the internal circuitry of the processor utilised to perform the various operations is fixed and cannot be changed after the processor 1702 is manufactured. In other words, the internal structure, i.e. the hardware, of the processor 1702 is not configurable.

The Hardware Security Module (HSM) further comprises non-volatile memory 1708 and working memory comprising Random Access Memory (RAM) 1709. The non-volatile memory 1708 may include any form of non-volatile device memory. In an example, the non-volatile memory 1708 includes Flash memory and Electrically Erasable Read Only Memory (EEROM). The RAM 1709 may be DDR RAM. The processor 1702 is in wired bi-directional communication with both the non-volatile storage 1708 and the Random Access Memory (RAM) 1709.

Computer program code is stored in the non-volatile memory 1708. When executed, a program is represented as a software product, or process, in the working memory. The processor 1702 comprises logic circuitry that responds to and processes instructions in program code present in the working memory. The below description refers to "firmware", which is program code comprising a set of computer instructions. The firmware comprises machine code stored in the non-volatile memory 1708 on the HSM. Also stored in the non-volatile memory 1708 on the HSM are any components necessary to execute the firmware, including runtime system files. When executed, a copy of the firmware machine code is loaded in the working memory. A "firmware process" is the instance of the firmware that is being executed, comprising the machine code in the working memory.

The firmware in the example of FIG. 17 comprises computer instructions embodying a set of one or more cryptographic algorithms. For example, the firmware comprises computer instructions embodying one or more of the following cryptographic algorithms: cryptographic key generation; key derivation; encryption; decryption; and digital signature algorithms (for example digital signing or validation of a digital signature). The firmware can be embedded in the non-volatile memory 1708 of the Hardware Security Module when the Hardware Security Module (HSM) is manufactured by a trusted party, or can be provided by the trusted party as a whole or in part after manufacture. For instance, the firmware can be introduced by the trusted party as a computer program product, which may be in the form of a download. Alternatively, modifications to existing firmware can be made by the trusted party by an update or plug-in, Execution of the firmware by the processor 1702 causes various functionality of a Hardware Security Module (HSM), such as generating cryptographic keys, storing cryptographic keys, or performing cryptographic operations etc., to be implemented.

The processor 1702 runs an operating system, for example a Linux operating system. The operating system comprises system software that manages the hardware and software resources of the HSM device, and acts as an intermediary between the firmware and the HSM hardware.

One or more cryptographic application keys are associated with the client for use with the cryptographic algorithms embodied in the firmware. The application key(s) may be securely stored outside of the HSM device using a master key. For example, the application key(s) may be encrypted using Triple-DES encryption (for example) using the master key (KMSW key) in the HSM device. The encrypted application key(s) can then be transmitted to a separate external device for storage. The master key however is stored on the HSM device in the non-volatile storage 1708.

The Hardware Security Module (HSM) further comprises a Power/Reset component 1703 configured to control the power provided to the processor 1702 and the crypto co-processor 1704. The Power/Reset component 1703 is communicatively coupled to the Input/Output connector 1701 such that a user can control power to the processor 1702 and the crypto co-processor 1704 via the Input/Output connector 1701, for example by transmitting a message to the Hardware Security Module (HSM) via the Input/Output connector 1701.

The Hardware Security Module (HSM) further comprises a security processor 1706. The security processor 1706 is configured to communicate with a plurality of on-board sensors 1707. The sensors 1707 are configured to monitor physical properties that may indicate an attack on the HSM. The sensors may include but are not limited to processor and/or board temperature sensors, or voltage and/or current sensors. The security processor 1706 is configured to determine when the Hardware Security Module (HSM) is being tampered with. For example, the security processor 1706 may be configured to detect a cold boot attack based on readings obtained from the temperature sensors. Furthermore, the security processor 1706 may be configured to detect a glitch attack based on readings from the voltage and/or current sensors. Optionally, the Hardware Security Module (HSM) is enclosed within a container that has an access cover. In this case the sensors 1707 may include a tamper detection switch, and the security processor 1706 is configured to determine when the cover is removed based on the state of the tamper detection switches.

In use, the security processor 1706 is configured to communicate with the processor 1702. The security processor 1706 provides information indicating whether or not the security of the Hardware Security Module (HSM) has been compromised.

In an example, the processor 1702 is configured to determine, during initialisation of the Hardware Security Module (HSM), whether the security of the HSM has been compromised. In response to receiving an indication from the security processor 1706 that the HSM has been compromised, the processor 1702 is configured to suspend start up, thereby preventing the functionality of the HSM from being implemented. In response to receiving an indication from the security processor 1706 that the HSM has not been compromised, the processor 1702 is configured to continue start up, thereby making the functionality of the HSM available for use.

The HSM device further comprises an FPGA implemented crypto co-processor 1704. The FPGA implemented crypto co-processor 1704 performs various cryptographic functions in hardware, for example various standard encryption and decryption algorithms, and digital signature algorithms. For example, the crypto co-processor 1704 is configured to provide at least one of: a public key hardware accelerator (PKSA), a random number generator, an advanced encryption standard accelerator (AESA) and a message digest hardware accelerator (MDHA).

In FIG. 1, the crypto co-processor 311 is an application-specific integrated circuit (ASIC). The ASIC comprises fixed logic circuitry configured to perform the standard operations. Or put in other words, the crypto co-processor has a fixed implementation that cannot be changes. In the alternative embodiment shown in FIG. 11, the crypto co-processor 1704 is implemented using a Field Programmable Gate Array (FPGA). The Field Programmable Gate Array (FPGA) 1704 is a single, discrete, self-contained package that implements various functionality performed by the crypto-coprocessor 204.

The FPGA implemented crypto co-processor 1704 is configured to perform, using configurable logic, various cryptographic functions in hardware, for example various standard encryption and decryption algorithms, and digital signature algorithms. For example, the FPGA is configured to provide at least one of: a public key hardware accelerator (PKSA), a random number generator, an advanced encryption standard accelerator (AESA) and a message digest hardware accelerator (MDHA). In the FPGA, one or more of these operations are implemented directly in hardware.

The FPGA implemented crypto co-processor 1704 is configured to receive requests to perform one or more operations from the processor 1702 and to return to the processor 1702 the output of the operation. The processor 1702 is configured to off-load various operations to the FPGA 1704. The FPGA 1704 is configured to perform certain operations in hardware, meaning that these operations may be performed more efficiently on the FPGA 1704 than on the processor 1702.

As described previously, the firmware computer program code is stored in the non-volatile memory 1708 of the HSM. When executed, a copy of the firmware machine code is loaded into the processor 1702, where the firmware is represented as a software product, or process, in the working memory of the HSM.

The firmware process "Extmaths" when certain standard cryptographic operations are to be performed. Computer program code corresponding to the Extmaths module is stored in the non-volatile memory 1708 of the HSM and retrieved by the firmware process. When executed, a copy of the program code is loaded into the working memory of the HSM, where the Extmaths is represented as a software product, or process, in the working memory of the HSM.

The Extmaths process in turn calls a Driver. In an example the Driver is a "Cryptodev" module, which sends a request to perform an operation to the crypto co-processor 1704. Cryptodev is a Linux kernel module. Effectively when some C program requests bignum operations Linux will point it at that driver. Computer program code corresponding to the Driver is stored in the non-volatile memory 1708 of the HSM and retrieved by the Extmaths process. When executed, a copy of the program code is loaded into the working memory of the HSM, where the Driver is represented as a software product, or process, in the working memory of the HSM.

The Driver is configured to access the FPGA 1704. The firmware process calls the "Extmaths" module when certain cryptographic operations are to be performed. The "Extmaths" process in turn calls the Driver. The Driver process sends a request to perform the operation to the FPGA 1704. The programmable logic of the FPGA 1704 has hardware implementations of one or more cryptographic operations.

An init process also runs. An IF component is implemented in the FPGA 1704. The IF component accesses a plurality of accelerator cores ACC in the FPGA 1704, that implement cryptographic functions in hardware.

By implementing various functionality of the crypto co-processor 311 in FIG. 1 in an FPGA 1704, the HSM device is made reconfigurable. The FPGA 1704 can be reconfigured to implement a more secure version of an operation implemented in hardware for example.

In an example the FPGA implementing the crypto co-processor 1704 comprises the FPGA as discussed in relation to FIG. 16A. In a different example the FPGA implementing the crypto co-processor 1704 comprises the FPGA as discussed in relation to FIG. 16B.

As discussed above, the HSM device may be used by various different users (or "tenants"). Since the CPU 303 only handles non-sensitive (e.g. encrypted) information, the likelihood of a security vulnerability is reduced. In such implementations, multiple tenants may use the CPU 303 at the same time. However, the cryptographic engine 411 may be used by a single tenant at a time. For example, the HSM device may comprise multiple cryptographic co-processors 353 or a single cryptographic co-processor with multiple cryptographic engines 411. Additionally or alternatively, multiple tenants may use the same cryptographic engine 411, with the set of unencrypted registers 460 being used by a single tenant at a time. For example, the HSM device may comprise multiple sets of unencrypted registers 460 for a single cryptographic engine 411. Additionally or alternatively, multiple tenants may use the same cryptographic engine 411 with a time separation being implemented in software, for example so that no two tenant's instructions are executed on the same cryptographic engine 411 at the same time.

Although in the above described examples, segregation in the device between sensitive information (so called "red" information, for example comprising plaintext of cryptographic keys) and non-sensitive information (so called "black" information which may comprise encrypted keys) is provided, in alternative examples, the above described methods may be implemented on a device without such segregation. For example, in some examples the functionality performed by the CPU 303 and the second processor 401 may be performed by a single processor, which may be a CPU for example. Alternatively, CPU 303 and second processor 401 may be implemented in the same package, whereas first cryptographic engine 411 is separated, in such an example, ACL handling may occur on CPU 303, but the PKD offload is performed in hardware on an FPGA for example.

Further embodiments are set out in the following clauses:

1. A method performed by a device, the device comprising a first processor and a processing module, the method comprising:

obtaining, by the first processor, first data, comprising a representation of computer program code that embodies a cryptographic algorithm;

obtaining, by the first processor, second data;

receiving, by the first processor, a request for a first mechanism to be performed, the request comprising:

information identifying the first mechanism;

information identifying the first data as corresponding to a program; and information identifying the second data as corresponding to an input;

transmitting, by the first processor, to the processing module, a second request for the first mechanism to be performed, the second request comprising:

information identifying the first mechanism;

information identifying the first data as corresponding to a program; and information identifying the second data as corresponding to an input; and executing, by the processing module, the program represented in the first data taking the second data as the input.

2. The method according to clause 1, wherein: the processing module comprises a third processor implementing a first instruction set architecture, the first instruction set architecture comprising machine code instructions, and executing the program comprises using a subset of the machine code instructions.

3. The method according to clause 1, wherein the information identifying the first data comprises a representation of the program in a custom assembly language, wherein:

the custom assembly language comprises a plurality of instructions; and each instruction in the plurality of instructions is associated with a machine code instruction from the subset of machine code instructions.

4. The method according to clause 3, wherein the plurality of instructions in the custom assembly language comprises a first instruction, wherein the first instruction directly corresponds to only a first machine code instruction in subset of machine code instructions.

5. The method according to any of clauses 3-4, wherein the plurality of instructions in the custom assembly language comprises a second instruction, wherein the second instruction directly corresponds to a second machine code instruction and a third machine code instruction.

6. The method according to any of clauses 1-5, wherein the processing module comprises a plurality of hardware circuits, each instruction in the subset of machine code instructions is associated with a hardware circuit in the plurality of hardware circuits, and executing the program comprises using the plurality of hardware circuits.

7. The method according to any of clauses 2-6, wherein:

the custom assembly language comprises a set of cryptographic mechanisms and a fourth instruction;

the fourth instruction comprises an indication of a first cryptographic mechanism in the set of cryptographic mechanisms, wherein the first cryptographic mechanism is associated with a first set of machine code instructions not included in the subset of machine code instructions;

the program comprises the third instruction;

and wherein executing the program comprises;

executing the program using the first set of machine code instructions and the subset of machine code instructions.

8. The method according to any preceding clause, wherein the processing module comprises:

an instruction memory configured to store machine code instructions corresponding the program; and a masking component comprising:

a first input; and a second input, wherein:

the first input of the masking component is coupled to an output of the instruction memory and the second input of masking component is configured to receive an indication that the program is being executed; and wherein, the masking component is configured to mask machine code instructions from the first instruction set architecture that are not part of the subset of machine code instructions in response to receiving the indication that the program is being executed.

9. The method according to clause 8, wherein the masking component comprises a third input, the third input configured to receive an indication that the first cryptographic mechanism is being used; and wherein:

the masking component is configured to mask machine code instructions from the first instruction set architecture that are not part of either: 1) the subset of machine code instructions or 2) the first set of machine code instructions in response to receiving the indication that the program is being executed and the first cryptographic mechanism is being used.

10. The method according to any preceding clause, further comprising:

performing a first determination in response to receiving the request for the first mechanism, the first determination comprising:

determining whether a first policy associated with the second data permits the second data to be used with the program represented in the first data, and determining whether a further policy associated with the computer program code permits the computer program code to be used with the second data; and if the first determination is successful, transmitting, by the first processor, to the processing module, the second request for the first mechanism to be performed.

11. The method according to clause 10, wherein the first determination further comprises determining whether the first policy permits the second data to be used in the first mechanism.

12. The method according to clause 10 or 11, wherein the first policy is a first access control list comprising a list of permissions relating to use of the second data.

13. The method according to any of clauses 10 to 12, wherein the further policy is a third policy, and the third policy is a third access control list comprising a list of permissions relating to use of the program.

14. A carrier medium comprising computer readable code configured to cause a computer to perform the method of any preceding clause.

15. A device comprising a first processor and a processing module, the first processor being configured to:

obtain first data, comprising a representation of computer program code that embodies a cryptographic algorithm;

obtain second data;

receive a request for a first mechanism to be performed, the request comprising information identifying the first mechanism, information identifying the first data as corresponding to a program, and information identifying the second data as corresponding to an input; and transmit to the processing module a second request for the first mechanism to be performed, the second request comprising information identifying the first mechanism, information identifying the first data as corresponding to a program, and information identifying the second data as corresponding to an input;

the processing module being configured to:

execute the program represented in the first data taking the second data as the input.

While certain embodiments have been described, these embodiments have been presented by way of example only, and are not intended to limit the scope of the inventions. Indeed the novel methods and apparatus described herein may be embodied in a variety of other forms; furthermore, various omissions, substitutions and changes in the form of methods and apparatus described herein may be made.

Appendix 1

The below is an excerpt from an API definition specifying a language which may be used to write the computer program code in an example implementation. The below is a list of definitions which define various data types in the example.

The invention claimed is:

1. A method performed by a device, the device comprising a first processor and a processing module, wherein the processing module comprises a further processor implementing a first instruction set architecture, the first instruction set architecture comprising machine code instructions, the method comprising:

obtaining, by the first processor, first data, comprising a representation of computer program code that embodies a cryptographic algorithm;

obtaining, by the first processor, second data;

receiving, by the first processor, a request for a first mechanism to be performed, the request comprising:

information identifying the first mechanism;

information identifying the first data as corresponding to a program; and information identifying the second data as corresponding to an input;

transmitting, by the first processor, to the processing module, a second request for the first mechanism to be performed, the second request comprising:

information identifying the first mechanism;

information identifying the first data as corresponding to the program; and information identifying the second data as corresponding to the input; and executing, by the processing module, the program represented in the first data taking the second data as the input, wherein the processing module further comprises:

an instruction memory configured to store the machine code instructions; and a masking component comprising a first input and a second input, wherein the first input of the masking component is coupled to an output of the instruction memory and the second input of the masking component is configured to receive an indication that the program is being executed, and wherein the masking component, in response to receiving the indication that the program is being executed, is configured to mask the machine code instructions from the first instruction set architecture that are not part of a subset of approved machine code instructions.

2. The method according to claim 1, wherein a first set of basic instructions supported by the further processor comprises assembly instructions for use by a user-defined program, and wherein the assembly instructions in the first set of basic instructions are implemented using the subset of approved machine code instructions in the first instruction set architecture that are approved for use in user-defined algorithms.

3. The method according to claim 2, wherein the first set of basic instructions are provided for use in an unrestricted way in the program.

4. The method according to claim 2, wherein the processing module comprises a plurality of hardware circuits, and each machine code instruction in the subset of approved machine code instructions is associated with a hardware circuit in the plurality of hardware circuits.

5. The method according to claim 2, further comprising: performing the first mechanism by which the program is executed.

6. The method according to claim 1, wherein the first data comprises the representation of the computer program code in an assembly language, and wherein: the assembly language comprises a first set of basic instructions; and each instruction in the first set of basic instructions is associated with a machine code instruction from the subset of approved machine code instructions.

7. The method according to claim 6, wherein the assembly language comprises an instruction comprising an indication of a first cryptographic mechanism, wherein the first cryptographic mechanism is associated with a first set of one or more machine code instructions in the first instruction set architecture.

8. The method according to claim 1, wherein the masking component comprises a third input, the third input configured to receive an indication that a first cryptographic mechanism associated with a first set of one or more machine code instructions in the first instruction set architecture is being used, and wherein the masking component is configured to mask the machine code instructions from the first instruction set architecture that are not part of either:

1) the subset of approved machine code instructions; or 2) the first set of one or more machine code instructions, in response to receiving the indication that the program is being executed and the first cryptographic mechanism is being used.

9. The method according to claim 1, further comprising: performing a first determination comprising:

determining whether a first policy associated with the second data permits the second data to be used with the program represented in the first data; and determining whether a further policy associated with the computer program code permits the computer program code to be used with the second data.

10. The method according to claim 9, wherein the first determination further comprises determining whether the first policy permits the second data to be used in the first mechanism.

11. The method according to claim 1, wherein the device is a hardware security module.

12. The method according to claim 1, wherein obtaining the first data comprises receiving the representation of the computer program code from a client device.

13. A non-transitory computer readable medium comprising computer readable code configured to cause a computer device to perform process of method, the computer device comprising a first processor and a processing module, wherein the processing module comprises a further processor implementing a first instruction set architecture, the first instruction set architecture comprising machine code instructions, comprising:

obtaining, by the first processor, first data, comprising a representation of computer program code that embodies a cryptographic algorithm;

obtaining, by the first processor, second data;

receiving, by the first processor, a request for a first mechanism to be performed, the request comprising:

information identifying the first mechanism;

information identifying the first data as corresponding to a program; and information identifying the second data as corresponding to an input;

transmitting, by the first processor, to the processing module, a second request for the first mechanism to be performed, the second request comprising:

information identifying the first mechanism;

information identifying the first data as corresponding to the program; and information identifying the second data as corresponding to the input; and executing, by the processing module, the program represented in the first data taking the second data as the input, wherein the processing module further comprises:

an instruction memory configured to store the machine code instructions; and a masking component, being implemented in a hardware, comprising a first input and a second input, wherein the first input of the masking component is coupled to an output of the instruction memory and the second input of the masking component is configured to receive an indication that the program is being executed, and wherein the masking component, in response to receiving the indication that the program is being executed, is configured to mask the machine code instructions from the first instruction set architecture that are not part of a subset of approved machine code instructions.

14. The non-transitory computer readable medium according to claim 13, wherein the computer device is a hardware security module.

15. The non-transitory computer readable medium according to claim 13, wherein the first data comprises the representation of the computer program code in an assembly language, and wherein: the assembly language comprises a first set of basic instructions; and each instruction in the first set of basic instructions is associated with a machine code instruction from the subset of approved machine code instructions, and wherein the first set of basic instructions are provided for use in an unrestricted way in the program.

16. The non-transitory computer readable medium according to claim 13, wherein a first set of basic instructions supported by the further processor comprises assembly instructions for use by a user-defined program, and wherein the assembly instructions in the first set of basic instructions are implemented using the subset of approved machine code instructions in the first instruction set architecture that are approved for use in user-defined algorithms, and wherein the first set of basic instructions are provided for use in an unrestricted way in the program.

17. A device comprising:

a first processor; and a processing module, wherein the processing module comprises a further processor implementing a first instruction set architecture, the first instruction set architecture comprising machine code instructions;

the first processor being configured to:

obtain first data, comprising a representation of computer program code that embodies a cryptographic algorithm;

obtain second data;

receive a request for a first mechanism to be performed, the request comprising information identifying the first mechanism, information identifying the first data as corresponding to a program, and information identifying the second data as corresponding to an input; and transmit to the processing module a second request for the first mechanism to be performed, the second request comprising information identifying the first mechanism, information identifying the first data as corresponding to the program, and information identifying the second data as corresponding to the input;

the processing module being configured to:

execute the program represented in the first data taking the second data as the input, wherein the processing module further comprises:

an instruction memory configured to store the machine code instructions; and a masking component, being implemented in a hardware, comprising a first input and a second input, wherein the first input of the masking component is coupled to an output of the instruction memory and the second input of the masking component is configured to receive an indication that the program is being executed, and wherein the masking component, in response to receiving the indication that the program is being executed, is configured to mask the machine code instructions from the first instruction set architecture that are not part of a subset of approved machine code instructions.

18. The device according to claim 17, wherein the device is a hardware security module.

19. The device according to claim 17, wherein a first set of basic instructions supported by the further processor comprises assembly instructions for use by a user-defined program, and wherein the assembly instructions in the first set of basic instructions are implemented using the subset of approved machine code instructions in the first instruction set architecture that are approved for use in user-defined algorithms, and wherein the first set of basic instructions are provided for use in an unrestricted way in the program.

20. The device according to claim 17, wherein the first data comprises the representation of the computer program code in an assembly language, and wherein: the assembly language comprises a first set of basic instructions; and each instruction in the first set of basic instructions is associated with a machine code instruction from the subset of approved machine code instructions, and wherein the first set of basic instructions are provided for use in an unrestricted way in the program.

\*    \*    \*    \*    \*